(12) United States Patent
Goeldi

(10) Patent No.: US 8,375,024 B2
(45) Date of Patent: Feb. 12, 2013

(54) MODELING SOCIAL NETWORKS USING ANALYTIC MEASUREMENTS OF ONLINE SOCIAL MEDIA CONTENT

(75) Inventor: Andreas Goeldi, Cambridge, MA (US)

(73) Assignee: Buzzient, Inc., Cambridge, MA (US)

( * ) Notice: Subject to any disclaimer, the term of this patent is extended or adjusted under 35 U.S.C. 154(b) by 621 days.

(21) Appl. No.: 12/353,166

(22) Filed: Jan. 13, 2009

(65) Prior Publication Data
US 2010/0121849 A1 May 13, 2010

Related U.S. Application Data

(60) Provisional application No. 61/114,445, filed on Nov. 13, 2008.

(51) Int. Cl.
*G06F 17/30* (2006.01)
(52) U.S. Cl. ........ 707/722; 707/709; 707/749; 707/751; 709/224
(58) Field of Classification Search .............. 707/705, 707/706, 722, 736, 999.006, 7, 104.1
See application file for complete search history.

(56) References Cited

U.S. PATENT DOCUMENTS

| | | | |
|---|---|---|---|
| 5,371,673 A | 12/1994 | Fan | |
| 7,043,760 B2 | 5/2006 | Holtzman et al. | |
| 7,165,023 B2 | 1/2007 | Corman et al. | |
| 7,167,910 B2 | 1/2007 | Farnham et al. | |
| 7,177,880 B2 | 2/2007 | Ruvolo et al. | |
| 7,185,065 B1 | 2/2007 | Holtzman et al. | |
| 7,197,470 B1 | 3/2007 | Arnett et al. | |
| 7,225,122 B2 * | 5/2007 | Shaw | 704/9 |
| 7,245,223 B2 * | 7/2007 | Trela | 340/573.1 |
| 7,539,295 B1 * | 5/2009 | Amir et al. | 379/265.01 |
| 7,600,017 B2 * | 10/2009 | Holtzman et al. | 709/224 |
| 7,801,724 B2 * | 9/2010 | Shaw | 704/9 |
| 7,844,483 B2 * | 11/2010 | Arnett et al. | 705/7.31 |
| 7,844,484 B2 * | 11/2010 | Arnett et al. | 705/7.31 |
| 7,881,924 B2 * | 2/2011 | Shaw | 704/9 |
| 7,974,983 B2 * | 7/2011 | Goeldi | 707/769 |
| 2003/0154248 A1 | 8/2003 | Smith et al. | |
| 2005/0114171 A1 | 5/2005 | Siegalovsky et al. | |
| 2006/0042483 A1 | 3/2006 | Work et al. | |
| 2006/0064431 A1 | 3/2006 | Kishore et al. | |
| 2006/0173957 A1 | 8/2006 | Robinson et al. | |
| 2006/0200434 A1 | 9/2006 | Flinn et al. | |

(Continued)

FOREIGN PATENT DOCUMENTS

| | | |
|---|---|---|
| WO | WO-2006036165 A2 | 4/2006 |
| WO | WO-2007070676 | 6/2007 |

(Continued)

OTHER PUBLICATIONS

Co-Pending U.S. Appl. No. 61/114,445, filed Nov. 13, 2008.

(Continued)

*Primary Examiner* — Debbie Le
(74) *Attorney, Agent, or Firm* — Perkins Coie LLP

(57) ABSTRACT

Methods, apparatuses, and computer-readable media for generating a social network graph to model one or more social networks of related authors of online social media and their corresponding posts of online social media conversations relevant to subject matter of interest in a category. Embodiments are configured to harvest and aggregate posts of online social media conversations from one or more online social media sources; to perform content scraping on the posts of online social media conversations to obtain raw data that includes user-profile information of a social media author corresponding to each individual post of online social media conversations; and performing social network analysis processing on the raw data to obtain the social network graph.

25 Claims, 41 Drawing Sheets

U.S. PATENT DOCUMENTS

| | | | |
|---|---|---|---|
| 2007/0005654 A1 | 1/2007 | Schachar et al. | |
| 2007/0067210 A1 | 3/2007 | Rishell et al. | |
| 2007/0100779 A1 | 5/2007 | Levy et al. | |
| 2007/0150335 A1 | 6/2007 | Arnett et al. | |
| 2007/0174220 A1 | 7/2007 | Flinn et al. | |
| 2007/0174303 A1 | 7/2007 | Fleming et al. | |
| 2007/0174386 A1 | 7/2007 | Loghmani | |
| 2008/0048904 A1* | 2/2008 | Lee et al. | 341/187 |
| 2008/0215607 A1* | 9/2008 | Kaushansky et al. | 707/102 |
| 2008/0294624 A1 | 11/2008 | Kanigsberg et al. | |
| 2009/0048904 A1* | 2/2009 | Newton et al. | 705/10 |
| 2009/0049127 A1 | 2/2009 | Juan et al. | |
| 2009/0070683 A1* | 3/2009 | Ward et al. | 715/738 |
| 2009/0106697 A1* | 4/2009 | Ward et al. | 715/835 |
| 2009/0119173 A1* | 5/2009 | Parsons et al. | 705/14 |
| 2009/0222551 A1 | 9/2009 | Neely et al. | |
| 2009/0265332 A1 | 10/2009 | Mushtaq et al. | |
| 2009/0271370 A1 | 10/2009 | Jagadish et al. | |
| 2009/0281988 A1 | 11/2009 | Yoo | |
| 2009/0306967 A1 | 12/2009 | Nicolov et al. | |
| 2010/0030753 A1* | 2/2010 | Nad et al. | 707/3 |
| 2010/0042910 A1 | 2/2010 | Manolescu et al. | |
| 2010/0070485 A1* | 3/2010 | Parsons et al. | 707/709 |
| 2010/0076850 A1 | 3/2010 | Parekh et al. | |
| 2010/0119053 A1 | 5/2010 | Goeldi | |
| 2010/0121707 A1 | 5/2010 | Goeldi | |
| 2010/0121843 A1 | 5/2010 | Goeldi | |
| 2010/0274815 A1 | 10/2010 | Vanasco | |
| 2010/0306249 A1 | 12/2010 | Hill et al. | |
| 2010/0325107 A1 | 12/2010 | Kenton et al. | |
| 2011/0191372 A1* | 8/2011 | Kaushansky et al. | 707/776 |
| 2011/0307312 A1 | 12/2011 | Goeldi | |

FOREIGN PATENT DOCUMENTS

| | | |
|---|---|---|
| WO | WO-2007076150 | 7/2007 |
| WO | WO-2007090111 | 8/2007 |

OTHER PUBLICATIONS

Co-Pending U.S. Appl. No. 12/352,827, filed Jan. 13, 2009.

Co-Pending U.S. Appl. No. 12/353,096, filed Jan. 13, 2009.

Co-Pending U.S. Appl. No. 12/353,208, filed Jan. 13, 2009, Issued Jul. 5, 2011 as Patent No. 7,974,983.

Co-Pending U.S. Appl. No. 12/154,310, filed Jun. 6, 2011.

Radian6, May 5, 2007, 1 page, downloaded from http://web.archive.org/web/20070505002539/http://www.radian6.com/technology.

Chen: "Sentiment and affect analysis of Dark Web forums: Measuring radicalization on the Internet," Intelligence and Security Informatics, 2008. ISI 2008. IEEE International conference on vol., no., pp. 104-109, Jun. 17-20, 2008. http://ieeexplore.ieee.org/stamp/stamp.jsp?tp=&arnumber=4565038&isnumber=4565003.

Non-Final Office Action Mailed Nov. 10, 2011 in Co-Pending U.S. Appl. No. 12/352,827.

Restriction Requirement Mailed Sep. 2, 2011 in Co-Pending U.S. Appl. No. 12/352,827.

Non-Final Office Action Mailed Nov. 14, 2011 in Co-Pending U.S. Appl. No. 12/353,096.

Restriction Requirement Mailed Sep. 15, 2011 in Co-Pending U.S. Appl. No. 12/353,096.

Notice of Allowance Mailed May 19, 2011 in Co-Pending U.S. Appl. No. 12/353,208, Issued Patent No. 7,974,983.

Non-Final Office Action Mailed Feb. 1, 2011 in Co-Pending U.S. Appl. No. 12/353,208, Issued Patent No. 7,974,983.

* cited by examiner

*Text Edge Parsing for Individual Sentences 400C*

Example Sentence: The Audi A6 is a very fast car with a great engine.

Full text search in all posts

Search: audi handling acceleration

Date Range: 2005-01 ▼ to 2008-10 ▼

Search

Query 'audi handling acceleration' from 2005-01-01 to 2008-11-01 retrieved 559 of 559 matches in 0.257 sec
audi found 294175 times in 209566 documents
handling found 58799 times in 55125 documents
acceleration found 45525 times in 38652 documents Results 1 to 25, First next

| Text | User | Date | Relevance |
|---|---|---|---|
| ...feels great. The suspension is nicely damped and provides an excellent balance between ride and handling capability. The body stays flat around corners and the seats hold you in pace in...a mid-sized coupe that's pretty impressive in real world driving. From a standing start, Audi claims acceleration to 62 mph in 5.9 seconds for the manual transmission model like ours, a... | Sam Abuelsamid | 2006-10-27 20:05:00.55 | 3 |
| ...according to the individual characteristics that TTAO writers assign Star ratings. Performance, Ride, Handling, Exterior, Interior, Fit and Finish, Toys, Desirability, Mileage and Price as Tested. For example, (well done is more accurate, but less poetic) when you try anything... | William C Montgomery | 2006-10-29 09:35:12.93 | 1 |

*Fig. 30*

| Overview | Brand Sentiment | Product Sentiment | Share of Voice | Topics | Opinion Leaders | Top Websites | Reports |

>> Filter on opinion leaders for Aug

| Name | Pref.Brand | Home Website | Demographics | No. of Posts | Centrality | Drill Down |
|---|---|---|---|---|---|---|
| in | Mazda | Automotiveforums.net | | 44869 | 2335.68 | Posts, Brands |
| crayzayjay | Porsche | Automotiveforums.net | Male, London, None United Kingdom | 4333 | 797.68 | Posts, Brands |
| Jaguar D-Type | Jaguar | Automotiveforums.net | Age: 41 Male, Portland, Oregon 97225 | 3696 | 697.83 | Posts, Brands |
| '97ventureowner | Buick | Automotiveforums.net | Male, Syracuse, New York 13209 | 4450 | 389.21 | Posts, Brands |
| Schludwiller | Nissan | Automotiveforums.net | Male | 3653 | 361.26 | Posts, Brands |
| MagicRat | Ford | Automotiveforums.net | Male, Ontario, None 75256 Canada | 3644 | 347.32 | Posts, Brands |
| G-man422 | Mercury | Automotiveforums.net | Age:17 Male, Marion, Ohio 43302 | 3725 | 326.19 | Posts, Brands |
| freakray | Subaru | Automotiveforums.net | Male, Greenville, South Carolina 29605 | 4063 | 297.35 | Posts, Brands |
| CF-Mike | Ford | Carforums.net | | 5183 | 169.77 | Posts, Brands |
| fpv_gino | Ford | Ultimate Cars Page | | 14452 | 133.18 | Posts, Brands |
| 2.2 Straight six | Nissan | Automotiveforums.net | Age:18 Male, London, None United Kingdom | 3910 | 99.80 | Posts, Brands |
| Hot228 | Buick | Automotiveforums.net | Male, Atlanta, Georgia 30064 | 2388 | 48.45 | Posts, Brands |
| Goatman | | Automotiveforums.net | Age:23 | 2 | 46.20 | Posts, Brands |
| Mustang | Ford | Ultimate Cars Page | | 8977 | 43.71 | Posts, Brands |
| fanouxhh | Acura | Automotiveforums.net | Age:27 K-8, None Canada | 43 | 43.25 | Posts, Brands |
| SWEET JUDGE | Pontiac | PerformanceYears | STRATFORD CT, | 1829 | 41.03 | Posts, Brands |

3303

3301

Positive/Negative Users
Influential Blogs
Brand Advocacy

*Fig. 33*

MODELING SOCIAL NETWORKS USING ANALYTIC MEASUREMENTS OF ONLINE SOCIAL MEDIA CONTENT

CROSS-REFERENCE TO RELATED APPLICATIONS

This application claims the benefit of U.S. provisional application No. 61/114,445, entitled "Aggregating and Presenting Quantitative Online Social Media Content," filed on Nov. 13, 2008.

RELATED APPLICATIONS

This application is related to co-pending applications U.S. application Ser. No. 12/352,827 entitled, Analytic Measurement of Online Social Media Content, and U.S. application Ser. No. 12/353,096 entitled, Displaying Analytic Measurement of Online Social Media Content in a Graphical User Interface, concurrently filed on Jan. 13, 2008 and assigned to the corporate assignee of the present invention.

FIELD OF THE INVENTION

At least certain embodiments of the invention relate generally to information management, and more particularly to modeling networks in online social media.

BACKGROUND OF THE INVENTION

Traditional methods of collecting, managing and providing real-time or near real-time relevant information have been enhanced through the use of the Internet and online research and information collection tools. One such set of tools is known as web analytics. Web analytics focus on a company's own website for collection of online information, particularly traffic data. Web analytics are limited because they only consider a subset of the relevant online universe, specifically the behavior of users of a given website. They do not discover other information about the users such as interests and opinions expressed in interactive systems. Behavioral analytics are another set of information collection and management tools that attempts to analyze the "click stream" of users and show advertisements based on this information. However, this method has many technical limitations since it tends to provide only a very limited picture of a user's overall interests. Also there is a lack of consolidation between a user's work and home PCs.

Online social media is a new source of valuable information on the Internet that may be harvested to generate information and other data about products or services, branding, competition, and industries. Online social media encompasses online media such as blogs and sub-blogs, online discussion forums, social networks, wiki sites such as Wikipedia, online reviews on e-commerce sites such as Amazon.com®, video sites such as YouTube®, micro-blogging services such as Twitter®, and so on. There are currently over 106 million blogs growing at a rate of 11% per year. There are several million forums with active contributions by more than 33% of Internet users. There are 483 million users of social networks worldwide growing at a rate of 47% annually. As a result, social media is becoming a crucial and rapidly growing source of consumer opinion. This information may allow users to quantify opinion on social media sites to gain useful insights into current consumer sentiment and trends relating to their products or services, brands, and/or technologies, and those of their competitors. Collecting and presenting this information can help users in a variety of ways such as, for example, target advertising revenues and expenditures, marketing, sales, customer service, brand management, product development, investor relations, and so on. Social networking sites are currently trying to leverage their own user profiles to target advertising based on their users' behavior and declared interests. However, most users today participate in several different online social media sites. Online content analytics are another set of information collection tools that attempts to analyze content in social media sites such as online forums, blogs, and so on. However, these techniques require a high degree of manual human intervention by analysts. Additionally, the reports generated by these analysts can be very expensive and can't be updated very frequently due to the necessity of human intervention in the data gathering and analysis process.

SUMMARY OF THE DESCRIPTION

At least certain embodiments disclose methods, apparatuses, and computer-readable media for generating a social network graph to model one or more social networks of related authors of online social media and their corresponding posts of online social media conversations relevant to subject matter of interest in a category. Embodiments are configured for harvesting and aggregating posts of online social media conversations from one or more online social media sources; performing content scraping on the posts of online social media conversations to obtain raw data including user-profile information of a social media author corresponding to each individual post of online social media conversations; and performing social network analysis processing on the raw data to obtain the social network graph.

BRIEF DESCRIPTION OF THE DRAWINGS

A better understanding of at least certain embodiments of the invention can be obtained from the following detailed description in conjunction with the following drawings.

FIG. 11 illustrates an online social media post as it appears in its originating site according to an exemplary embodiment of the invention.

FIG. 12 illustrates a search results display in a graphical user interface according to an exemplary embodiment of the invention.

FIG. 30 illustrates a tag cloud display in a graphical user interface according to an exemplary embodiment of the invention.

FIG. 33 illustrates a forum opinion leader list display in a graphical user interface according to an exemplary embodiment of the invention.

DETAILED DESCRIPTION

Figure 1A:
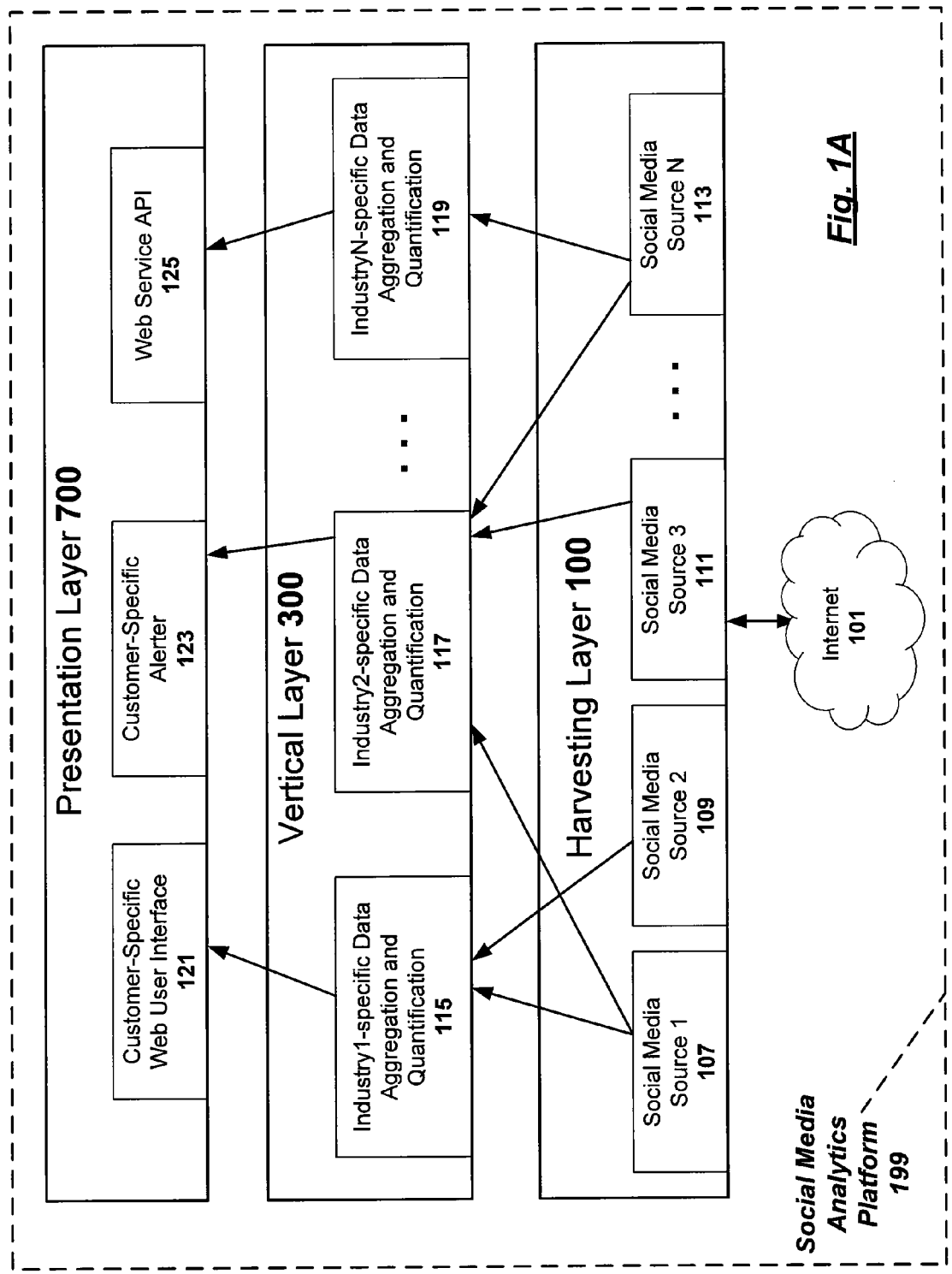
FIG. 1A illustrates a block diagram of a social media analytics platform according to an exemplary embodiment of the invention.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

At least certain embodiments disclose methods, apparatuses, and computer-readable media for generating a social network graph to model one or more social networks of related authors of online social media and their corresponding posts of online social media conversations relevant to subject matter of interest in a category. Embodiments are configured for harvesting and aggregating posts of online social media conversations from one or more online social media sources; performing content scraping on the posts of online social media conversations to obtain raw data including user-profile information of a social media author corresponding to each individual post of online social media conversations; and performing social network analysis processing on the raw data to obtain the social network graph.

Embodiments provide analytic measurement of online social media content for users such as global enterprises, advertising agencies, sales and marketing departments, media companies, government agencies, and virtually any entity requiring real-time or near real-time access to such information. This online social media content is quantified and provided in a relevant and user-friendly manner to these entities using an interface such as a graphical user interface (GUI). These embodiments provide both historical and current measurements to enable analysis of past and present information. Online social media content is harvested, sorted, and provided to relevant groups or entities. Certain embodiments describe a social media analytics platform for collecting and converting raw online social media conversations into actionable information that can be used to increase the top-line growth and margins of its recipients. Additionally, this aggregation of social media information can be analyzed to determine trends in each of the above discussed categories.

Monitoring and aggregating this new information source may be used on its own or in conjunction with traditional research and measurements such as, for example, quantitative and qualitative market research, paid media tracking, and traditional web site analytics. This process is automated so that qualitative measurements can be aggregated, quantified, and presented with minimal human intervention. At least certain embodiments contemplate a harvesting process referred to herein as "scraping" where social media sources are discovered or located and exploited for relevant information. The content is then aggregated and quantified in a manner relevant to the industry or other category. The aggregated and quantified online social media content is then provided to the user of the social media analytics (SMA) platform in an efficient, timely and user-friendly manner using the interface. In one embodiment, the interface is user-specific.

Examples of the quantitative online social media content data that can be provided by embodiments include: brand and product/service sentiment for users and their competition; the share of voice of the brand (e.g., volume of discussion about the brand, product or service) over the social media versus the competition; topics and keywords used by online discussion participants for the brand and the competition; information on the opinion leaders for the category (e.g., online social content authors with the most influential voices); top websites resulting from the brand search; automated alerts for changes in sentiment; keywords, terms or phrases in posts to the online social media websites; and much more. This information is aggregated, quantified, and provided to users in real-time or near-real-time for the purpose of, for example, marketing, public relations, advertising, sales, customer service, brand management, product development, investor relations, and so on. The result of this process is to provide highly relevant and timely actionable information to users of the SMA platform.

This information may be advantageous for several reasons including brand and product/service perception or sentiment analysis, trend recognition and opportunity identification, early warnings about customer service or quality issues, opinion leader identification and engagement, competitor monitoring, and optimized online advertising to name a few. This information allows users to quantify opinion on social media sites to gain insights into current consumer sentiment about the users' products or services, brands, and technologies and those of their competitors. This information also enables users of the SMA platform to recognize trends in consumer buzz about new technologies, product or service types, and attributes. In addition, users may receive early-warning signs to identify dissatisfied customers. Users also may identify and target opinion leaders for a given product/service or category using this information. Embodiments of the SMA platform can also supplies users with a list of highly relevant websites where high-affinity users are exchanging opinions and making purchasing decisions. This information can also be made widely available inside users' organizations using an interface to push analytics to potentially everyone inside the organization instead of just the top-level marketing staff enabling entire organizations to establish an overall better sense of the voice of their customers and to make informed decisions at the customer level because embodiments focus on the social behavior of potential customers using online social media sources and provide far better insight into commercially relevant interests.

FIG. 1A illustrates a block diagram of a social media analytics platform according to an exemplary embodiment of the invention. In the illustrated embodiment, the SMA platform 199 is separated into three layers or phases—the harvesting layer 100, vertical layer 300 and presentation layer 700. The harvesting layer 100 includes locating or discovering social media sources (e.g., websites) from the Internet related to a particular industry or other category, and harvesting the relevant content from those sources. The harvesting layer may process the relevant content from these Internet sources at any frequency such as daily, hourly, weekly, and minute-by-minute. The vertical layer includes aggregating and quantifying the harvested social media content, and the presentation layer includes a user interface to display the quantified online social media content and an alerter to alert users of the SMA platform 199 in a real-time or near real-time manner when changes occur in sentiment. The basic structure includes data collection and storage of online social media content for specific industries or other categories. The data collection and storage of online social media content may be performed for any type of category or product line.

The harvesting layer 100 of FIG. 1A includes online social media sources discovered or located on the Internet 101 including social media source 1_107, social media source 2_109, social media source 3_111, and so on through social media source N_113. Vertical layer 300 of SMA platform 199 is where the online social media content relevant to each industry is aggregated, quantified, and stored in a database. In the illustrated embodiment, Industry1-specific data aggregation and quantification 115 receives content from social media source 1_107 and social media source 2_109 of harvesting layer 109, industry2-specific data aggregation and quantification 117 receives content from social media source 1_1 07, social media source 3_1 11, and social media source N_113, and industryN-specific data aggregation and quantification 119 receives content from social media source N_113. For every identified source, relevant social media content is retrieved and processed.

The vertical layer 300 stores the aggregated and quantified online social media content in a database and supplies the content to the presentation layer 700 for display. Presentation layer 700 of FIG. 1A includes user-specific web user interface 121 for display of the aggregated and quantified online social media content received from vertical layer 300. Presentation layer 700 also includes a web service application programming interface (API) to provide fully automated data integration into third-party analytics or data presentation systems, and a user-specific alerter 123 to provide alerts relating to changes in online social media sentiment. The user-specific alerter 123 may be tailored for each user of the SMA platform 199.

Figure 1B:
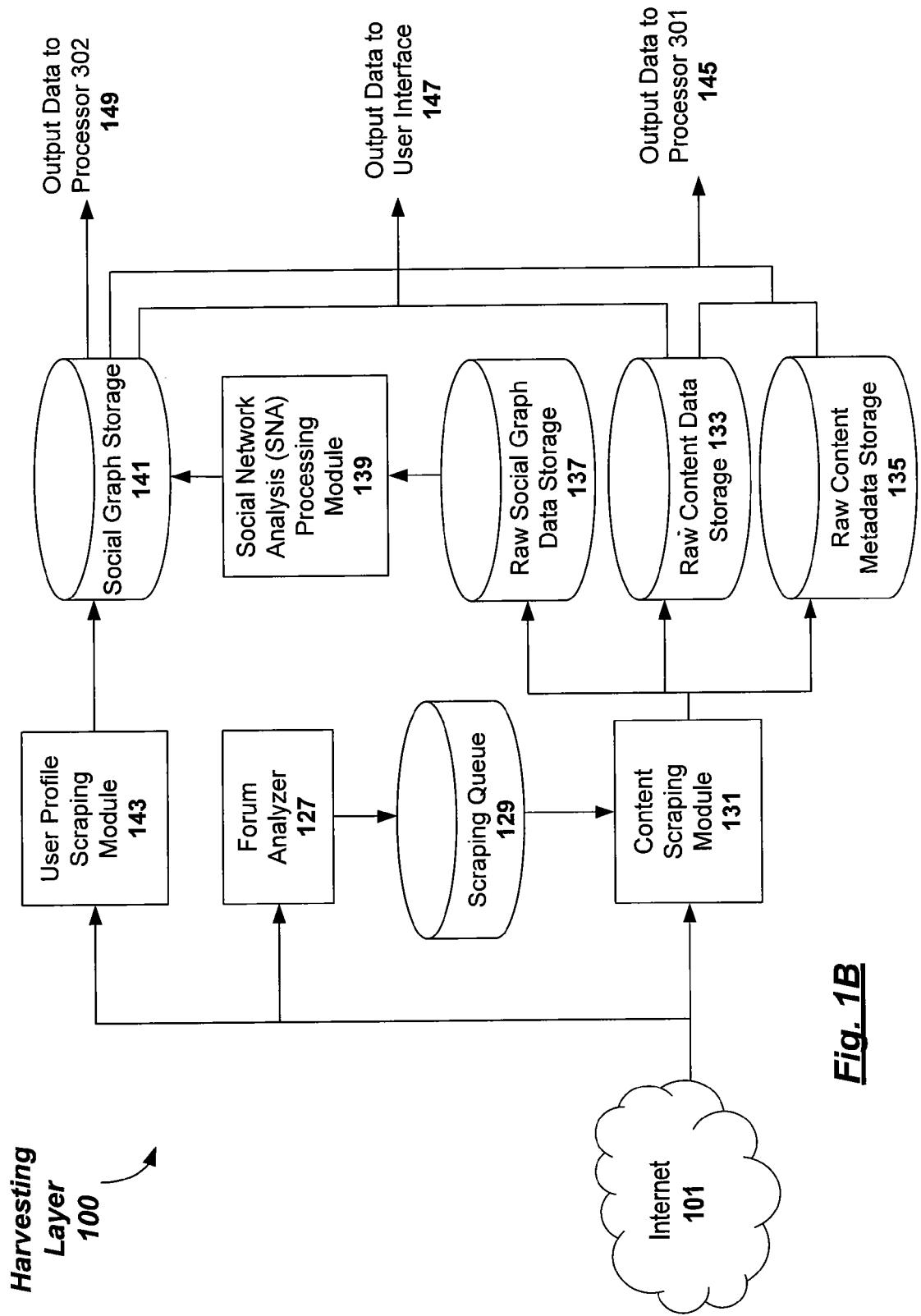
FIG. 1B illustrates a block diagram of the harvesting layer according to an exemplary embodiment of the invention.
Figure 2:
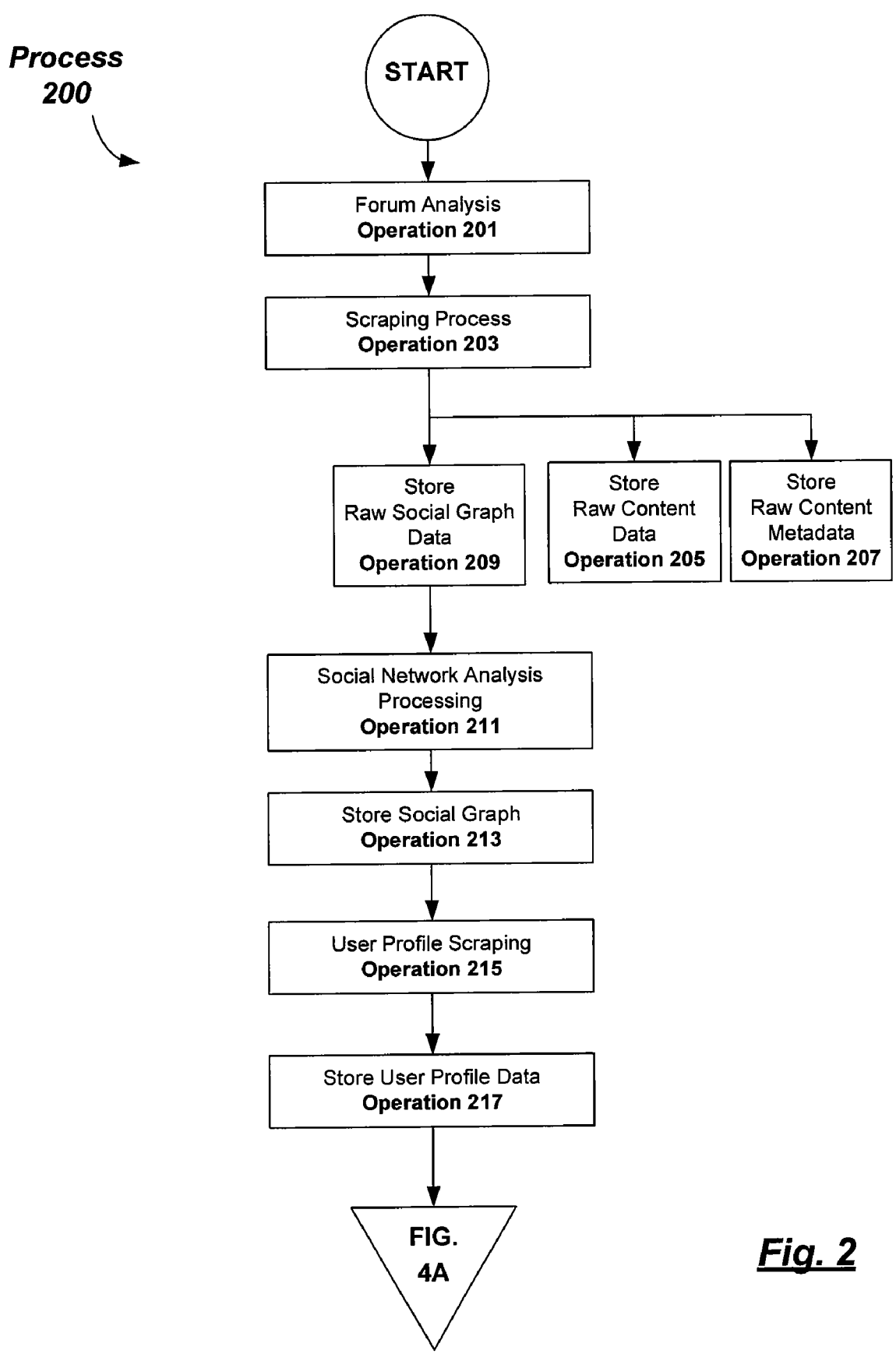
FIG. 2 illustrates harvesting layer processing according to an exemplary embodiment of the invention.

FIG. 1B illustrates a block diagram of the harvesting layer according to an exemplary embodiment of the invention. As discussed above, the harvesting layer 100 locates online social media content sources on the Internet and harvests relevant content from them. The block diagram components of the harvesting layer 100 will be discussed in conjunction with process 200 of FIG. 2, which illustrates harvesting layer processing according to an exemplary embodiment of the invention. Process 200 begins with performing forum analysis using forum analyzer 127 (operation 201). The function of the forum analyzer 127 is to scour the Internet 101 searching for online social media conversations (threads) relevant to a particular industry, product/service or other category. In at least certain embodiments, the forum analyzer 127 accomplishes this using automated tools for identifying industry-specific social media data sources from which to harvest information and provide to the users of the SMA platform. This includes a forum analysis to locate or discover which forums and/or sub-forums are relevant to a specific user's industry or other category from which the online social media content should be harvested. To accomplish this, search results from publicly available online search engines are processed to determine relevant websites based on the relevance score of each site for the keywords of interest. Each website found through this process is then accessed by the system to determine structural properties such as the technical nature of the source (e.g. RSS feeds, certain discussion forum software packages) and to identify the entry page locations later used in the content scraping module 131. The online social media content sources that are identified in this operation are then staged in the scraping queue 129 to feed the content scraping module 131 for the scraping process (operation 203).

At operation 203 the scraping process is performed including scouring the identified online social media sources for conversations relevant to a particular sector or other category and breaking down the content into pieces to be stored for later processing. The scraping process starts at an overview page typically provided by each social media source and identifies hyperlinks to potentially relevant subpages and content pages based on the structural properties of these hyperlinks. The process then iteratively drills down multiple levels of subpages in the same manner until a specific relevant discussion thread is found. Each discussion thread is then analyzed in order to isolate its atomic content components for further processing. For example, a particular relevant social media source (e.g., website) may have a web page with a thread containing 20 different posts relating to the Audi A6 automobile. In such a case, the web page would be retrieved and broken apart into 20 pieces, with each piece stored individually along with the user-profile information of the authors who posted the content.

The results of the scraping process include: the raw conversations of each social media post referred to as the raw post content data; the metadata of the raw post content; and information relating to the author of each post, as well as relationships between authors, referred to as the raw social graph data. The raw post content retrieved from the online social media sources is stored in raw content storage 133 (operation 205). This includes the actual text of the relevant social media post. The raw content metadata is also stored in raw content metadata storage 135 (operation 207). The raw content metadata includes information such as the URL of the social media website, and the length, context, and time of the post. Additionally, the raw social graph data is stored in raw social graph data storage 137 (operation 209). This data may include the social media post's author profile data such as the author's username, demographic information, number of posts to the social media website, those responding to the author's posts, and the author's contacts.

In the illustrated embodiment, the social network analysis (SNA) processing is then performed on the raw social graph data stored in raw social graph data storage 137 (operation 211). Here, information on each author of a social media post and on those responding to the author's post is retrieved from the raw social graph storage 137 and used to generate a social graph which includes an aggregation of social network information that can be useful in several contexts. For example, the social graph data may be analyzed to determine information about the author's social network including which authors are communicating about what topics, who is responding to which posts, what the related content is, and so on. The SNA processing is used to develop this information on networks of related authors and posts and to determine which authors are the most influential within these networks based on the social graph. The SNA processing first calculates a so-called centrality value for each author that expresses the author's degree of influence in a given social network. Authors that are connected to a large number of other authors and also connected to distinct sub-groups of authors are assumed to have higher influence than less well-connected authors. In order to calculate the centrality value, a version of Brandes' Betweenness Centrality algorithm is applied to the raw social graph for each website. The resulting raw centrality value is then modified with the activity level of the author, i.e. the number of posts written by this person, and an importance score for the website where that author is active. Within graph theory and network analysis, there are various measures of the centrality of a vertex within a graph that determine the relative importance of a vertex within the graph. Betweenness is a centrality measure of a vertex within a graph. Vertices that occur on many shortest paths between other vertices have higher betweenness than those that do not. For instance, an influential author on a large website such as MySpace® will receive a higher influence score than the author of a little known blog. In at least one embodiment, the influence score for each author is calculated by the following formula:

$$\text{Influence score} = bc^* (c_a + a/p_a)^* (c_p + p), \text{ where}$$

bc is the raw betweenness centrality value for the author;
a is the number of active authors on the website where the author is active;
p is the number of posts that the author has contributed;
$c_a$, $p_a$, $c_p$ are correction parameters that are fine-tuned for the purposes of a specific vertical (i.e., a specific category of interest).

The SNA processing also provides information including: the websites on which each of the social media authors have contributed; registrations in social networks; the status of influence of the authors; the author's sentiment towards a given brand, product or service; known demographic and geographic information about the authors; and trends in all of the above.

The social graph is then stored in social graph storage 141 (operation 213). An additional input into the social graph storage 141 is from user-profile scraping data accumulated from the Internet 101 using user-profile scraping module 143. At operation 215, the user profile scraping module 143 scours the Internet 101 to find any other information about the authors of the online social media conversations. Whatever information associated with the author that can be harvested from the Internet 101 is collected and stored along with the social graph in social graph storage 141 (operation 217). This completes the harvesting layer process 200 according to an exemplary embodiment.

Figure 3:
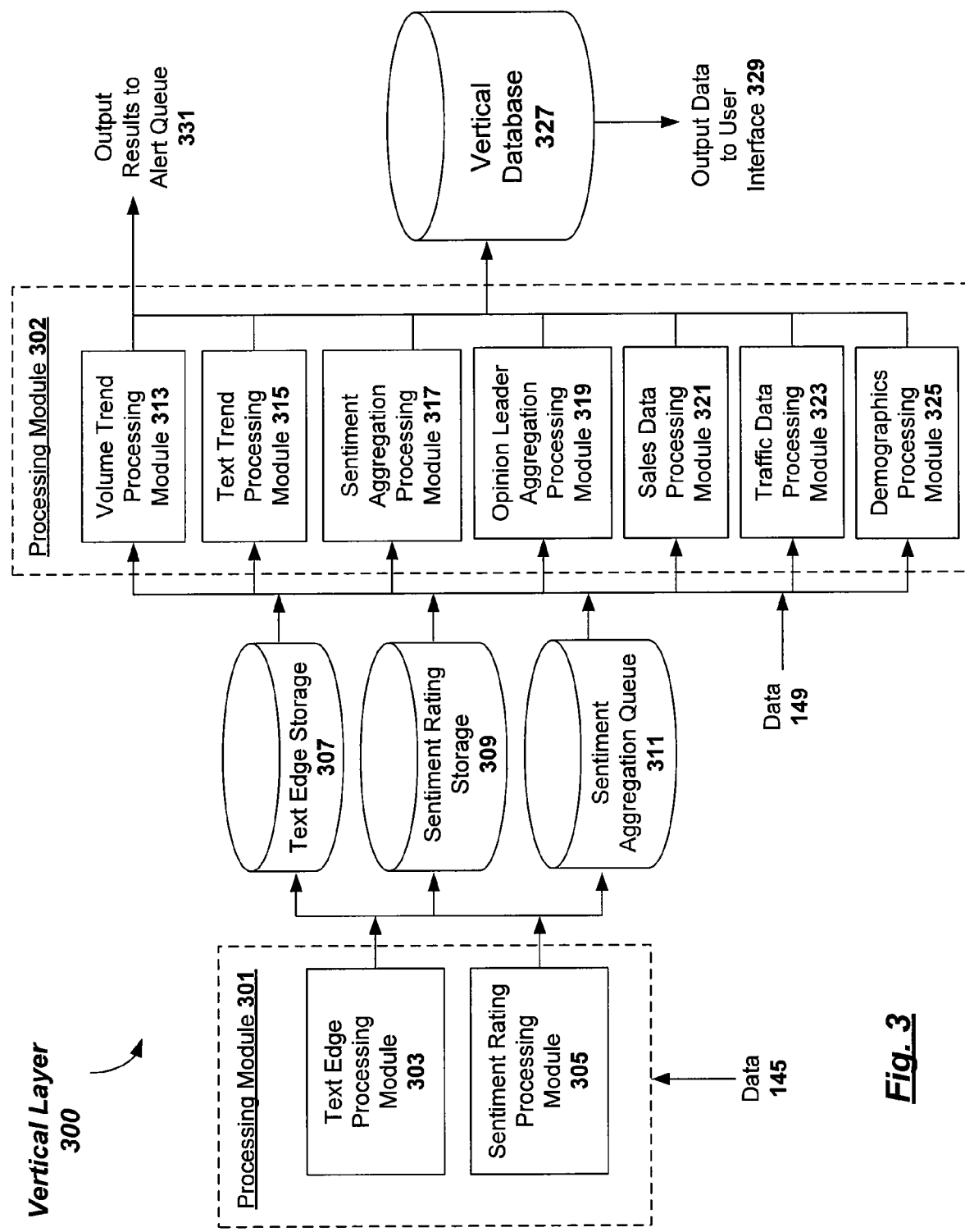
FIG. 3 illustrates a block diagram of the vertical layer according to an exemplary embodiment of the invention.
Figure 4A:
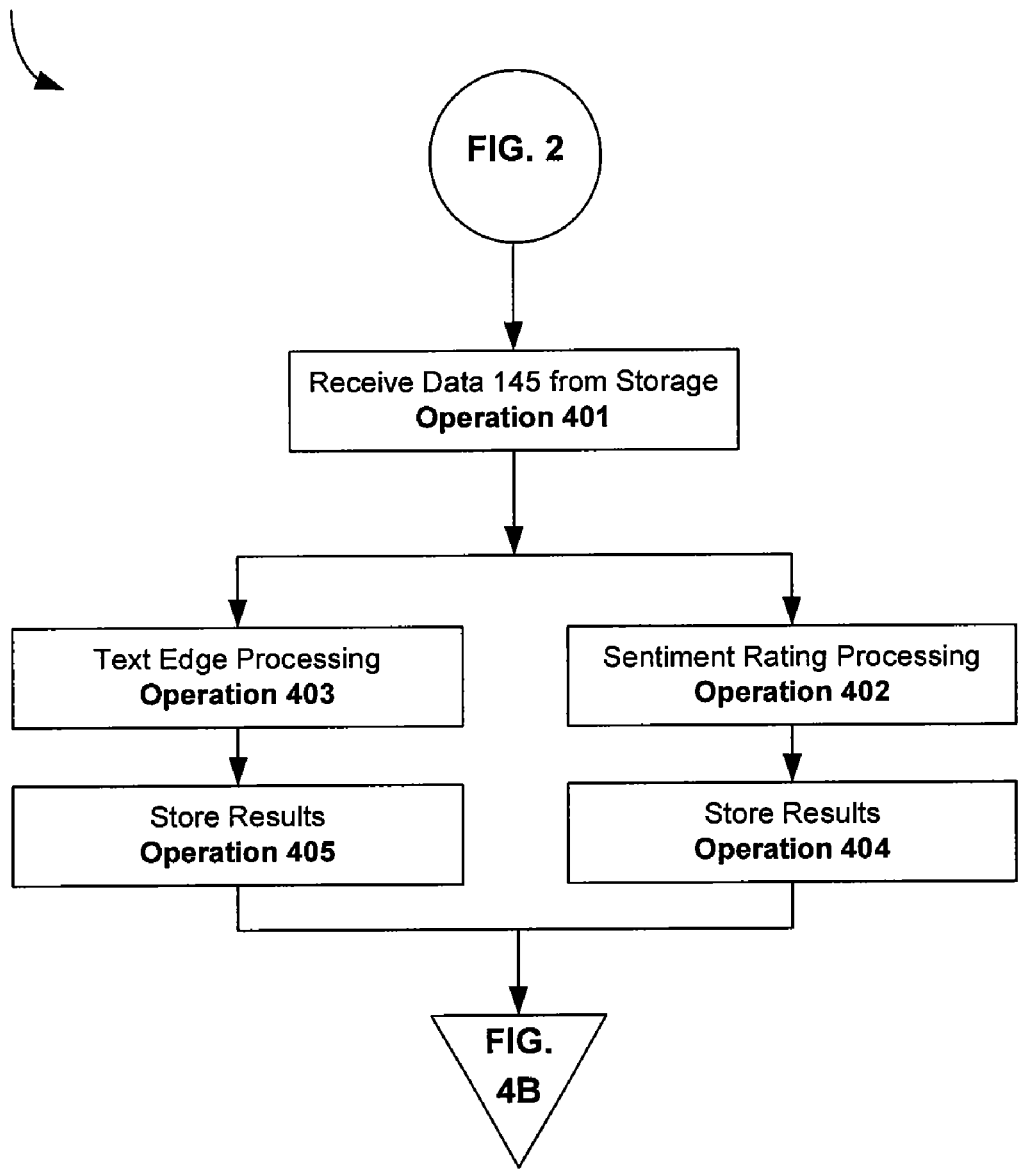
FIG. 4A illustrates vertical layer processing according to an exemplary embodiment of the invention.
Figure 4B:
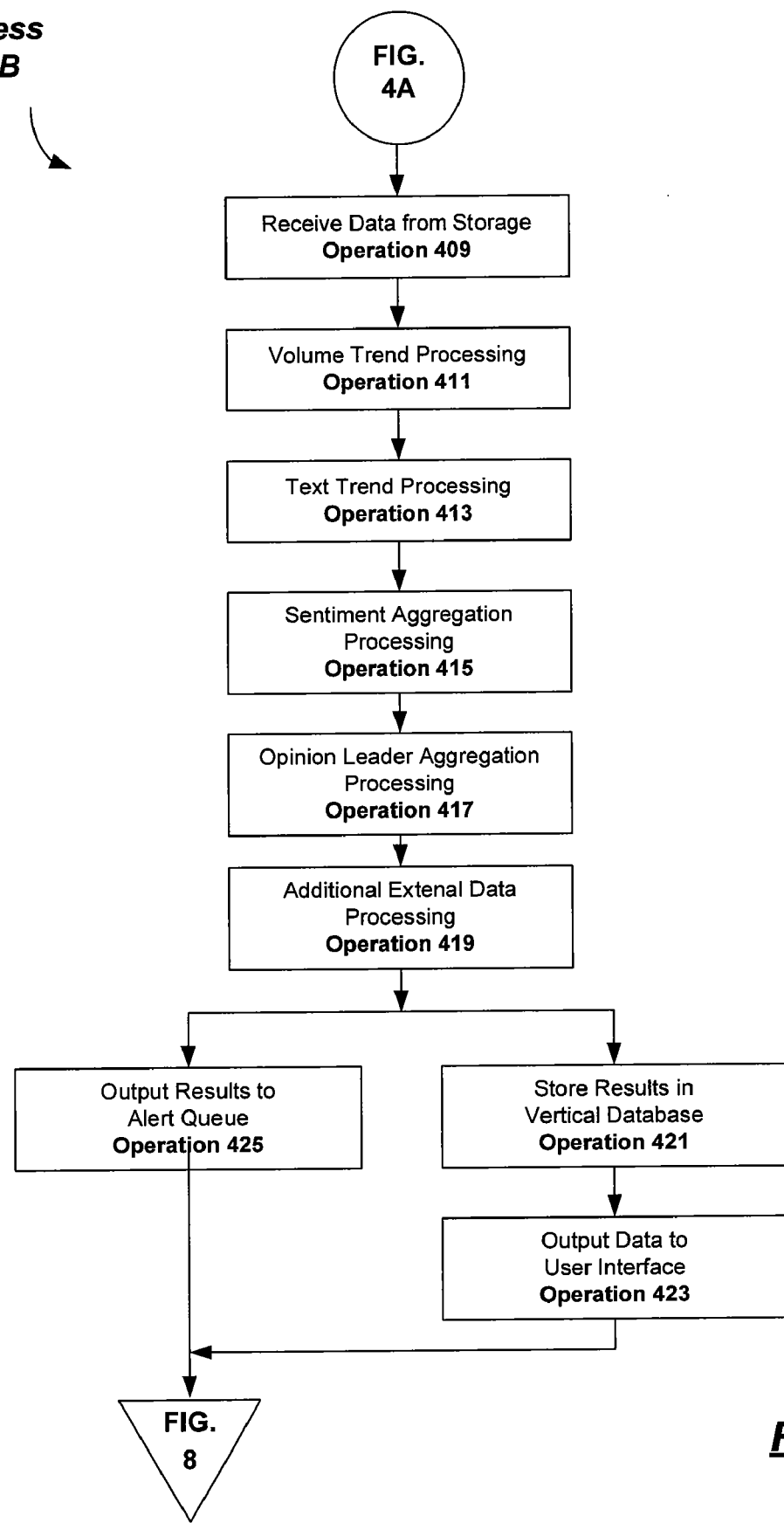
FIG. 4B illustrates additional vertical layer processing according to an exemplary embodiment of the invention.

FIG. 3 illustrates a block diagram of the vertical layer according to an exemplary embodiment of the invention. As discussed previously, the data collected using the scraping process 100 is fed into the vertical layer 300. The vertical layer 300 is a grouping based on sector, industry, or other category. A vertical layer may be generated for every conceivable category such as industry, topic of interest, type of website, geographic region, and so on. There is essentially no limit to the types of categories that can be harvested, aggregated and quantified to provide relevant, timely and actionable information to users of the SMA platform. The block diagram components of the vertical layer 300 will be discussed in conjunction with process 400A of FIG. 4A and process 400B of FIG. 4B. FIG. 4A illustrates vertical layer processing according to an exemplary embodiment of the invention and FIG. 4B illustrates additional vertical layer processing according to an exemplary embodiment of the invention.

Figure 4C:
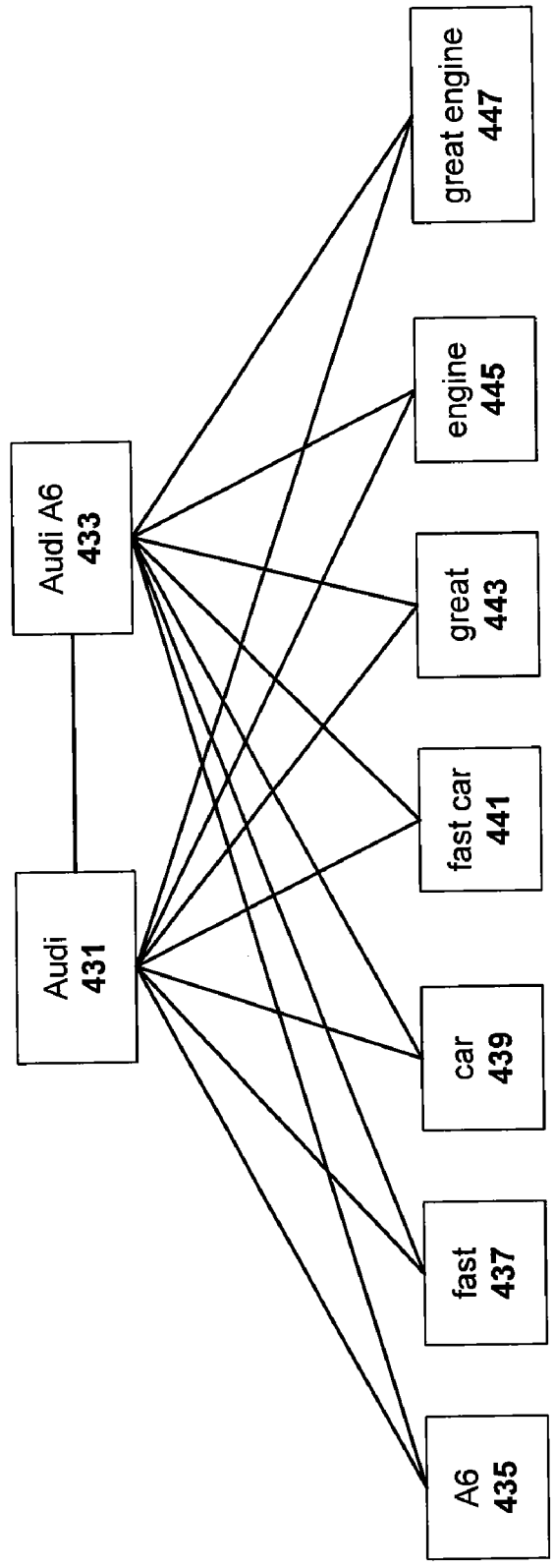
FIG. 4C illustrates text edge parsing for an individual sentence according to an exemplary embodiment of the invention.
Figure 4D:
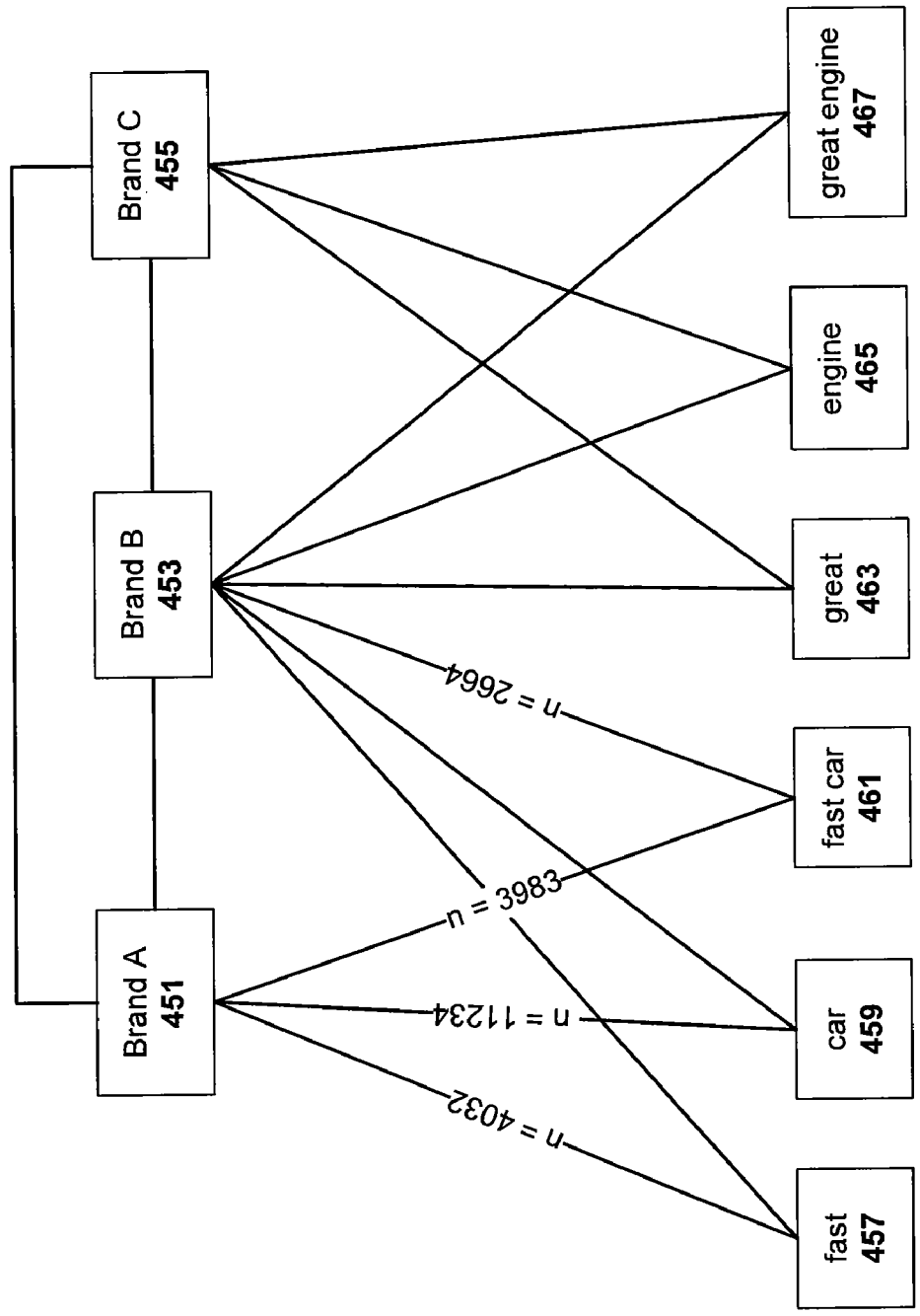
FIG. 4D illustrates an excerpt from an aggregated term graph according to an exemplary embodiment of the invention.

Process 400A begins with receiving data 145 at processing module 301 from storage (operation 401). The data 145 received from storage is the output data 145 from FIG. 1B including the raw content data from raw content data storage 133, the raw content metadata from raw content metadata storage 135, and the social graph data from social graph storage 141. Process 400A continues with performing text edge processing on the raw content data from raw content data storage 133 and the raw content metadata from raw content metadata storage 135 (operation 403). Text edge processing is performed using text edge processing module 303 of processing module 301. Text edge processing, in one embodiment, utilizes graph theory to analyze the terms and concepts contained within the online social media conversations to determine the frequency of occurrence of these terms and concepts in conjunction with the relevant brand, product or service and the relatedness of the concepts and/or terms in the post to that brand, product or service. Relationships between these terms are analyzed to determine graph edges which indicate the strength of these relationships. In a first step, a relevant sentence is parsed and split up into individual words and tuples of adjacent words. Stop words with little informational value such as "of," "it," "is" and so on are excluded in this step. Next, the relationship between the main term of interest (e.g. a brand, service or product name) and each found word or tuple is stored. FIG. 4C illustrates text edge parsing for an individual sentence according to an exemplary embodiment of the invention. In the illustrated embodiment, the sentence, "[t]he Audi A6 is a very fast car with a great engine," is parsed to determine relationships between the main terms of interest (Audi 431 and Audi A6 433) and each found word or tuple in the sentence (A6 435, fast 437, car 439, fast car 441, great 443, engine 445, and great engine 447). In FIG. 4C, the lines between the main terms of interest and each found word or tuple indicate that such a relationship exists. Each relationship is then counted as one instance of an "edge" between these connected objects. In the following aggregation step, the number of edges between objects is added up. The resulting frequency of edge occurrences is an indication of how closely two terms are connected. For instance, if the tuple "fast car" is used significantly more frequently in connection with car brand A than with car brand B (corrected by the total number of posts about each brand), we can assume that social media users perceive car brand A as a stronger producer of fast cars. FIG. 4D illustrates an excerpt from an aggregated term graph according to an exemplary embodiment of the invention. The number of edges between brands (brand A 451, brand B 453, and brand C 455) and each found word or tuple (fast 457, car 459, fast car 461, great 463, engine 465, and great engine 467) are added up to determine the frequency of edge occurrences. For example, in the illustrated embodiment, brand A 451 has a total of n=3,983 edge occurrences with respect to the tuple "fast car 461." In contrast, brand B 453 only has n=2664 edge occurrences with respect to the tuple "fast car 461." Thus, from the fact that the tuple fast car 461 is used significantly more frequently in connection with brand A 452 than with brand B 453 (corrected by the total number of posts for each brand), we can assume that social media users perceive brand A 451 as a stronger producer of fast cars than brand B 453. The data resulting from text edge processing module 303 of processing module 301 is then stored in text edge storage 307 (operation 405).

Sentiment rating processing is then performed using sentiment rating processing module 305 on the raw content data stored in raw content data storage 133, the raw content metadata stored in raw content metadata storage 135, and the social graph information stored in social graph storage 141 (operation 402). Sentiment rating processing includes analyzing the actual text of online social media conversations to find keywords, terms or phrases to determine if a particular post refers to the particular brand, product or service of interest. This helps to determine the sentiment about the brand, product or service. The input to sentiment rating processing module 305 includes the actual text of the social media post, lists of keywords, and so on. Industry-specific keywords are identified and a value or sentiment rating is assigned to each of these keywords. In at least certain embodiments, this processing includes natural language and sentence structure analysis to determine which parts of the text of a social media post apply to the particular brand, product or service. Once the keywords are identified, they are processed using a number of factors including how many times the keyword appears in the social media post, the closeness and linguistic context of the keyword in relation to the brand, product or service, and whether the keyword reflects a positive, negative, or neutral sentiment about the brand, product or service. This processing may also require balancing opposing keywords (e.g., both positive and negative keywords in the same post) to determine an overall sentiment rating of how positive, negative, or neutral the social media post is in relation to a brand, product or service.

Keywords are assigned with a positive and negative probability value each that express the probability that the keyword means something positive or negative in the context of the specific vertical. Since the same word can have different meanings per industry or topic, these probabilities can be specifically set per vertical. Also, some embodiments include a training or feedback loop where keywords may be re-rated over time based on experience. During the processing, terms of interest (brands, products, service names) and their synonyms are identified in the text of the social media post. In a next step, the environment (the closest n words) of this occurrence is searched for relevant sentiment keywords that might refer to the term of interest. Linguistic elements such as negations, comparatives, or enumerations are taken into account when determining the relevance of a sentiment keyword for the term of interest. Each occurrence of the term of interest is assigned with a sentiment score depending on the keywords in the environment, the linguistic modifiers present, the proximity of the keyword to the term of interest, and potentially reduced confidence due to ambiguities. Finally these atomic scores are added up for the whole post and corrected by the relevance of the post for the term of interest, i.e. the percentage of the post that actually refers to the term of interest.

This information is then combined with the social graph data from social graph storage 141 to determine a weighting factor of the social media post. That is, the sentiment rating processing of operation 402 takes into consideration the level of influence the author of the social media post has in determining the sentiment rating. A weighting factor is determined based on the influence of the author of the social media post. The resulting data from sentiment rating processing module 305 is then stored in the sentiment rating storage 309 (operation 404). Additionally, the sentiment rating data stored in sentiment rating storage 309 is aggregated over time in the sentiment aggregation queue 311 for sentiment trend processing to be discussed infra. This completes process 400A according to an exemplary embodiment and control flows to process 400B of FIG. 4B. In short, the sentiment rating is generated using a combination of natural language processing, statistical processing, positive/negative keyword modifiers and author and site influence.

Process 400B begins at operation 409 where data from storage is received at processing module 302 from storage. The data received from storage includes the social graph data 149 output from social graph storage 141 of FIG. 1B, the data from text edge storage 307, the data from sentiment rating storage 309, and the data from sentiment aggregation queue 311. At operation 411, volume trend processing is performed on the data from storage using volume trend processing module 313 of FIG. 3. The overall volume of opinions about users' brands, products or services is calculated and trends over time can be determined based on volume trend processing. Additionally, volume trends about competing brands and products or services can be provided in this operation. Basic volume is calculated using the number of occurrences of a brand, product or service name and its synonyms per unit of time (e.g., day, month, or year). The content authored in each unit of time is searched for the terms of interest, and the number of occurrences is added up per unit of time and per term. When plotted in a time series, these volume data points describe the volume trend for the brand, product or service. At operation 413, text trend processing is performed on the data. The text trend processing analyzes the text edge information stored in text edge storage 307 in conjunction with time information to determine text trends over time. This processing is used to determine how sentiment changes over time. At operation 415, sentiment aggregation processing is performed on the sentiment rating and aggregation data from storage using sentiment aggregation processing module 317 of FIG. 3. The sentiment aggregation processing module 317 determines the aggregation of sentiment over time for various sources (or groups of sources) such as relevant websites, blogs, My Space® pages, and et cetera. This information may then be used to compare online social media sources to determine which sources are more favorable for advertising a user's brands, products, or services. For example, this processing may determine a particular user's products or services are better advertised on My Space® instead of topic-specific blogs. Additionally, information can be gathered regarding which websites are initially more relevant for product releases, for example, and which websites are more relevant over time. This allows users of the SMA platform to follow these trends and to roll-out or switch advertising campaigns based on this information. Process 400B continues with opinion leader aggregation processing using opinion leader aggregation processing module 319 of FIG. 3 on the data from storage (operation 417). The opinion leader aggregation processing module 319 determines the aggregation of opinion leader data over time to determine trends in opinion leader data. This information may be valuable to users by enabling them to identify and target social media authors with the most influence to enter into conversations with these lead authors and influence their opinion to influence the opinions of many others.

At least certain embodiments include additional external data processing (operation 419). For example, sales data may be included in the trend processing using sales data processing module 321, traffic data may be included in the trend processing using traffic data processing module 323, and demographics data may be included in the trend processing using demographics processing 324. Sales data processing module 321 allows users to correlate the sales data with sentiment data over time. This can lead to predictions in sales volume data and pricing. Traffic data processing module 323 allows users to correlate the traffic data with sentiment data over time. Likewise, demographics processing 325 allows users to correlate demographics data with sentiment data over time. Other external data from users' database sources may also be included in the processing and correlated with sentiment data over time.

Figure 8:
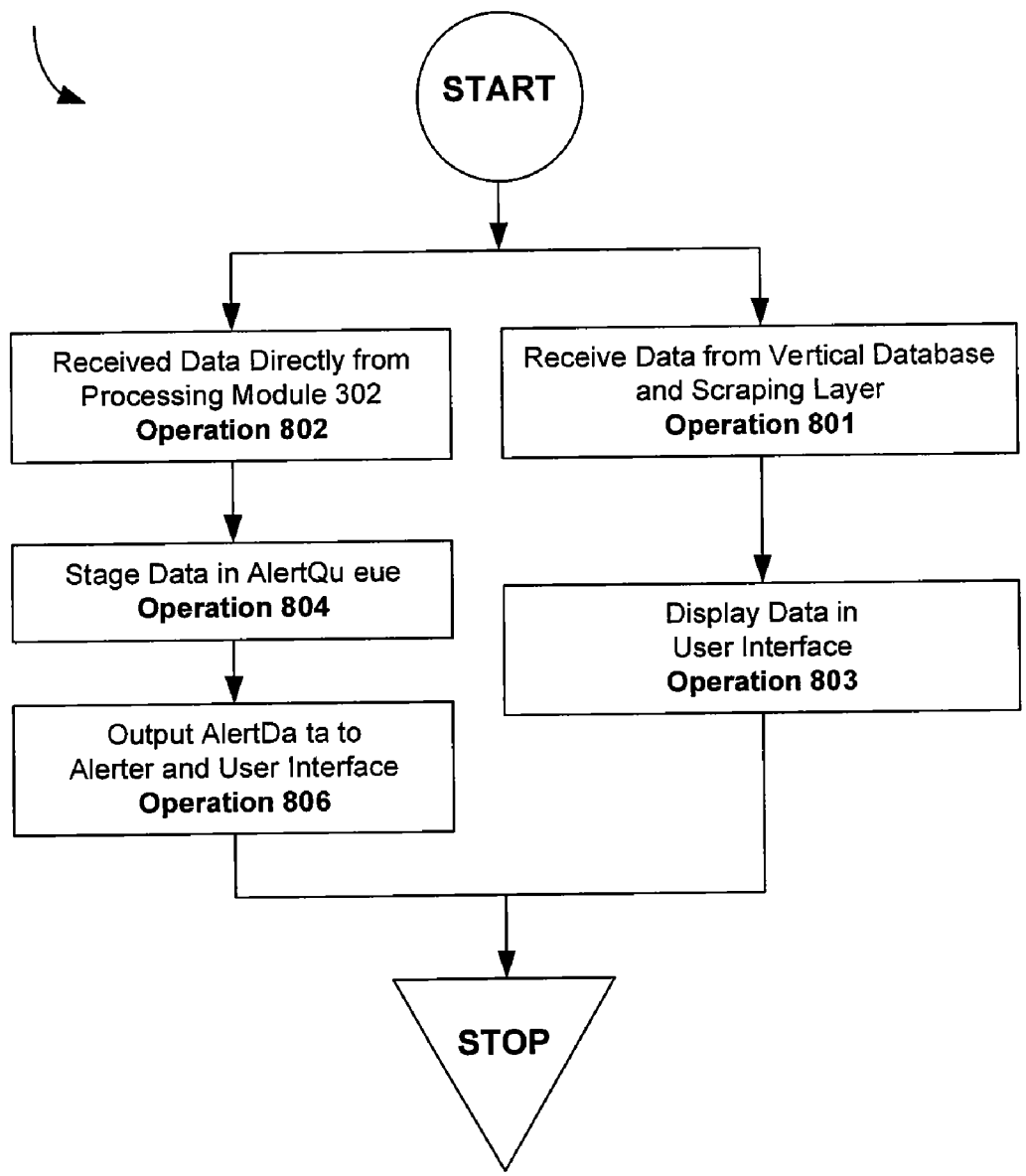
FIG. 8 illustrates presenting the aggregated and quantified online social media content to users of the social media analytics platform according to an exemplary embodiment of the invention.

Process 400B continues with storing the results of the above processing in a database referred to herein as the vertical database (operation 421), and sending this data as output data to the user interface 705 of the presentation layer 700 for display (operation 423). Additionally, the results of the above processing are also output to the alert queue 425 for user alerts when sentiment trends change above or below a certain threshold, for example (operation 425). This allows for constant, real-time monitoring of emerging trends and consumer sentiment. This completes the vertical layer processing according to an exemplary embodiment. Control flows to FIG. 8 where the output of the vertical layer 300 processing is fed into the presentation layer 700 for display to users of the SMA platform.

Figure 5:
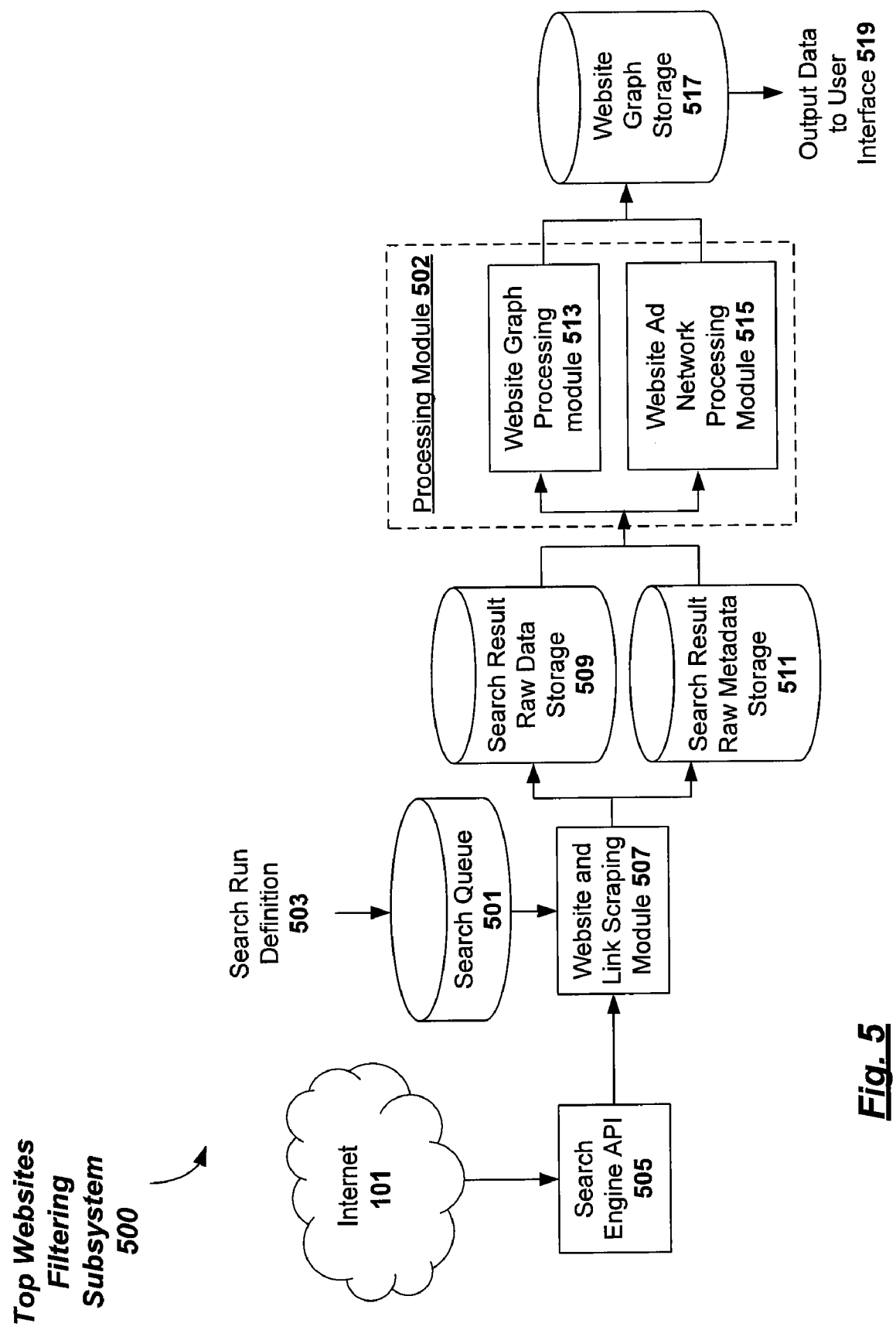
FIG. 5 illustrates a block diagram of the top websites filtering subsystem according to an exemplary embodiment of the invention.
Figure 6A:
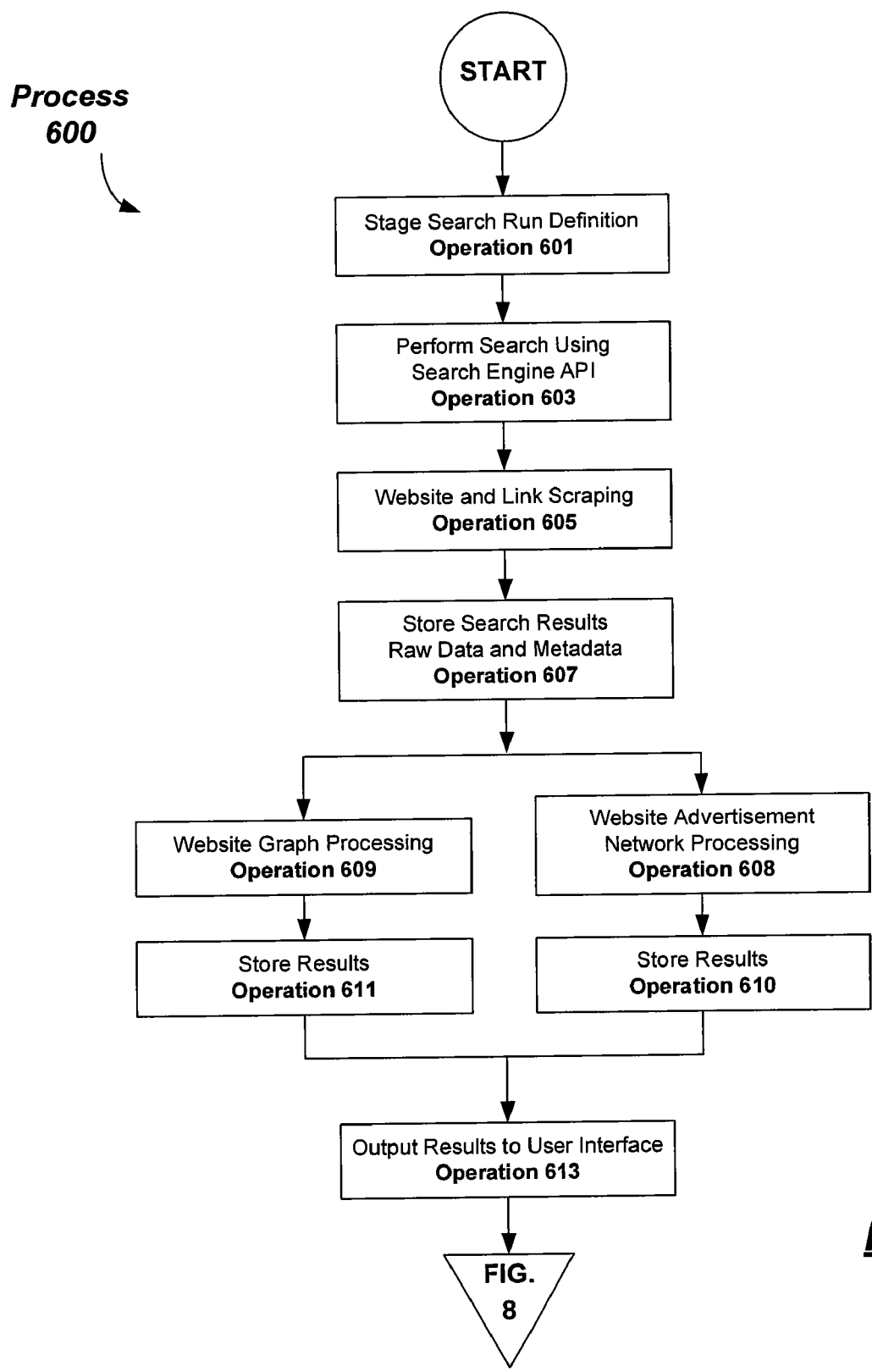
FIG. 6A illustrates performing top websites filtering according to an exemplary embodiment of the invention.

FIG. 5 illustrates a block diagram of the top websites filtering subsystem according to an exemplary embodiment of the invention. The top websites filtering subsystem 500 is considered a part of the vertical layer 300 and determines websites that are the most relevant to a particular user. Subsystem 500 performs one or more searches using a search engine API (such as Google, Yahoo or Technorati), pulls out search results from the search engine, and assembles the search results data to model search behaviors of search engine users so that a list of the most relevant websites for a users' brands, products or services can be compiled and provided to users of the SMA platform. This can provide users with a list of websites having a high affinity for the users' industry or products/services so that targeted advertising campaigns can be launched, for example. Interestingly, this may not always be the websites with the highest traffic volume. This information is also fed into the user interface 705 of the presentation layer 700. The block diagram components of the top websites filtering subsystem 500 will be discussed in conjunction with process 600 of FIG. 6A, which illustrates performing top websites filtering according to an exemplary embodiment of the invention.

Process 600 begins with staging one or more search run definitions 503 for processing in search queue 501 (operation 601). Search run definitions contain one or more brand or product names in combination with any number of other relevant keywords that a consumer might be searching for. One or more searches of the Internet 101 corresponding to the one or more search run definitions 503 staged in search queue 501 are then performed using one or more search engine APIs 505 (operation 603). The results of these searches are fed into website and link scraping module 507. Website and link scraping is then performed (operation 605) using the website and link scraping module 507. During this operation, the top websites filtering subsystem 500 actually goes into the websites found in the one or more searches and follows the website links within each of these websites. The websites found in the searches and the links within these websites is assembled for the purpose of attempting to model search engine users' behavior by determining which websites search engine users will likely visit when they run each of the one or more searches. In at least one embodiment, this information can provide users of the SMA platform with a list of websites with a high affinity for the users' industry or products/services. This information may be useful in a variety of circumstances including allowing users to launch targeted advertising campaigns. For example, the top websites filtering subsystem 500 may run a search in Google for digital cameras and determine that a typical search engine user will only look at the first 3 web pages listed in the search results. The top websites filtering subsystem 500 will then follow the links in these 3 web pages to find more web pages and then follow the links in those web pages, and so on. The top websites filtering subsystem 500 will assemble this information and use it to build up a website and link network graph discussed below. The raw search result data resulting from website and link scraping module 507 is then stored in search result raw data storage 509 and the metadata is stored in search result raw metadata storage 511 (operation 607) to be provided to processing module 502.

Figure 6B:
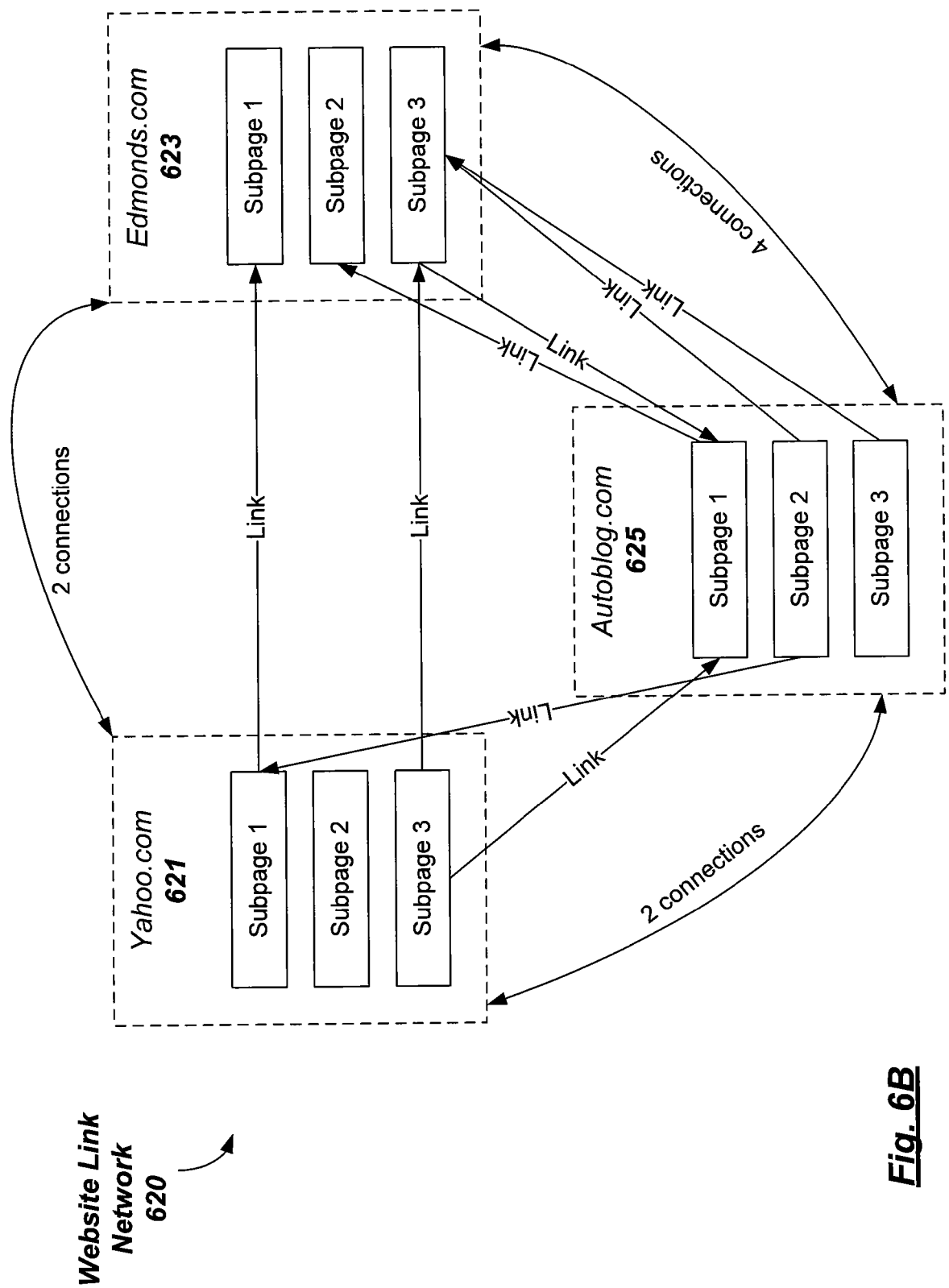
FIG. 6B illustrates an exemplary website link network according to one embodiment of the invention.
Figure 6C:
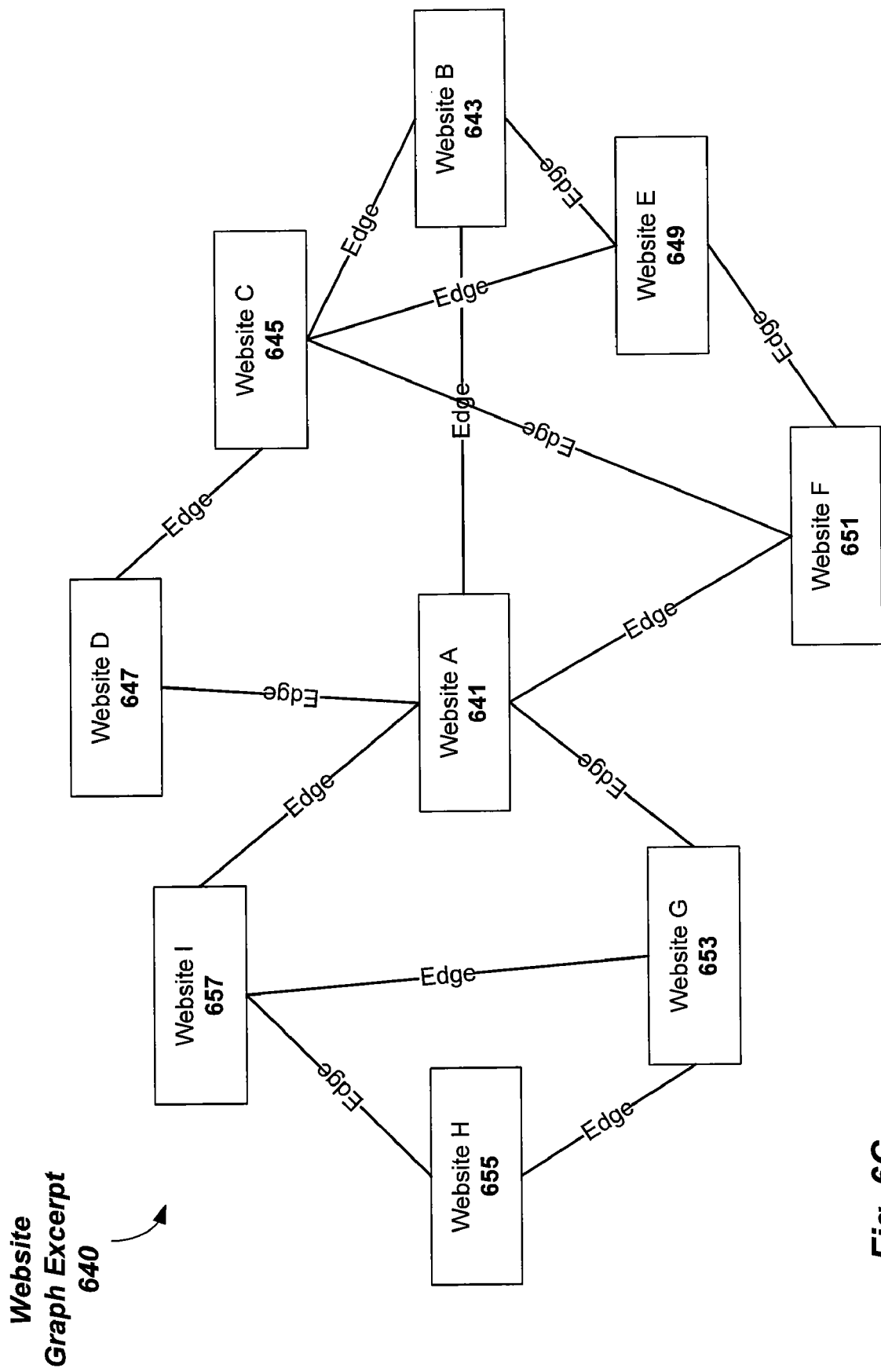
FIG. 6C illustrates an excerpt from a website graph according to an exemplary embodiment of the invention.

Process 600 continues with performing website graph processing (operation 609). In at least one embodiment, the website graph processing includes using graph theory to analyze the website network to determine the frequency of occurrence of each website in the website network in connection with the relevant brand, product or service and to determine the relatedness of each website in the website network to that brand, product or service. Relationships between these websites and the relevant brand, product or service are analyzed to determine graph edges which indicate the strength of these relationships. First, links between websites that contain content relevant to the brand, product or service are counted. The number of links between two websites provides an indication of how strongly the two websites are interconnected. FIG. 6B illustrates an exemplary website link network according to one embodiment of the invention. In the illustrated embodiment, website link network 620 includes three websites with links connecting to one another. In the example, there are two (2) connections between the websites Yahoo.com 621 and Edmunds.com 623 including a link from subpage 1 of Yahoo.com 621 to subpage 1 of Edmunds.com 623 and a link from subpage 3 of Yahoo.com 621 to subpage 3 of Edmunds.com 623. Likewise, there are four (4) connections between the websites Edmunds.com 623 and Autoblog.com 625 and two (2) connections between the websites Autoblog.com 625 and Yahoo.com 621 in the exemplary website link network 620. Once the number of links between each pair of websites is counted, a version of Brandes' Betweenness Centrality algorithm is applied to the resulting graph. This algorithm calculates centrality values that indicate how strongly connected a given website is to other relevant websites, either directly or indirectly. This is depicted in FIG. 6C which illustrates an excerpt from a website graph according to an exemplary embodiment of the invention. In the illustrated embodiment, website graph excerpt 640 includes lines representing "edges" where each "edge" is a connection between each pair of websites in the graph. Website A 641 is connected to website B 643, website D 647, website F 651, website G 653 and website I 647 within one (1) edge. Website A 641 is further connected to website C 645, website E 649 and website H 655 within two (2) edges. Therefore, website A 641 is connected to each other website within one or two edges, so it will receive a high centrality value in comparison to the other websites. Internet users that find any of the other websites in the graph when looking for information are very likely to end up on website A 641; therefore, it is assumed that website A 641 is highly relevant to this graph. In this manner websites that are the most relevant to a particular user of the SMA platform are located.

Figure 7:
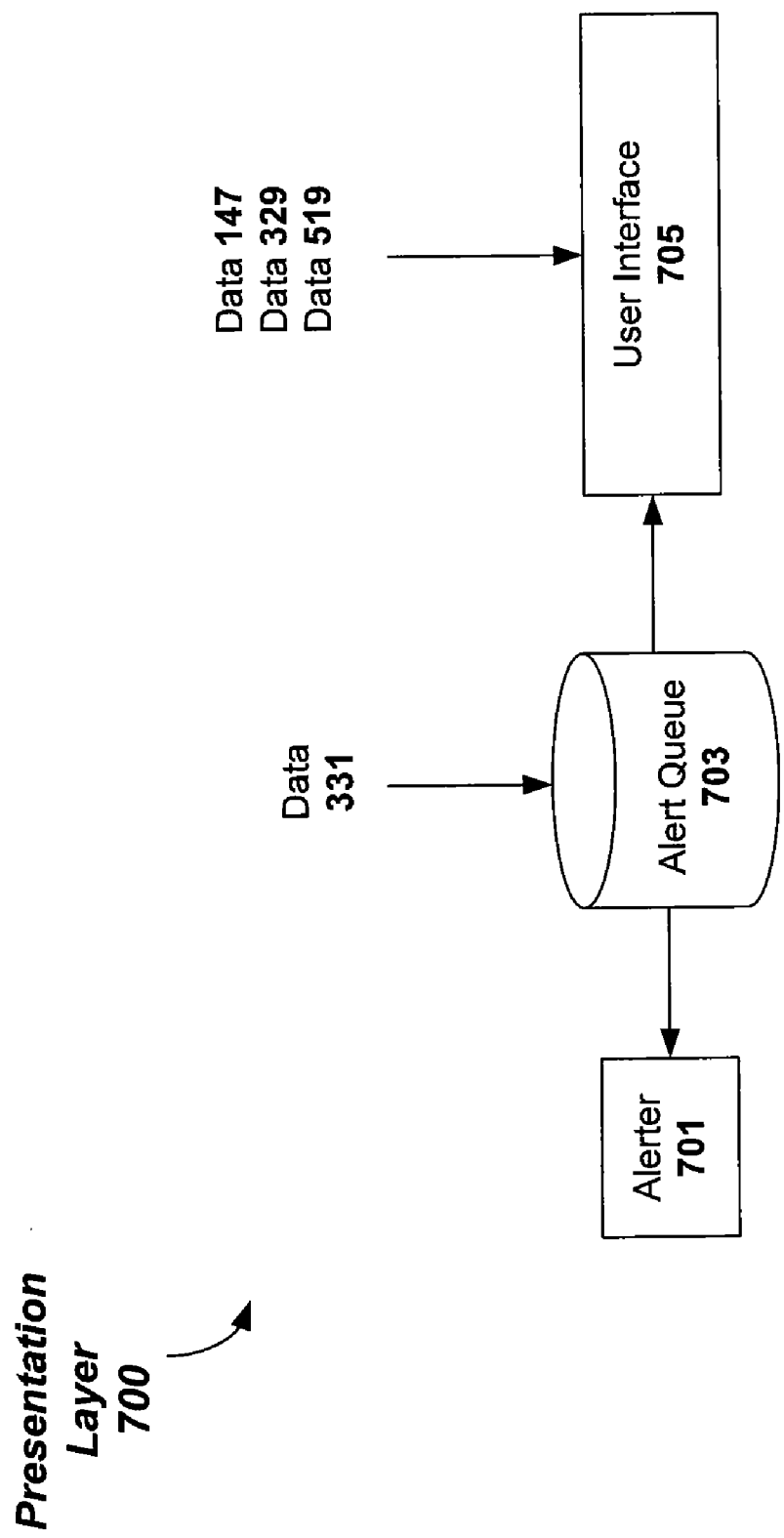
FIG. 7 illustrates a block diagram of the presentation layer according to an exemplary embodiment of the invention.

The resulting website network graph generated by the website graph processing module 513 is then stored in website graph storage 517 (operation 611) and the data 519 from the website graph storage 517 is output to the user interface 705 of the presentation layer 700 of FIG. 7 (operation 613). Process 600 continues at operation 608 where website advertisement network processing is performed using website ad network processing module 151. The website advertisement network processing, in at least certain embodiments, uses typical link patterns to identify advertisement networks that put advertisements on the analyzed websites. Since each advertisement network uses a particular type of software to provide advertisement banners, sponsored text links or other forms of online advertising, the resulting link patterns identify each advertisement network. Each website might carry advertisements from one or multiple networks, or no advertising at all. The website advertisement network processing is performed to provide users of the SMA platform with information as to which advertisement networks are the most relevant for advertising their brands, products, or services. The resulting website advertisement network information generated by the website ad network processing module 515 is also stored in website graph storage 517 (operation 610) and output to the user interface 705 of the presentation layer 700 in FIG. 7 (operation 613). This completes the top websites filtering process 600 according to an exemplary embodiment. In short, the top websites filtering subsystem 500 is used to locate websites users of the SMA platform are most likely to reach when searching online for information about a particular brand, product or service.

FIG. 7 illustrates a block diagram of the presentation layer according to an exemplary embodiment of the invention. The results of the vertical layer 300 processing and the top websites filtering subsystem 500 processing are fed into the presentation layer 700. In the illustrated embodiment, data 147 of FIG. 1B, data 329 of FIG. 3, and data 519 of FIG. 5 are each fed into user interface 705. That is, the raw social media content stored in raw content data storage 133, the social graph stored in social graph storage 141, the data stored in vertical data base 327, and the website graph and website ad network data stored in website graph storage 517 are fed into the user interface 705. Likewise, the data 331 including the results of the processing performed within processing module 302 of FIG. 3 is fed into the alert queue 703. The user interface 705 may be a GUI, some embodiments of which are discussed infra. The block diagram components of the presentation layer 700 will be discussed in conjunction with process 800 of FIG. 8, which illustrates presenting the aggregated and quantified online social media content to users of the SMA platform according to an exemplary embodiment of the invention.

Process 800 begins by receiving the data stored in the vertical database 327 of the vertical layer 300 in FIG. 3, receiving the data stored in the social graph storage 141, and receiving the data stored in the raw content data storage 133 of the harvesting layer 100 in FIG. 1B (operation 801). This data is received and displayed in the user interface 705 (operation 803). Process 800 also includes receiving data directly from the results of the processing performed in processing module 302 of FIG. 3 (operation 802). This data is received and staged in the alert queue 703 (operation 804) to be output to the alerter 701 and the user interface 705. Among other things, the alerter 701 is used for alerting users of the SMA platform of real-time or near real-time changes in user sentiment regarding their brands, products, or services. This completes process 800 according to an exemplary embodiment.

Some of the advantages of the social media analytics platform are that embodiments provide: brand/product/service-level analytics including websites frequently talking about the relevant brand, product or service; social media authors frequently talking about the brand/product/service; overall volume of opinions about the brand, product or service; overall sentiment towards the brand, product or service; volume and sentiment of opinions about competing brands, products or services; competing brands, products or services most frequently mentioned in connection with the users' own brand, product or service; terms used most frequently in connection with a brand, product or service; and trends and early-warning alerts for all of the above. Embodiments also provide site-level analytics including site traffic (unique visitors and pages viewed), topic distribution of site, overall sentiment towards a given brand, product, service or technology, number of active or contributing users, relevance of the active users, relationships to other relevant sites, and trends in all of the above. Finally, embodiments provide user-level analytics (users referred to here are participants in social media sites) including: sites on which users contributed content; known identities of users, users' registrations in social networks; influence of users; users' known ownership and/or use of a given product, service or technology; users' sentiment toward a given brand, product, service or technology; users' known demographic and geographical attributes; and trends in all of the above.

In at least certain embodiments, a GUI is utilized to present the quantified and analyzed online social media content in a manner relevant to the user. The GUI may be fully customizable giving users the ability to select which charts and graphs should appear on the login page of the interface. The GUI provides an intuitive display to visualize brand, product or service sentiment over time. This display is a quantitative measure of opinion or sentiment for a brand, product, services, or its competitors and is derived from an automated aggregation of sentiment ratings on each individual post to online social media about a brand, product, services and/or those of their competitors. The GUI includes various knobs or switches to manipulate the above information in a variety of ways. Among many other things, inside the GUI users can filter information by product/service or competitor, groups of websites, data ranges, or drill down to the lowest level of granularity of the information to see the actual text of online social media posts as it appears on the originating source website. The GUI provides a visualization that allows users to give context to each social media post and gain familiarity with the posting website. The GUI is designed to be used by non-expert users without help from consultants. The GUI not only provides standard spreadsheet-style visualization such as bar and pie charts, but also highly innovative approaches including: radar screen; heatmaps; geographical visualization; 3D clustering, tag clouds, and timelines. Content may be harvested from as far back as sources make available. For example, discussion boards can have posts from many years ago. The start date on the GUI is configurable and is designed for ease-of-use allowing for a visualization of the underlying data calculations and aggregations instead of simply raw data.

Figure 9:
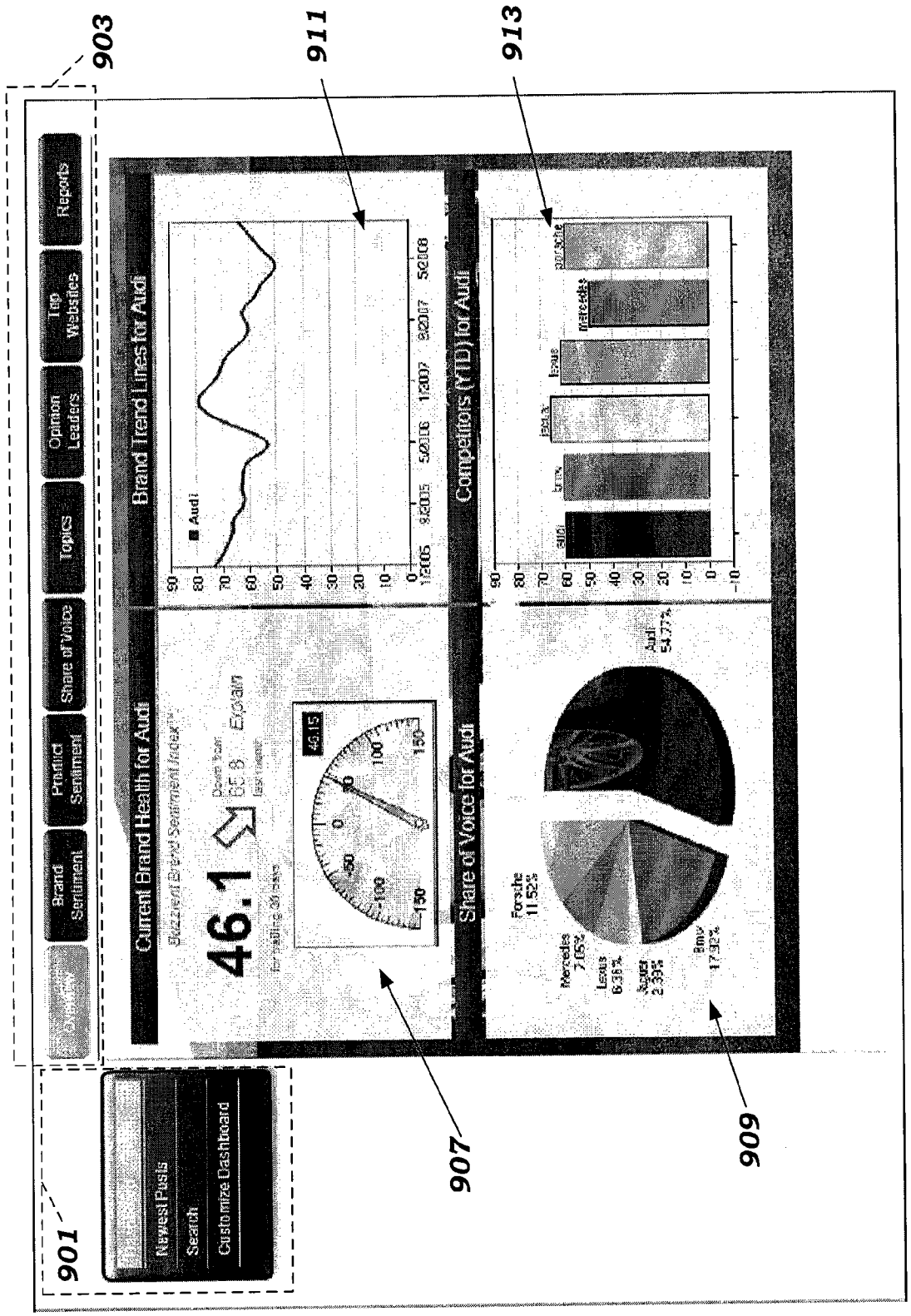
FIG. 9 illustrates a dashboard display in a graphical user interface according to an exemplary embodiment of the invention.

FIG. 9 illustrates a dashboard display in a graphical user interface according to an exemplary embodiment of the invention. The GUI display includes top-level menus and submenus. Top-level menus take users to main measurement categories. Submenus take users to more detailed information about the main measurement category. In the illustrated embodiment, the "overview" category is selected from top-level menu 903 and the "dashboard" category is selected in the submenu 901. The dashboard display provides a quick view into key measures of social media participation in users' particular brands, products, or services. It displays four (4) small reporting charts on one screen as a way for users to quickly see key measurements about their brand, product or service.

The dashboard may be customized according to the users' needs. The dashboard display in FIG. 9 includes: a brand sentiment index gauge 907 in the upper left corner; a brand trend line graph 911 in the upper right corner; a share of voice chart 909 in the lower left corner; and a brand sentiment chart 913 in the lower right corner. The brand sentiment index gauge 907 tells how positively or negatively social media participants are talking about users' brands, products, or services. The brand sentiment index gauge 907 reflects this online activity for the current month. They value of zero (0) means neutral sentiment. Positive values of 20 or above are typically very good. The brand trend line graph 911 shows how social media participant attitudes and opinions for a user's brand, product or service have changed over time. This enables users to see how sentiment has responded to various events such as advertising campaigns, programs and product launches. The share of voice chart 909 indicates the percentage of social media posts referring to the users' brands in comparison with their competitors. This allows users to gain important insight into the relative activity the users' brands are generating in online social media. The brand sentiment chart 913 displays users' annualized sentiment index in comparison with the indices of users' competitors for the current year. Clicking on a chart in the dashboard display takes users to the full-screen version (except for the sentiment index gauge 907). In one embodiment, each user can customize the dashboard by selecting the charts the user wishes to see by default.

Figure 10:
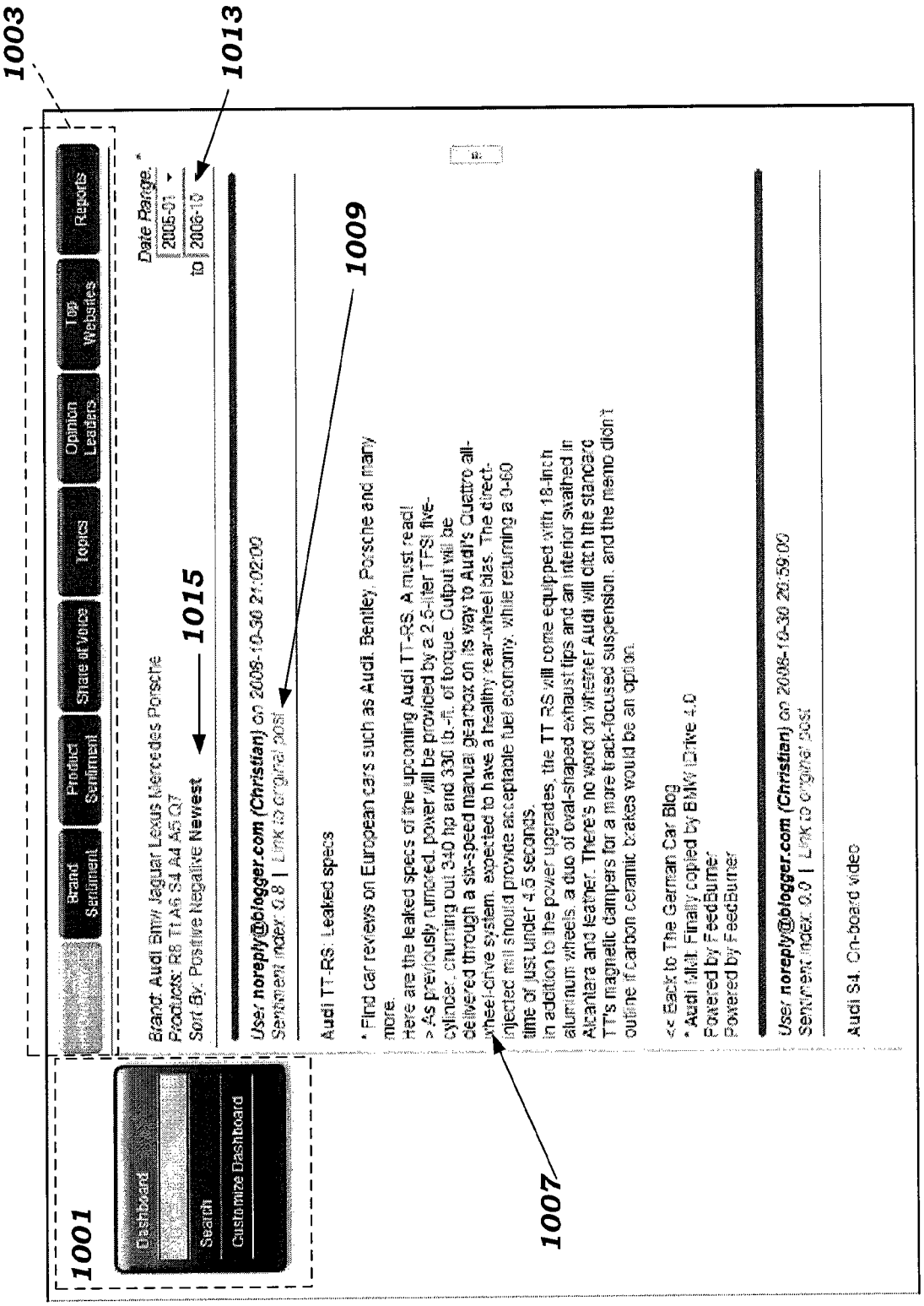
FIG. 10 illustrates a newest posts display in a graphical user interface according to an exemplary embodiment of the invention.

FIG. 10 illustrates a newest posts display in a graphical user interface according to an exemplary embodiment of the invention. In the illustrated embodiment, the "overview" category is selected in top-level menu 1003 and the "newest posts" category is selected in the submenu 1001. The newest posts display is a view of user posts 1007 filtered to show the newest posts. Different filters may be selected such as positive, negative or neutral posts 1015, product/service-level posts, different date ranges 1013, or to see posts for competitive brands, products, or services. Users can select the latest content and/or to see posts according to other parameters. Additionally, the newest posts menu includes a "link to original post" 1009 capability that allows users to see content as it appears in the originating site. This can help give context to the post and let users gain familiarity with the website containing the post. Linking to the original post takes users to the content in the originating site. For example, clicking on the link to original post 1009 takes users to the post as it appears on the website such as that shown in FIG. 11, which illustrates an online social media post as it appears in its originating site according to an exemplary embodiment of the invention.

The GUI also enables users to perform keyword searches and displays a listing of the keyword search results. FIG. 12 illustrates a search results display in a graphical user interface according to an exemplary embodiment of the invention. In the illustrated embodiment, the "overview" category is selected in top-level menu 1203 and the "search" category is selected in the submenu 1201. The search feature allows users to execute ad hoc searches for posts to online social media using keywords 1211 and clicking on the search 1207 button. The search may be constrained by date range 1209 if desired. The results of the search are shown in the summaries 1205 of the list of matches. The full post content can be seen by clicking on the summary 1205 in the list of matches.

Figure 13:
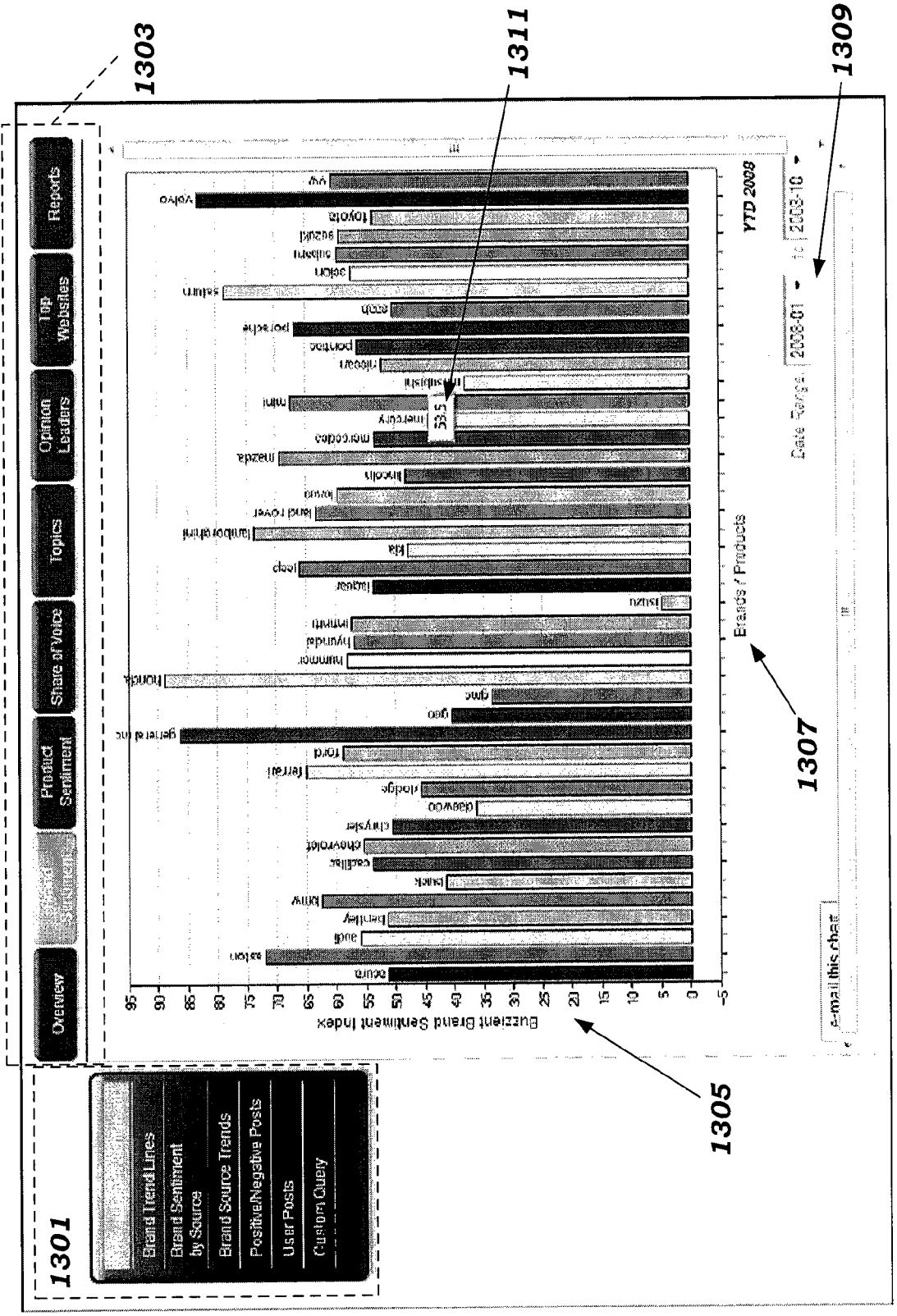
FIG. 13 illustrates an overall brand sentiment menu display in a graphical user interface according to an exemplary embodiment of the invention.
Figure 14:
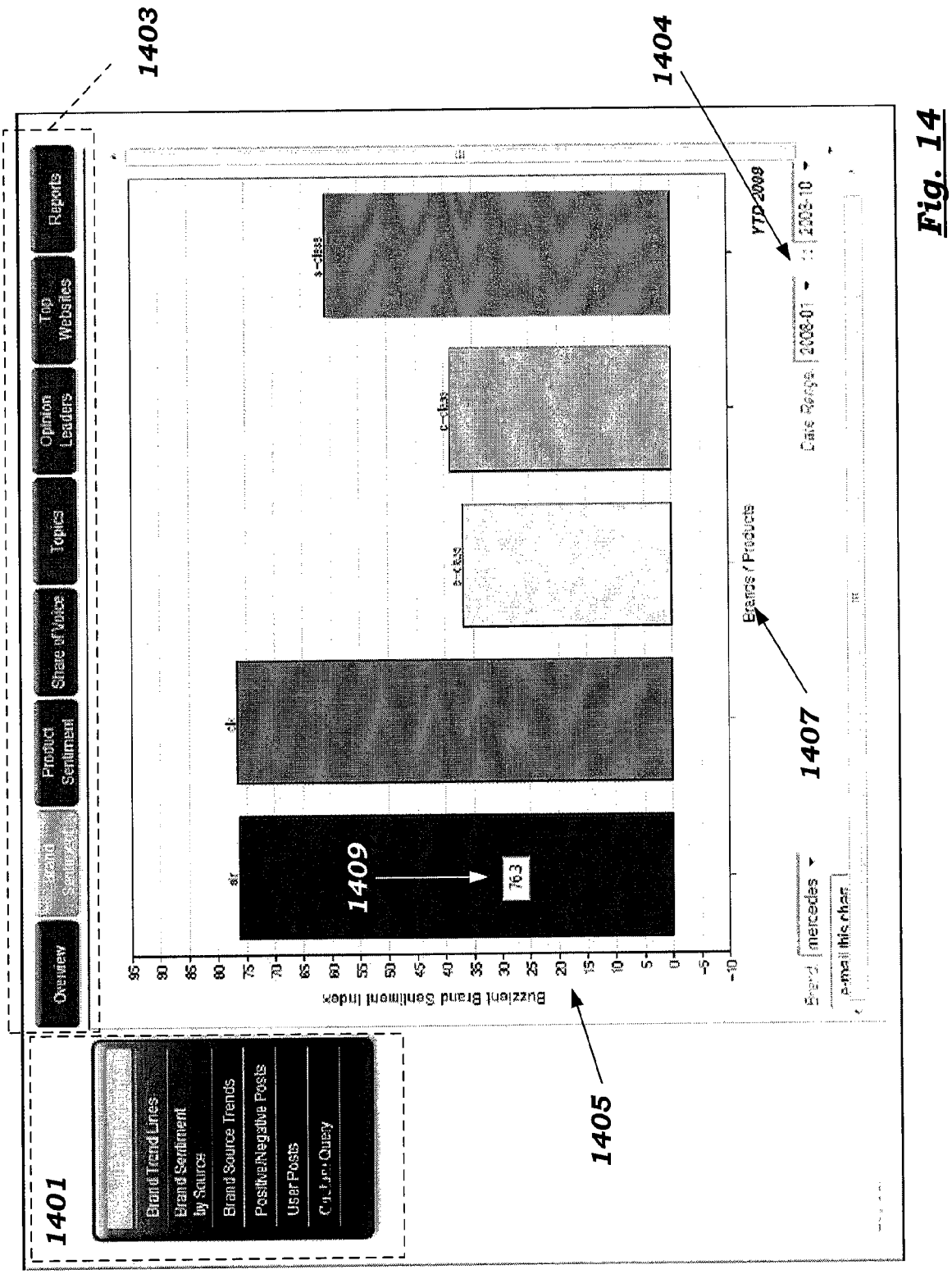
FIG. 14 illustrates a products or services sentiment display in a graphical user interface according to an exemplary embodiment of the invention.

FIG. 13 illustrates an overall brand sentiment menu display in a graphical user interface according to an exemplary embodiment of the invention. In the illustrated embodiment, the "brand sentiment" category is selected in top-level menu 1303 and the "overall brand sentiment" category is selected in the submenu 1301. As discussed above, the brand sentiment index for brands, products or services and competitors is a quantitative measure of opinion. This index is an aggregation of automated sentiment ratings on each individual post to online social media about the brand, products, services or those of a competitor. A combination of natural language processing, statistical processing, positive/negative keyword modifiers and author and site influences may be used to rate each post to online social media. In at least certain embodiments, the index is based on a scale from −150 to +150 where zero (0) equals neutral opinion, +150 reflects extreme positive sentiment, and −150 reflects extreme negative sentiment. Values above +20 are typically good. This bar chart is a comparative display of the brand's sentiment index with respect to the competition (based on year-to-date sentiment). The overall brand sentiment chart provides a quick assessment of opinion about the brand relative to the opinion about the brands of competitors. The x-axis 1305 reflects the brand sentiment index values and the y-axis 1307 reflects a list of brands, products or services. The chart displays year-to-date sentiment by default, but users can select a narrower date range 1309 if desired. Holding a mouse over a bar in the graph causes the display of the year-to-date sentiment index 1311. Clicking on a bar in the graph drills down to show sentiment for the brand's products or services as shown in FIG. 14 which illustrates a products or services sentiment display in a graphical user interface according to an exemplary embodiment of the invention. In the illustrated embodiment, the "brand sentiment" category is still selected in top-level menu 1403 and the "overall brand sentiment" category is still selected in the submenu 1401 (even though the products or services sentiment for the particular brand is displayed). The x-axis 1405 reflects the brand sentiment index values and the y-axis 1407 reflects the brands, products or services. Holding the mouse over a bar in the graph displays the year-to-date sentiment index 1409. Clicking on the bar in the graph drills down to show the actual posts to online social media for the brands, products or services. The chart displays year-to-date sentiment by default, but users can select a narrower date range 1404 if desired.

Figure 15:
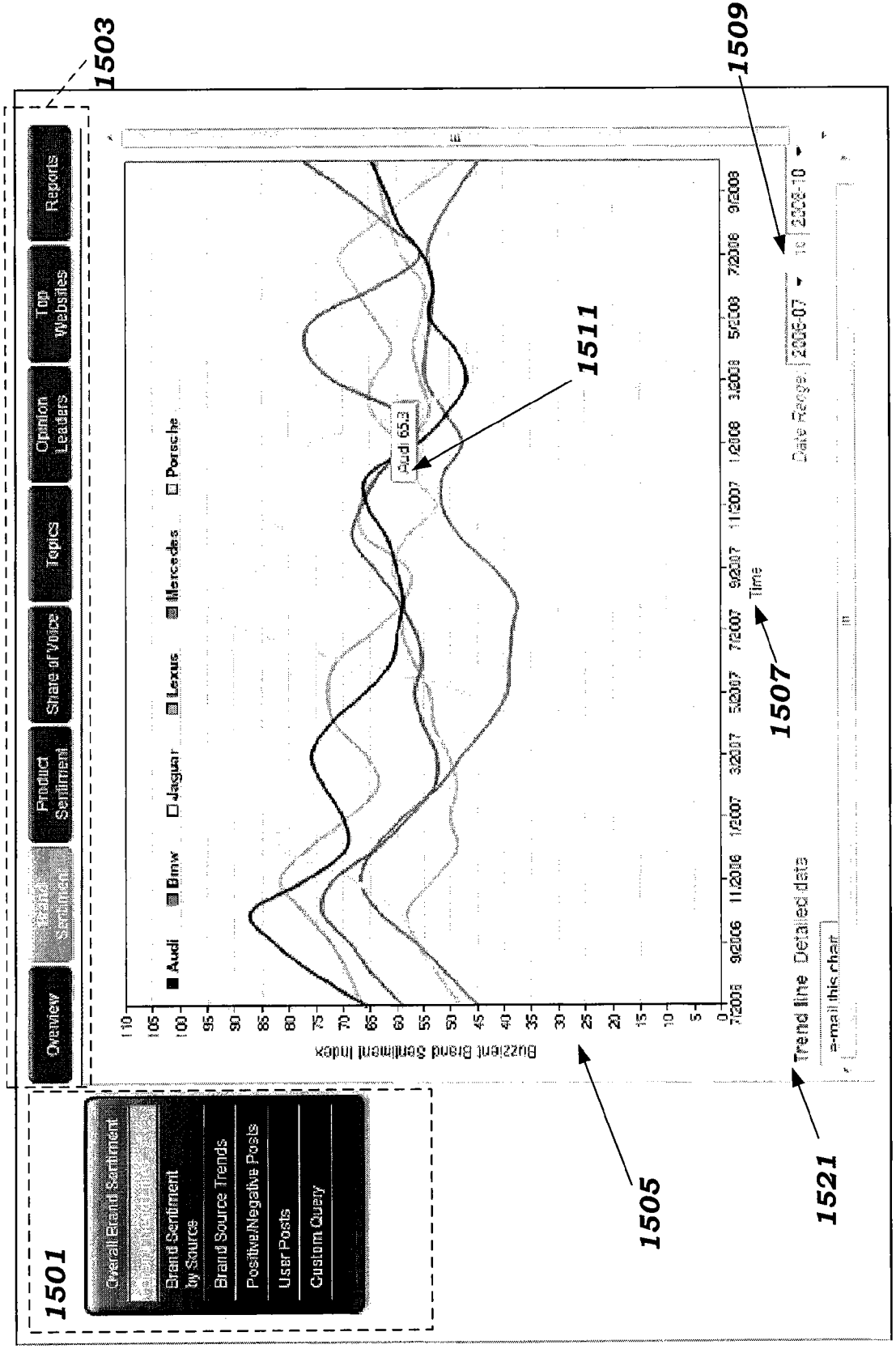
FIG. 15 illustrates a smoothed view of a brand trend lines display in a graphical user interface according to an exemplary embodiment of the invention.
Figure 16:
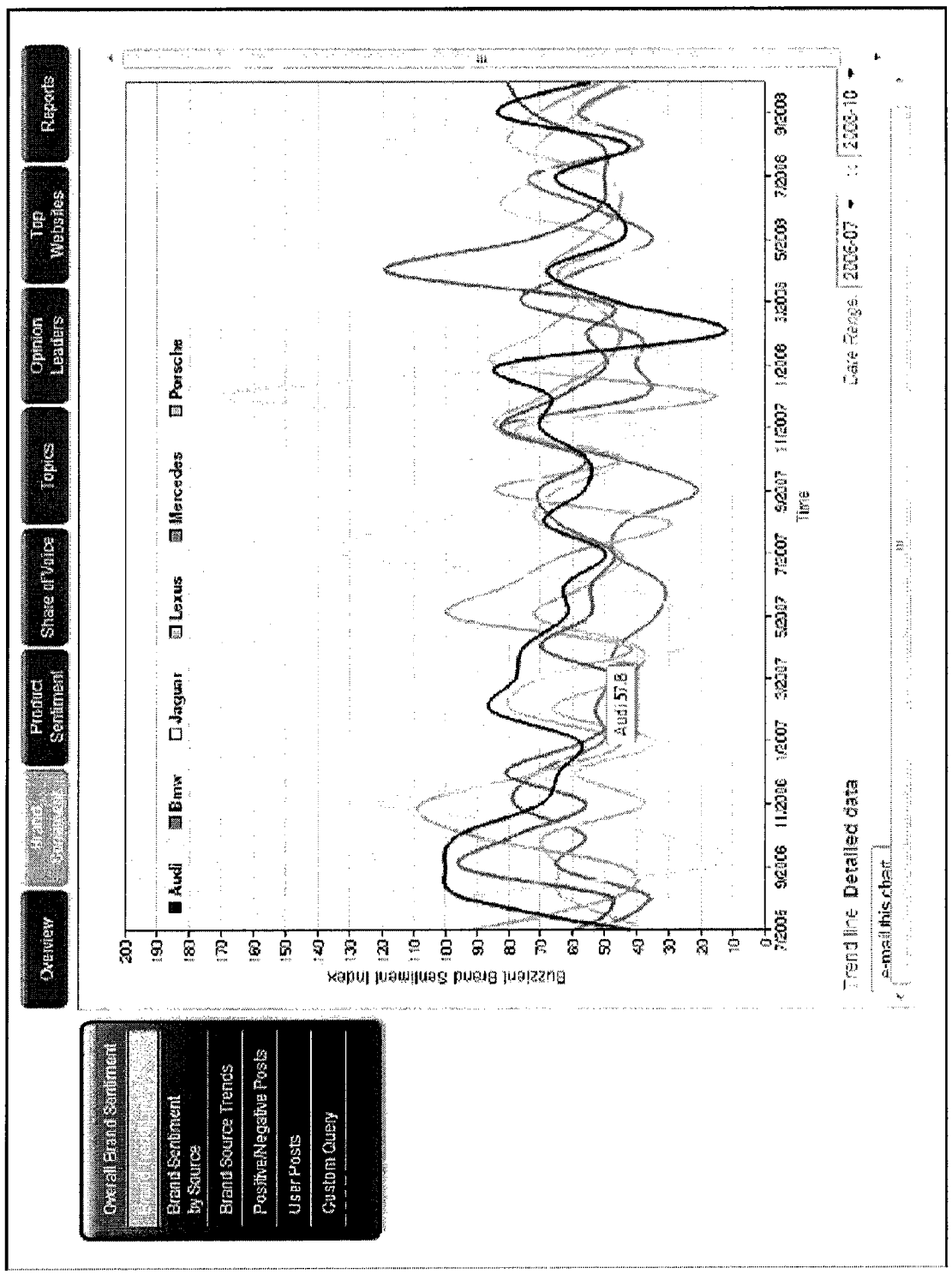
FIG. 16 illustrates a detailed view of a brand trend lines display in a graphical user interface according to an exemplary embodiment of the invention.

FIG. 15 illustrates a smoothed view of a brand trend lines display in a graphical user interface according to an exemplary embodiment of the invention. In the illustrated embodiment, the "brand sentiment" category is selected in the top-level menu 1503 and the "brand trend lines" category is selected in the submenu 1501. The x-axis 1505 reflects the brand sentiment index values and y-axis 1507 reflects the months in selected date range 1509. This is a graph that shows how sentiment for the brand and competition has trended over time. Users can reference historical changes in opinion to external events, campaigns, and et cetera. This can enable back-testing on how campaigns have affected sentiment of social media participants. Users may select a different date range 1509 to assess a narrower or different period of time. Selecting the "trend line/detailed data" button 1521 toggles between the trend line or "smoothed" view that enables easier viewing with no jagged lines and the "detailed data" view which shows all the peaks and valleys rather than smoothing the graph. The detailed data view is shown in FIG. 16 which illustrates a detailed view of a brand trend lines display according to an exemplary embodiment of the invention. Mousing over lines at month intersections displays the sentiment index 1511 for that month. Clicking on lines at month intersections allows users to view the actual posts for that month. Users may view the positive or negative post content for that month depending upon whether sentiment was positive or negative for that month. This capability allows users to assess opinions at a particular point in time and ascertain why sentiment was trending in a particular way.

Figure 17:
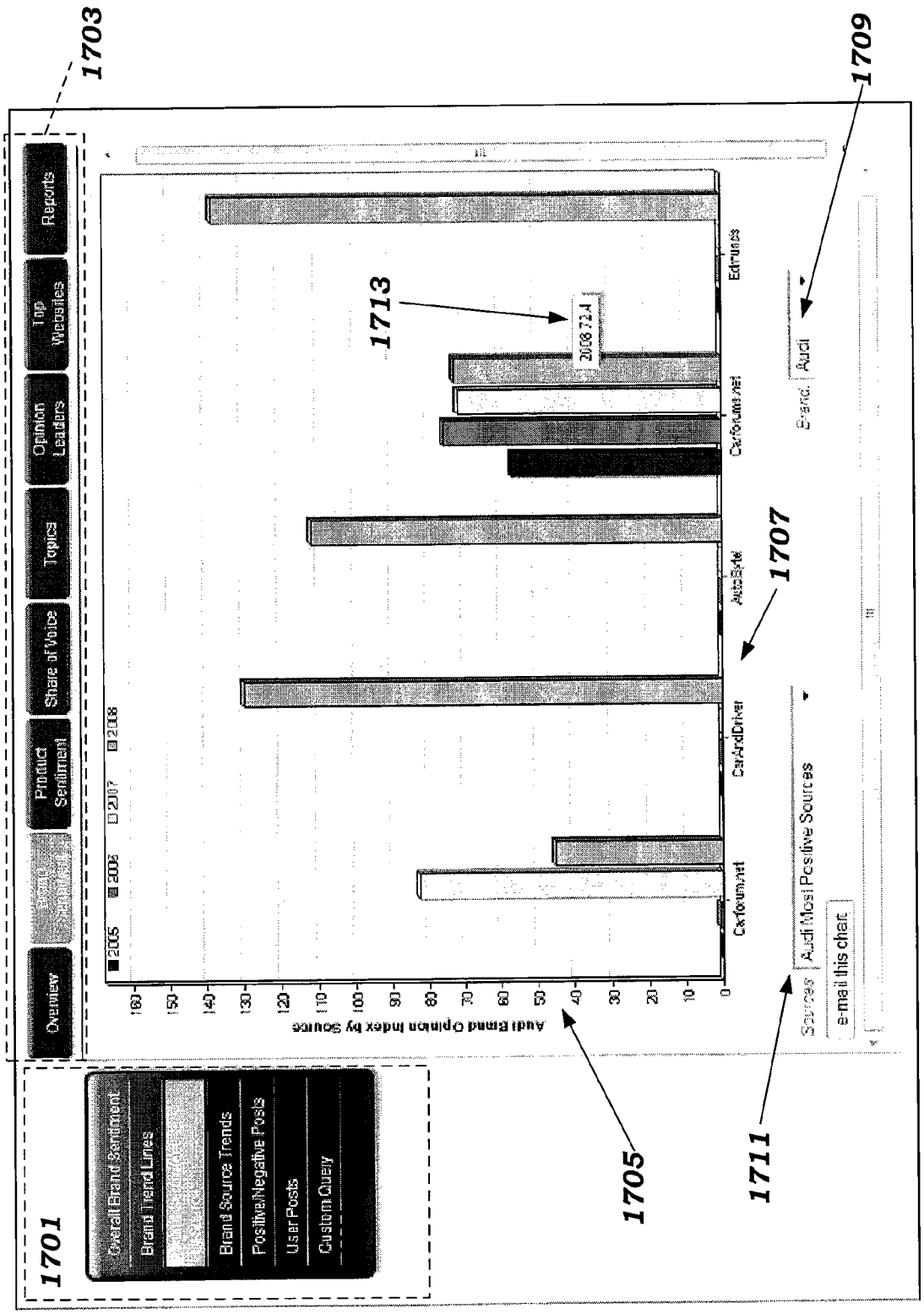
FIG. 17 illustrates a brand sentiment by source menu display in a graphical user interface according to an exemplary embodiment of the invention.

FIG. 17 illustrates a brand sentiment by source menu display in a graphical user interface according to an exemplary embodiment of the invention. In the illustrated embodiment, the "brand sentiment" category is selected in the top-level menu 1703 and the "brand sentiment by source" category is selected in the submenu 1701. The x-axis 1705 reflects the brand opinion value by source and the y-axis 1707 reflects the sources. This is a bar chart showing sentiment indices for the brand by source grouping so users can see how sentiment various by online social media sites. Source groupings may be selected using drop-down menu 1711. By default the drop-down menu includes most active, most positive, and most negative source groups for the brand and competitors. In at least certain embodiments, source groups are user-configurable to give flexibility to create appropriate groupings so users can select a different source group and/or brand to view how sentiment differs. For example, it might be valuable to define source groups such as "mainstream media blogs," "industry forums," "fan sites," and et cetera. Mousing over a bar displays a sentiment index value 1713 for that source. Clicking on a bar takes the user a level deeper to display sentiment indices for the brand's products or services for that particular source as depicted in FIG. 18.

Figure 18:
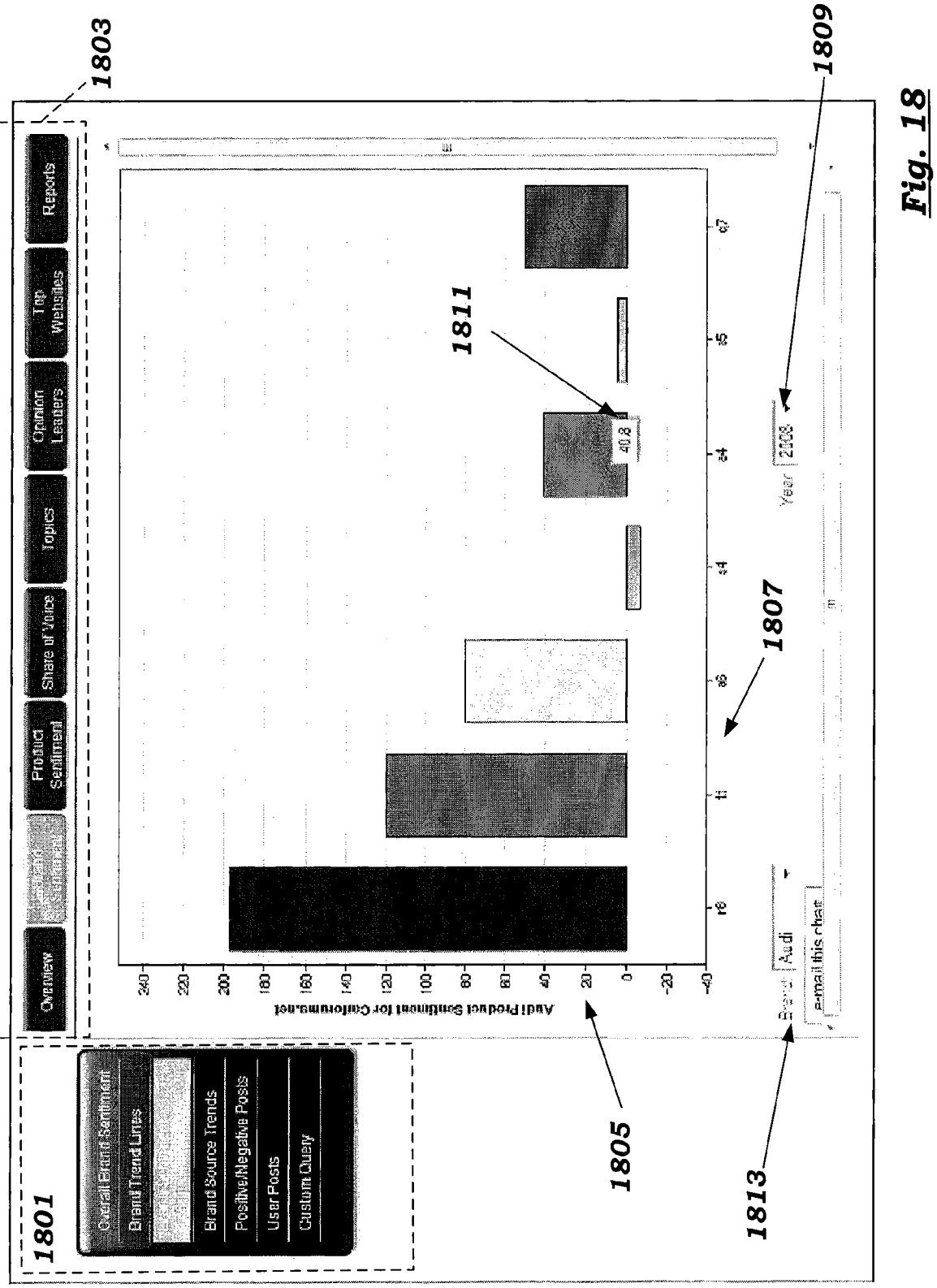
FIG. 18 illustrates a display of sentiment indices for a brand's products or services for a particular source in a graphical user interface according to an exemplary embodiment of the invention.

FIG. 18 illustrates a display of sentiment indices for a brand's products or services for a particular source in a graphical user interface according to an exemplary embodiment of the invention. In the illustrated embodiment, the "brand sentiment" category is selected from the top-level menu 1803 and the "brand sentiment by source" category is selected from the submenu 1801 (even though the sentiment indices for the brand's products or services for a particular source are displayed). The x-axis 1805 reflects the product or service sentiment for that particular source and the y-axis 1807 reflects the products or services. Users may select a different brand 1813 to view how sentiment differs depending on the source. Mousing over a bar in the display shows the numeric sentiment index value 1811 for that product or service for the particular source in the associated date range 1809. Clicking on a bar in the display drills down to a listing of the online social media posts specific to the product or service and to the source. That is, only the posts from the particular source relating to that particular product or service are listed.

Figure 19:
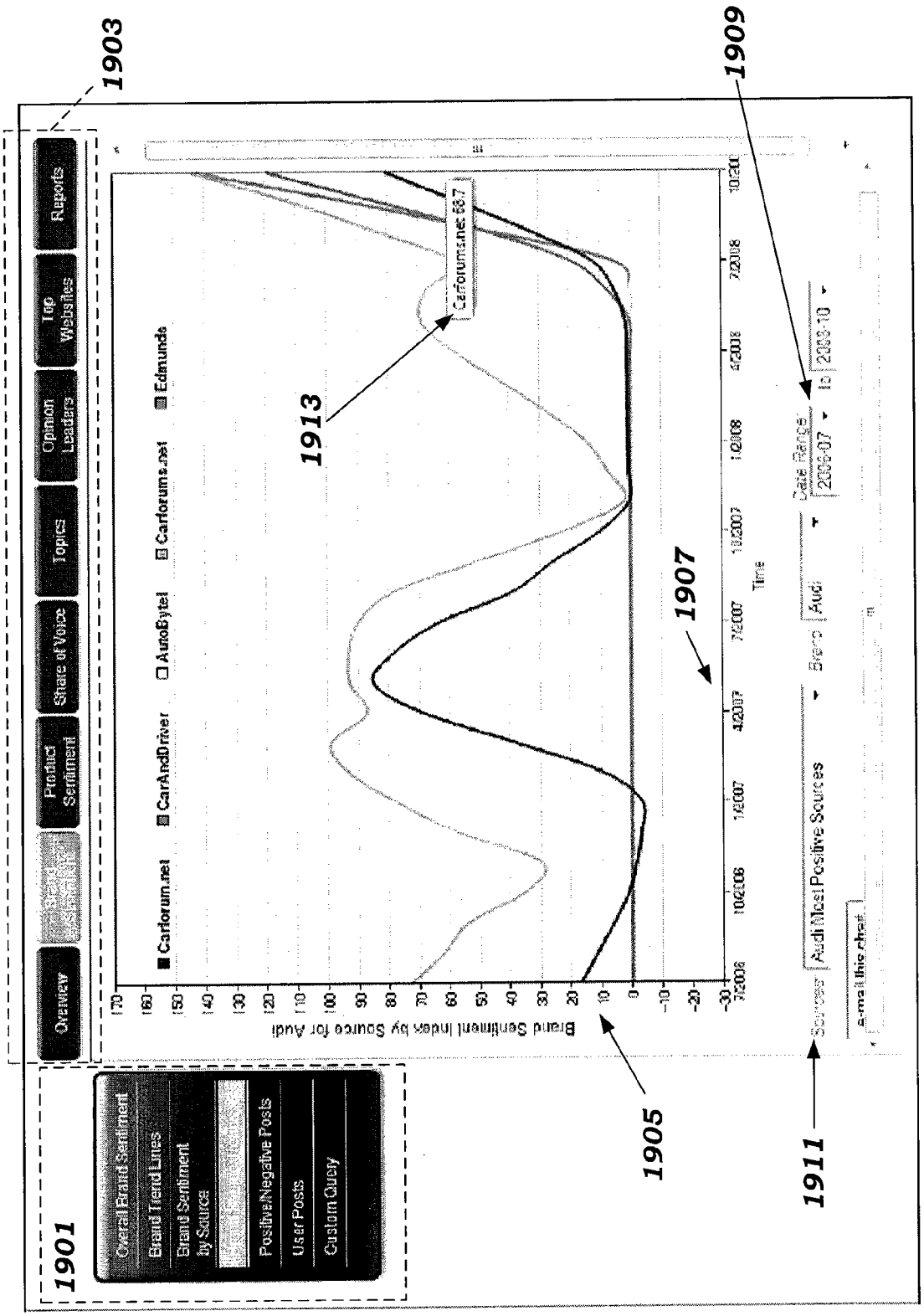
FIG. 19 illustrates a brand source trends for a particular source group display in a graphical user interface according to an exemplary embodiment of the invention.

FIG. 19 illustrates a brand source trends for a particular source group display in a graphical user interface according to an exemplary embodiment of the invention. In the illustrated embodiment, the "brand sentiment" category is selected in the top-level menu 1903 and the "brand source trends" category is selected in the submenu 1901. The x-axis 1905 reflects the brand sentiment index by source and the y-axis 1907 reflects the months in the selected date range 1909. This line chart shows how sentiment has trended over time based on the selected source group 1911. Users are able to analyze whether opinion has changed for a particular source group and research the online social media conversations to try and determine the causes. Users can also view the chart for competitors and selected a different date range 1909 for the chart. Mousing over lines at month intersections displays the sentiment index 1913 for that month for that source. Clicking on lines at month intersections drills down to the actual text of the online social media posts for the brand for the month from the particular source (drills down to positive or negative post content for that month depending on whether sentiment was mostly positive or negative for that month). This capability allows users to assess opinions at a particular point in time and ascertain why sentiment was trending a particular way for a particular source.

Figure 20:
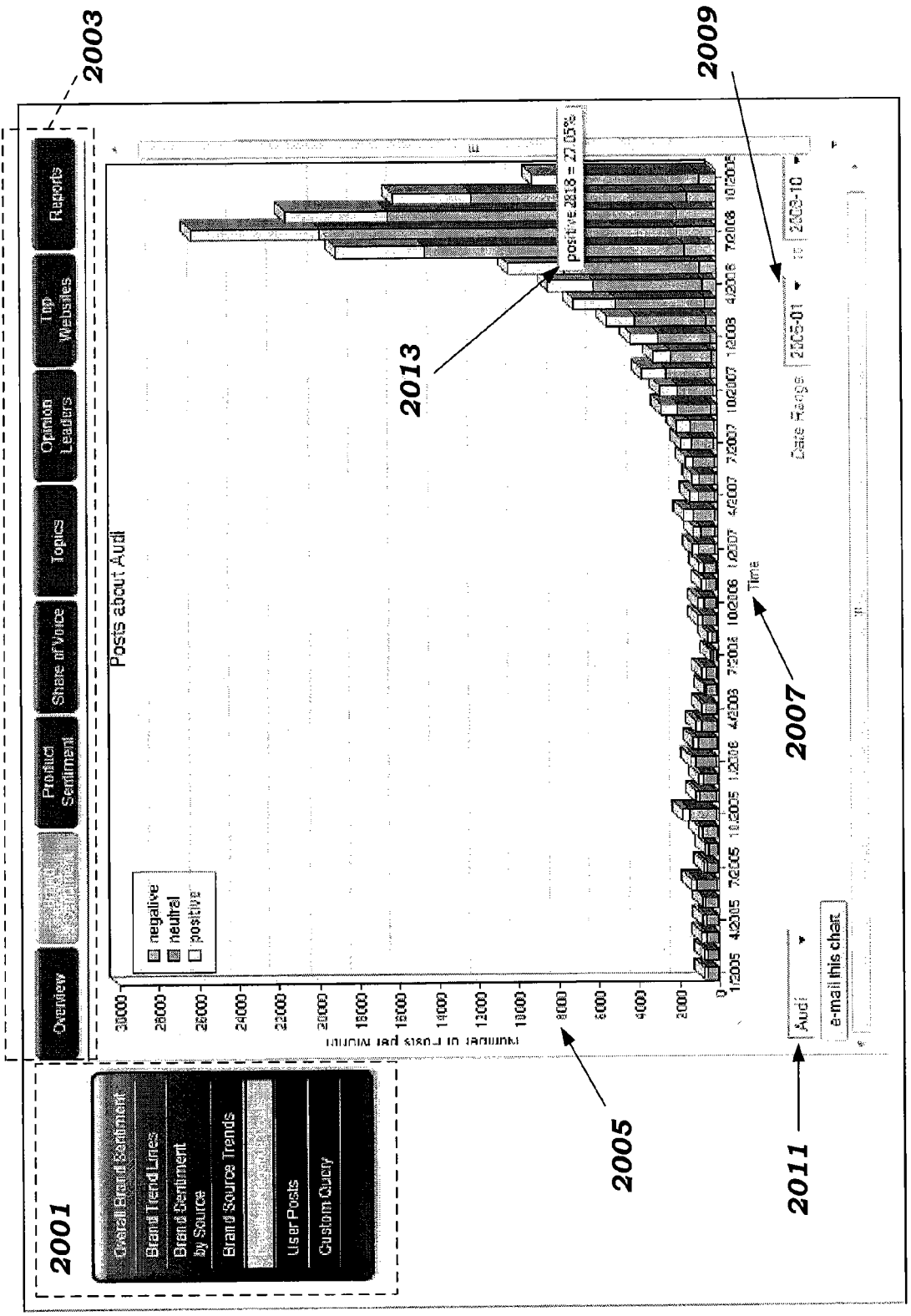
FIG. 20 illustrates a positive/negative posts display in a graphical user interface according to an exemplary embodiment of the invention.

FIG. 20 illustrates a positive/negative posts display in a graphical user interface according to an exemplary embodiment of the invention. In the illustrated embodiment, the "brand sentiment" category is selected in the top-level menu 2003 and the "positive/negative posts" category is selected in the submenu 2001. The x-axis 2005 reflects the number of posts per month and the y-axis 2007 reflects the months in the selected date range 2009 for the selected product or service 2011. This is a bar chart that shows the distribution of positive, negative and neutral posts per month. Users can see very quickly if there have been changes in the distribution of opinion from month-to-month for the users' products or services and those of their competitors. Mousing over the different sections of the bar in the display shows the number of positive, negative or neutral posts for that month along with the percentage representing the monthly total 2013. Clicking on the positive, negative or neutral section of a bar drills down to the positive, negative or neutral posts post content for that month so that users can assess what people are saying about the particular product or service at that time.

Figure 21:
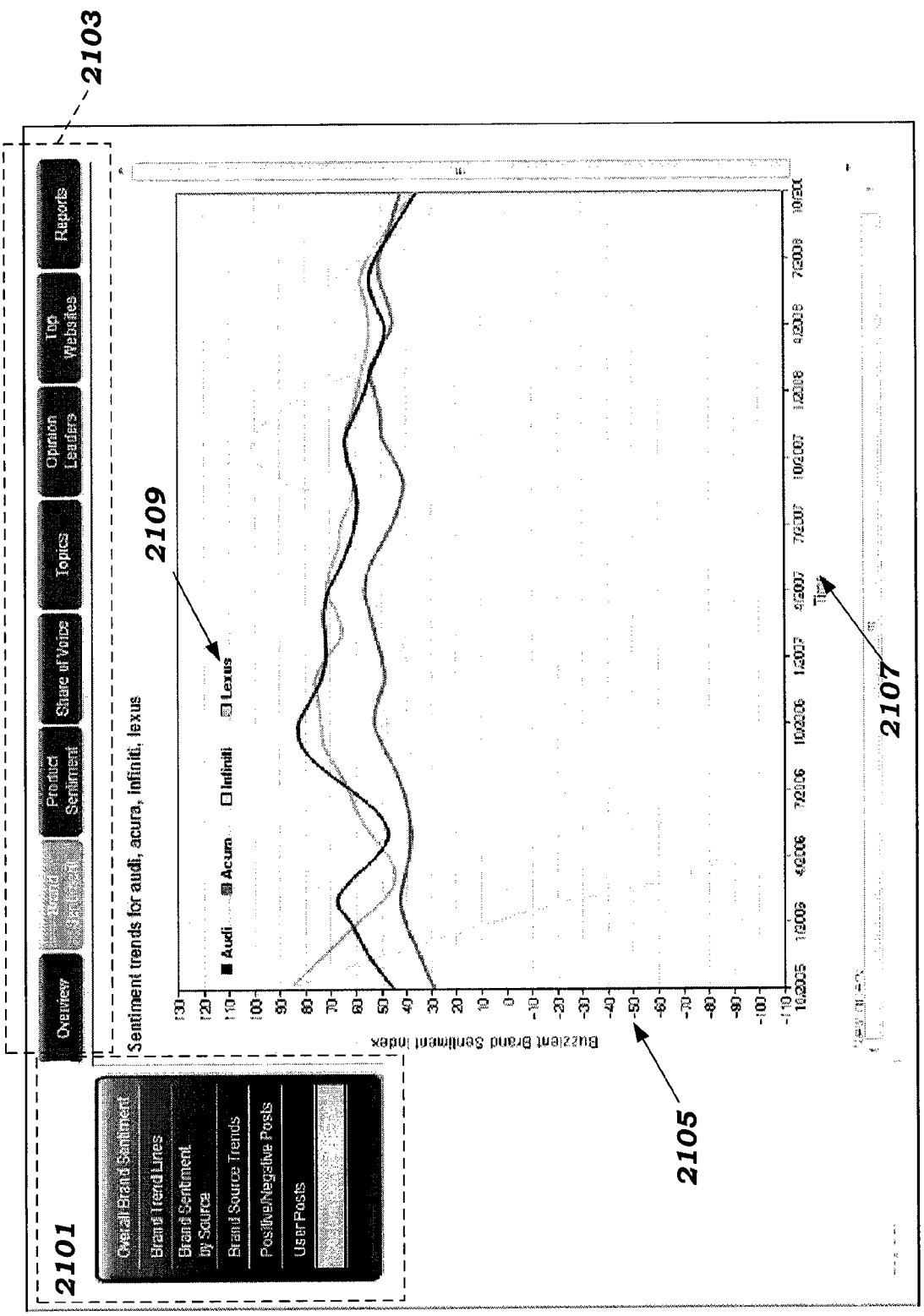
FIG. 21 illustrates an example ad hoc sentiment trend chart in a custom query display in a graphical user interface according to an exemplary embodiment of the invention.

FIG. 21 illustrates an example ad hoc sentiment trend chart in a custom query display in a graphical user interface according to an exemplary embodiment of the invention. In the illustrated embodiment, the "brand sentiment" category is selected in the top-level menu 2103 and the "custom query" category is selected in the submenu 2101. The x-axis 2105 reflects the brand sentiment index value and the y-axis 2107 reflects the months in the selected date range. Custom query allows users to generate an ad hoc sentiment trend chart for a specific set of brands, products and/or services 2109 over a particular time period. This gives users the flexibility to report the trends of fewer, more or different brands, products or services.

Figure 22:
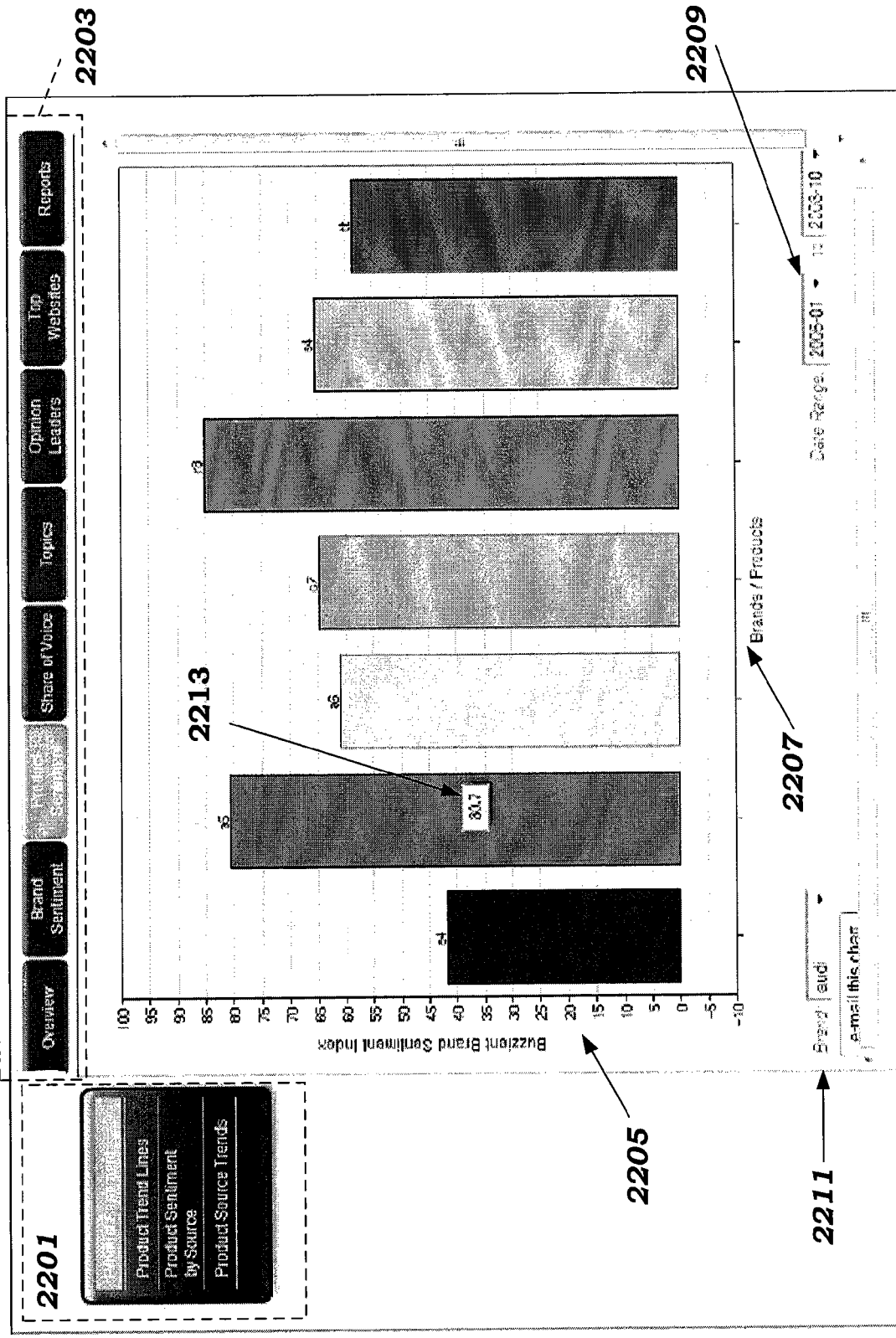
FIG. 22 illustrates a custom query for sentiment display in a graphical user interface according to an exemplary embodiment of the invention.

FIG. 22 illustrates a products or services sentiment display in a graphical user interface according to an exemplary embodiment of the invention. In the illustrated embodiment, the "product sentiment" category is selected in the top-level menu 2203 and the "product sentiment" category is selected in the submenu 2201. The x-axis 2205 reflects the brand sentiment index value and the y-axis 2207 reflects the brands, products or services for the selected brand 2211 in the selected date range 2209. This bar chart compares sentiment indices for a brand's products or services. Providing measurements for products or services gives users a more granular-level of sentiment analysis so that users can easily see whether there are differing opinions about the brand's products or services. Users can also view the chart for competitors to see how their products/services sentiment compares. Mousing over a bar in the display allows users to see the numeric sentiment index values 2213 and clicking on a bar in the display drills down to positive, negative or neutral post content about the product or service.

Figure 23:
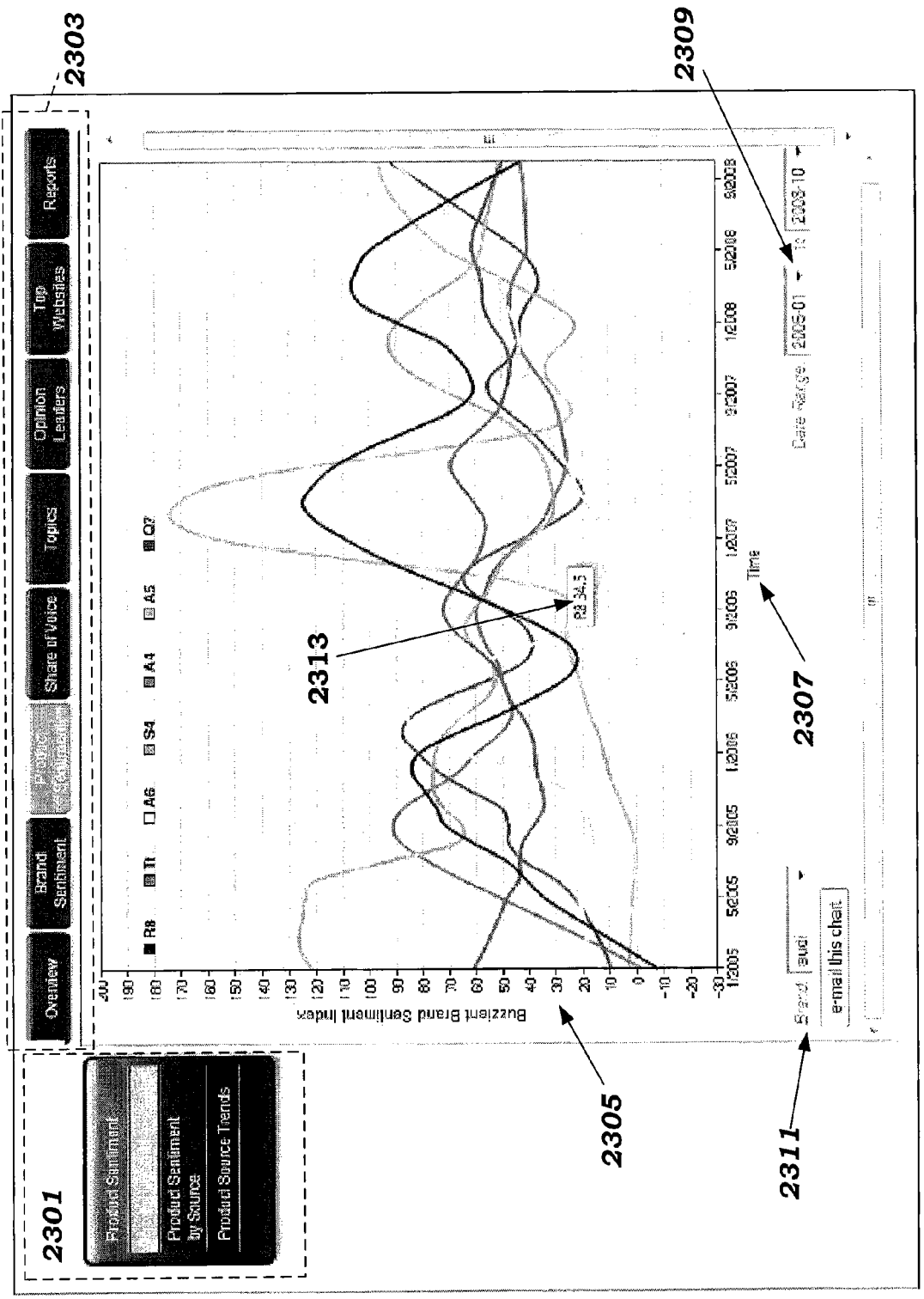
FIG. 23 illustrates a products or services trend lines display in a graphical user interface according to an exemplary embodiment of the invention.

FIG. 23 illustrates a products or services trend lines display in a graphical user interface according to an exemplary embodiment of the invention. In the illustrated embodiment, the "product sentiment" category is selected in the top-level menu 2303 and the "product trend lines" category is selected in the submenu 2301. The x-axis 2305 reflects the brand sentiment index value and the y-axis 2307 reflects the months in the selected date range 2309 for the selected brand 2311. This is a line chart that shows how sentiment for the brand's products or services has trended over time. Users can quickly analyze how events, campaigns, and et cetera have impacted opinions about their products or services. Users can also view the chart for competitors and select a different date range 2309 for viewing. Mousing over lines at month intersections displays a sentiment index for that month 2313 and clicking on lines at month intersections drills down to positive, negative or neutral post content about that product or service for that month. This capability allows users to assess opinions at a particular point in time and ascertain why sentiment was trending in a particular direction.

Figure 24:
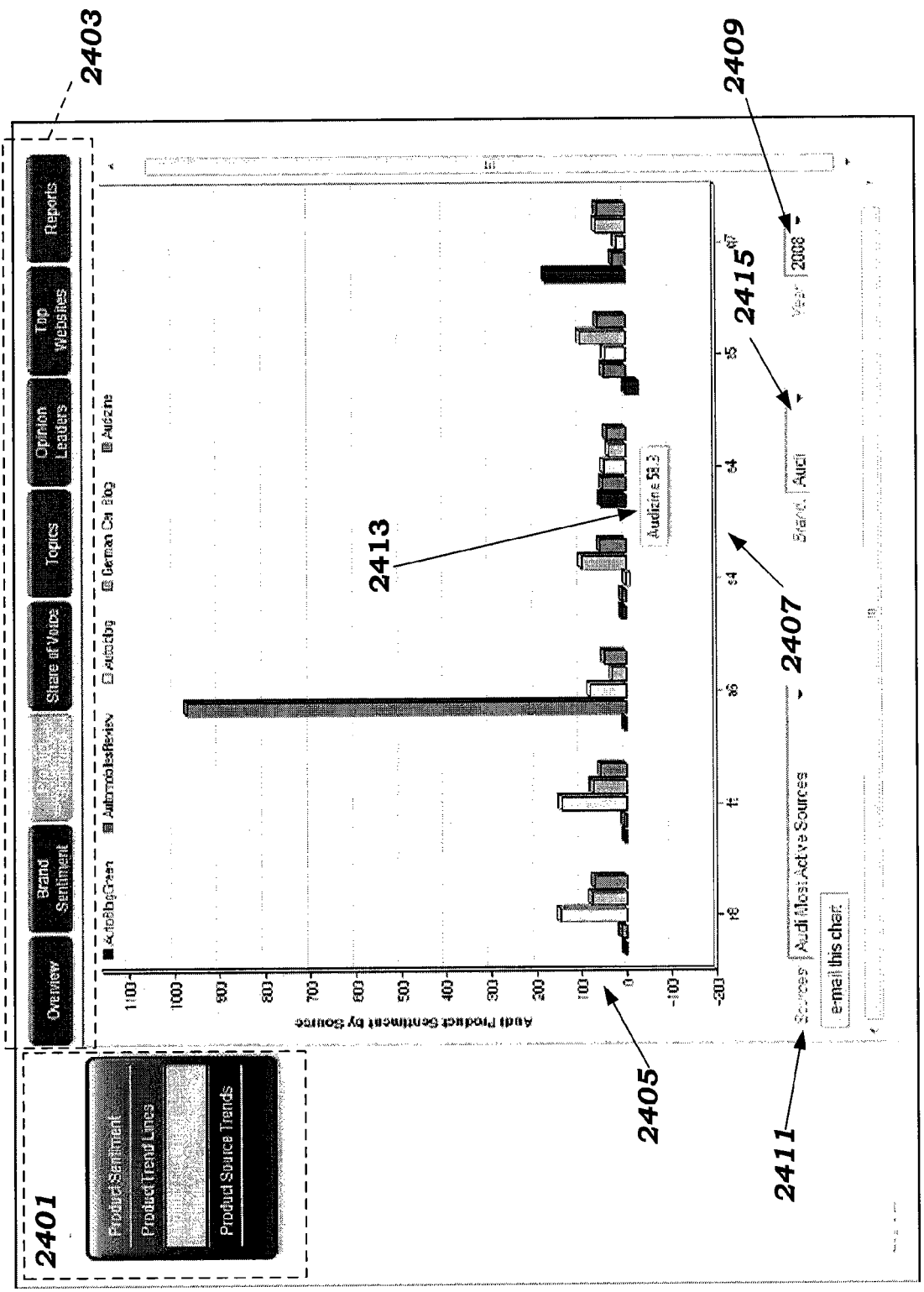
FIG. 24 illustrates a products or services sentiment by source display in a graphical user interface according to an exemplary embodiment of the invention.

FIG. 24 illustrates a products or services sentiment by source display in a graphical user interface according to an exemplary embodiment of the invention. In the illustrated embodiment, the "product sentiment" category is selected in the top-level menu 2403 and the "product sentiment by source" category is selected in the submenu 2401. The x-axis 2405 reflects the brand sentiment index value by source and the y-axis 2407 reflects the selected sources. The brand sentiment index value by source may be displayed for a selected date range 2409 for a selected product or service 2415 and a selected group of sources 2411. This is a bar chart showing sentiment indices for the brand's products or services by source group so users can see how sentiment varies by online sites. By default the source groups 2411 include most active, most positive and most negative source groups for the brand and its competitors. In one embodiment, source groups may be configurable to give flexibility to create appropriate groupings. For example, it might be valuable to create source groups such as "main stream media blogs," "industry forums," "fan sites," and et cetera. Users can also view the chart for competitors and select different date ranges 2409 for viewing. Mousing over a bar displays a sentiment index for that source for that particular product or service 2413 for the associated date range. Clicking on a bar drills down for a closer look at the sentiment indices for the brand's products or services for that particular source.

Figure 25:
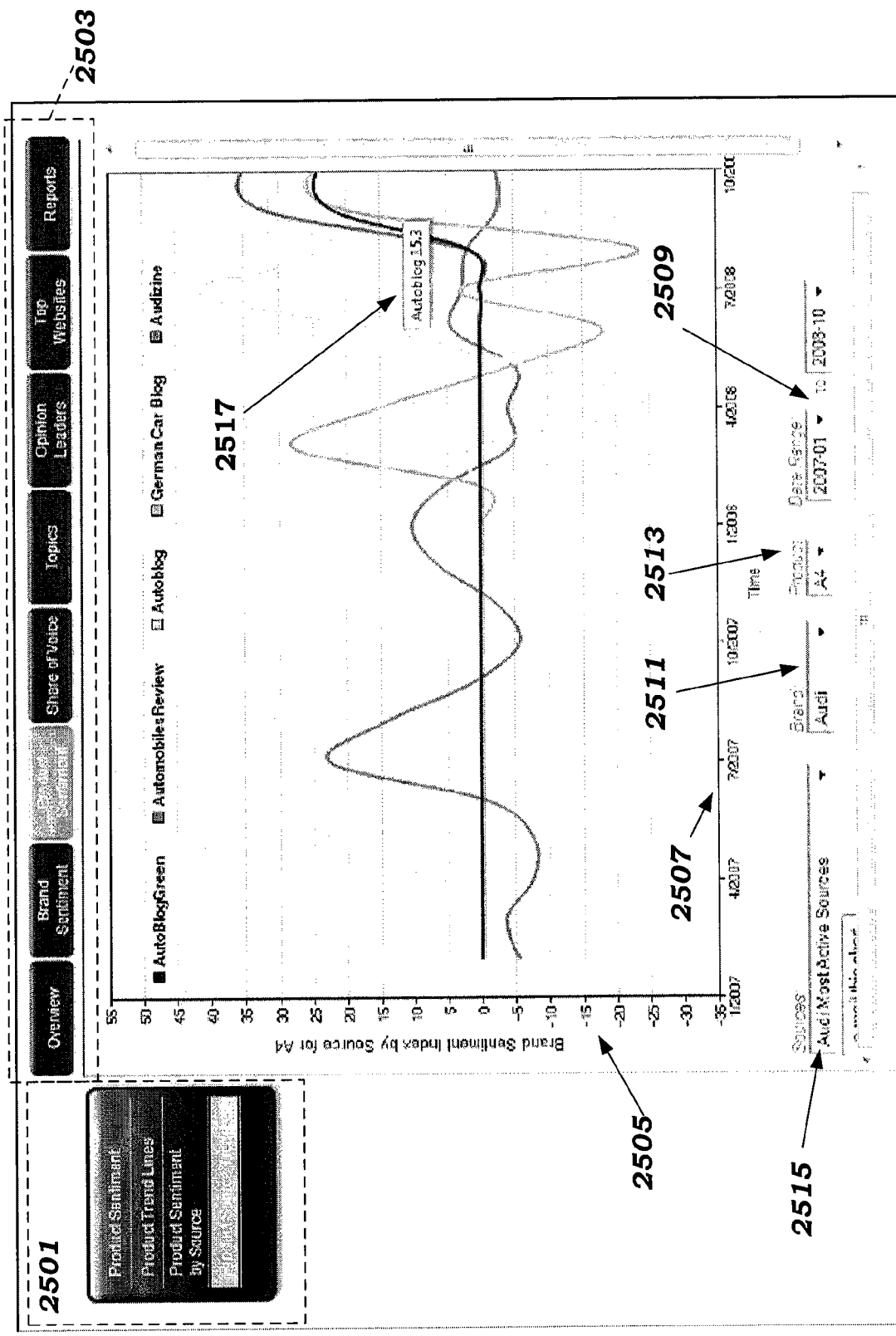
FIG. 25 illustrates a products or services source trends display in a graphical user interface according to an exemplary embodiment of the invention.

FIG. 25 illustrates a products or services source trends display in a graphical user interface according to an exemplary embodiment of the invention. In the illustrated embodiment, the "product sentiment" category is selected in the top-level menu 2503 and the "product source trends" category is selected in the submenu 2501. The x-axis 2505 reflects the brand sentiment index value by source and the y-axis 2507 reflects the months in the selected date range 2509. The brand sentiment index value by source may be for a selected brand 2511, product/service 2513 and a selected group of sources 2515. This line chart report shows how sentiment has trended over time for a brand's products or services based on source group. Users can also view the chart for competitors, select particular product or service 2513 and selected different date range 2509 for the trend report. Mousing over lines at month intersections displays a sentiment index 2517 for that month for that source for the selected product or service. Clicking on lines at month intersections takes the user to positive or negative post content for that month for that source for the selected product or service.

Figure 26:
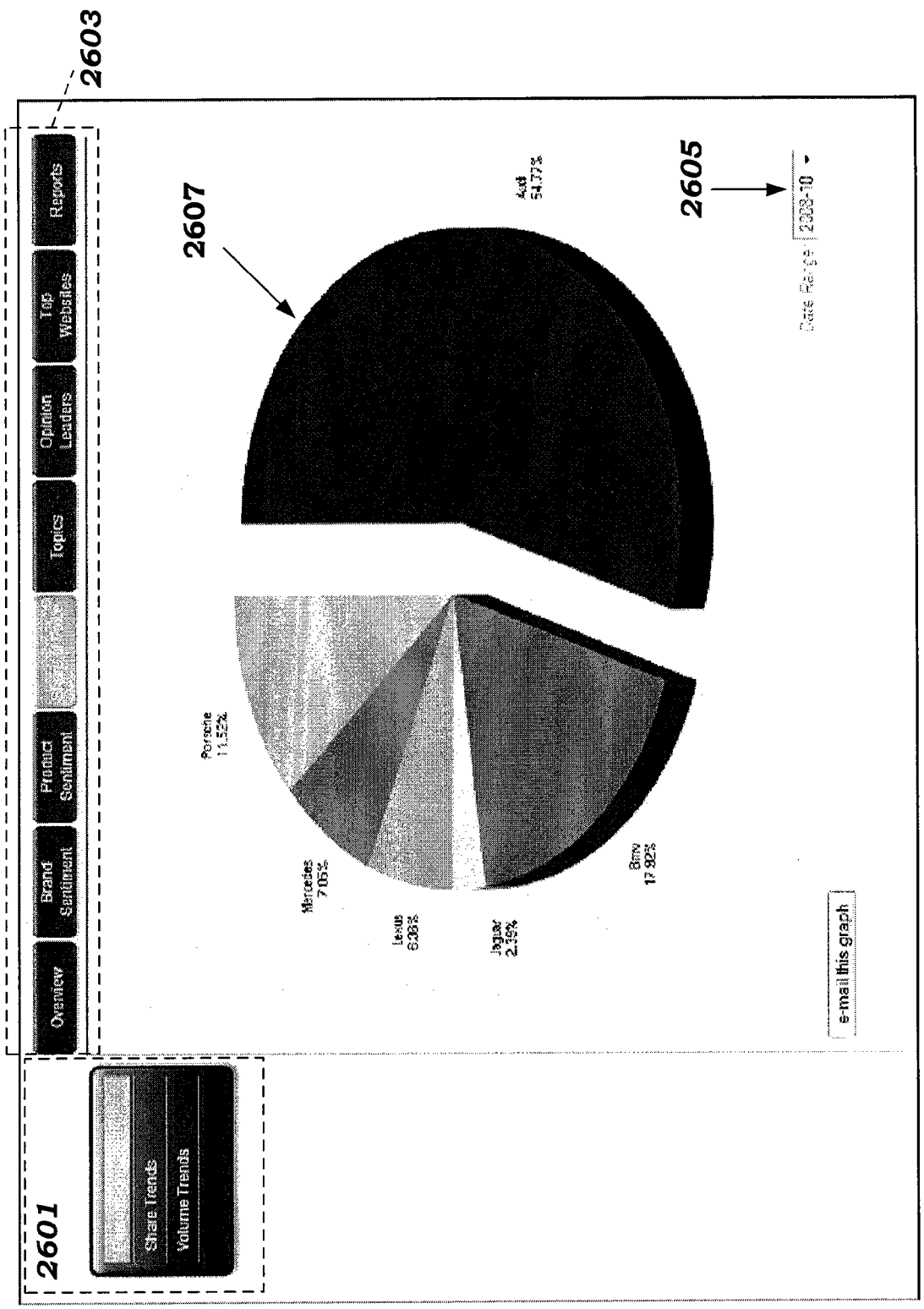
FIG. 26 illustrates a share of voice display in a graphical user interface according to an exemplary embodiment of the invention.

FIG. 26 illustrates a share of voice display in a graphical user interface according to an exemplary embodiment of the invention. In the illustrated embodiment, the "share of voice" category is selected in the top-level menu 2603 and the "percentages" category is selected in the submenu 2601. This is a pie chart showing how much conversations in the online social media are talking about this set of brands relative to each other for the date range 2605. For example, section 2607 of the pie chart in FIG. 26 indicates that 54.77% of the volume of online social media conversations about the brands shown for the month of October 2008 refers to Audi. Users can quickly see if their volume of mentions in online social media is high or low in comparison to the competition and can view the chart for a different month for comparison. Clicking on a section of the chart takes users to the newest posts about that brand.

Figure 27:
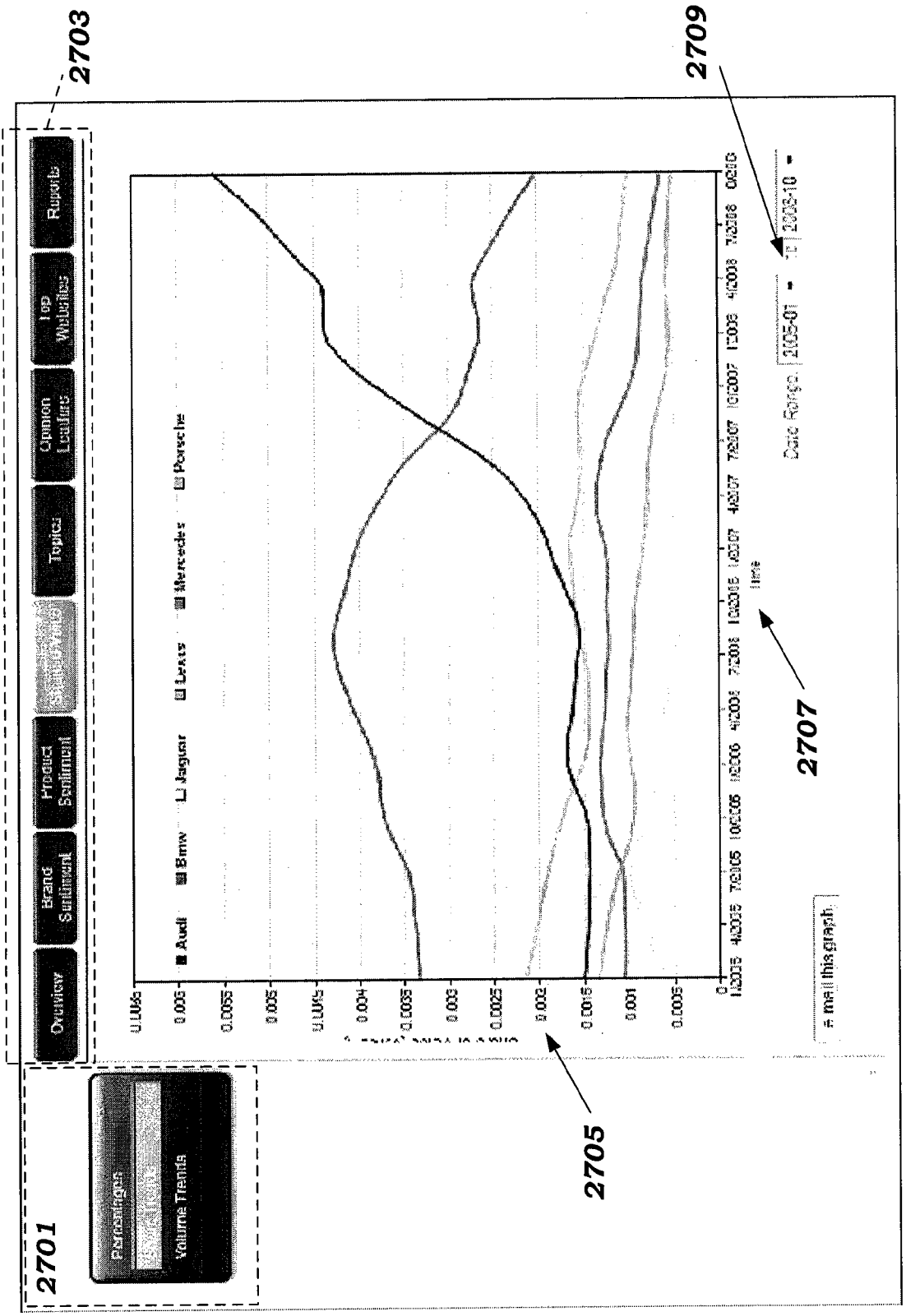
FIG. 27 illustrates a share of voice trends display in a graphical user interface according to an exemplary embodiment of the invention.

FIG. 27 illustrates a share of voice trends display in a graphical user interface according to an exemplary embodiment of the invention. In the illustrated embodiment, the "share of voice" category is selected in the top-level menu 2703 and the "share trends" category is selected in the submenu 2701. The x-axis 2705 reflects the volume of voice value and the y-axis 2707 reflects the months in the selected date range 2709. This line chart report shows how share of voice for the brand and competitors have trended over time.

Users are able to quickly see if they are gaining or losing online share of voice. Clicking on lines at month intersections drills down to the actual text of the online social media post content for that month so users can assess opinions at the particular point in time they had a particular share of voice.

Figure 28:
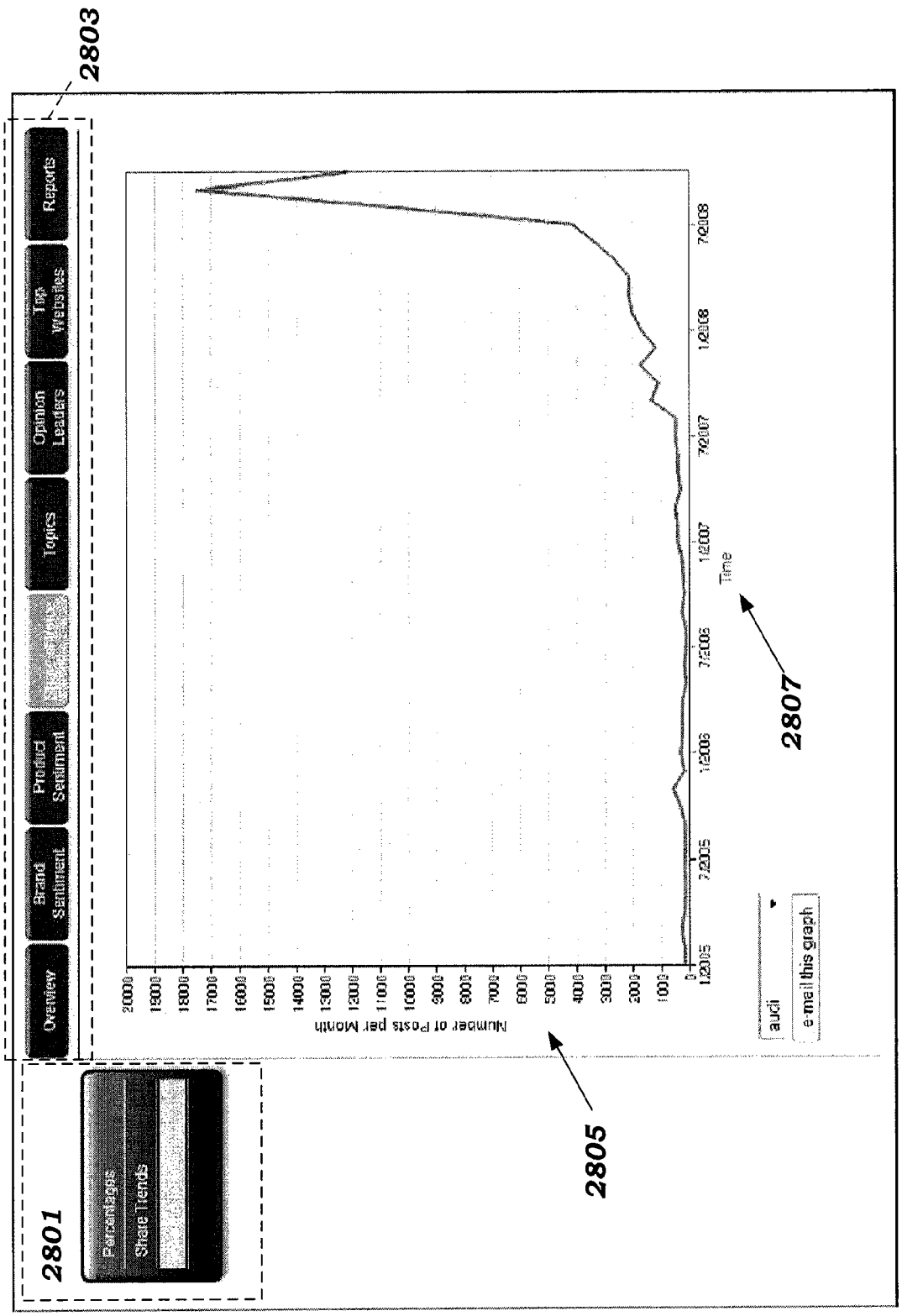
FIG. 28 illustrates a volume trends display in a graphical user interface according to an exemplary embodiment of the invention.

FIG. 28 illustrates a volume trends display in a graphical user interface according to an exemplary embodiment of the invention. In the illustrated embodiment, the "share of voice" category is selected in the top-level menu 2803 and the "volume trends" category is selected in the submenu 2801. The x-axis 2805 reflects the number of posts per month and the y-axis 2707 reflects the months in the selected date range 2709. This line chart report shows how volume of postings for the brand and competitors has trended over time. Users can see how post volume has reacted to events, programs, and et cetera over time. Clicking on lines at month intersections takes users to post content for that month so they can assess opinions at the particular point in time they had a particular post volume.

Figure 29:
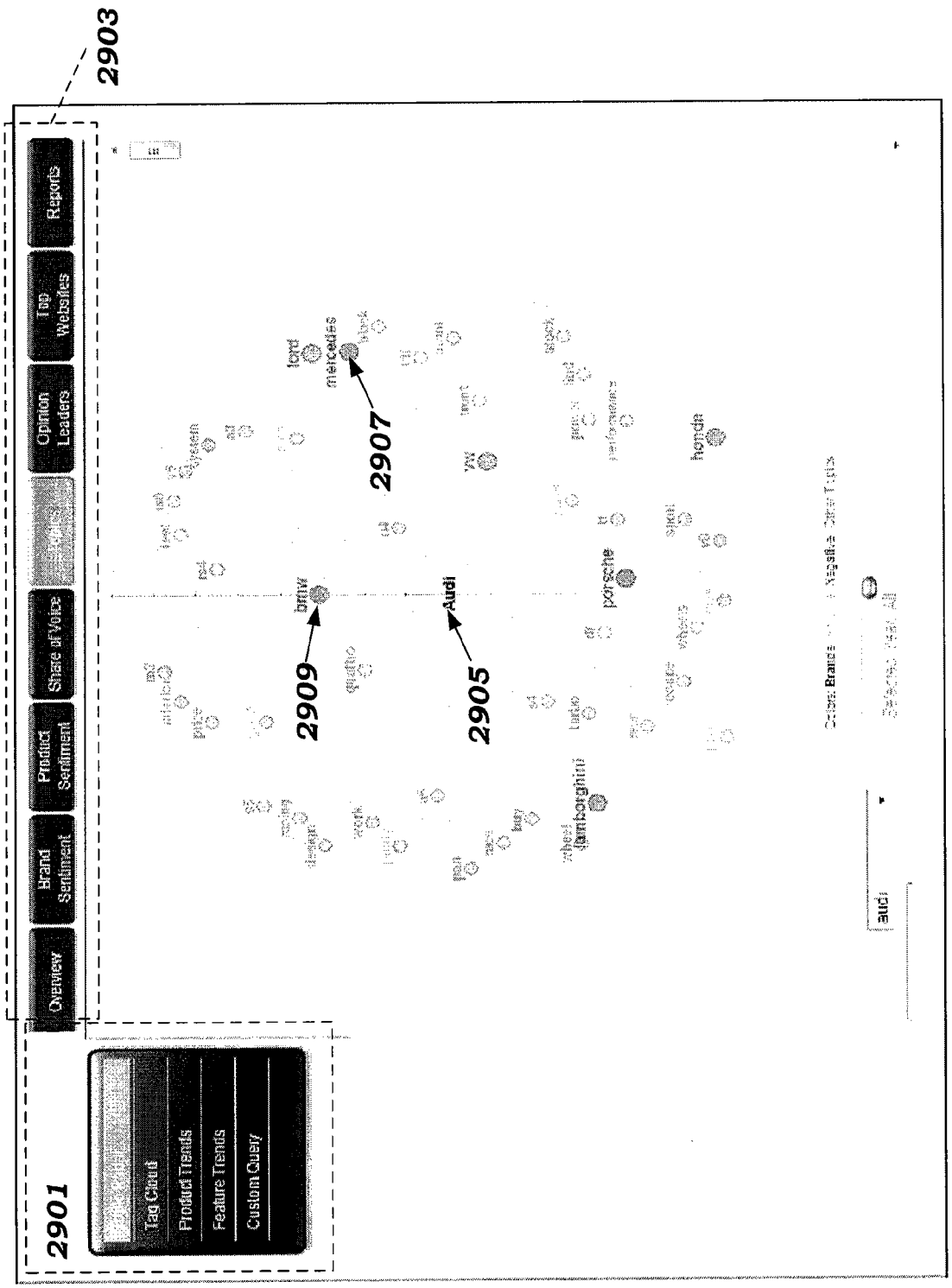
FIG. 29 illustrates a topic radar display in a graphical user interface according to an exemplary embodiment of the invention.

FIG. 29 illustrates a topic radar plot display in a graphical user interface according to an exemplary embodiment of the invention. In the illustrated embodiment, the "topics" category is selected in the top-level menu 2903 and the "tag radar" category is selected in the submenu 2901. This is a visualization of terms, concepts and competitors most frequently mentioned in online posts in conjunction with the users' brand. The closer words appear (e.g., BMW 2909 and Mercedes 2907) to the center where the users' brand is located (e.g., Audi 2905), the more frequently they are mentioned in conjunction with the brand. These are the words online authors are employing in their actual posts. Brands can leverage these words in creating messaging and communications and in search engine keyword purchases, for example. Brand, product or service managers can utilize these to see which competitors are most often mentioned along with the brand. Additionally, users' customer service departments can monitor whether terms such as "problem," "issue," and et cetera are appearing frequently in conjunction with the users' brand. Clicking on a term in the topic radar plot display takes the user to post content containing the brand and words so users can see how they are used in context. Users can also view topic radar for different months in the past by changing the year and month selection to the desired date range. This can enable users to see how terms used online have changed over time and correlated those changes to events such as new advertising campaigns or other external forces.

Figure 30:
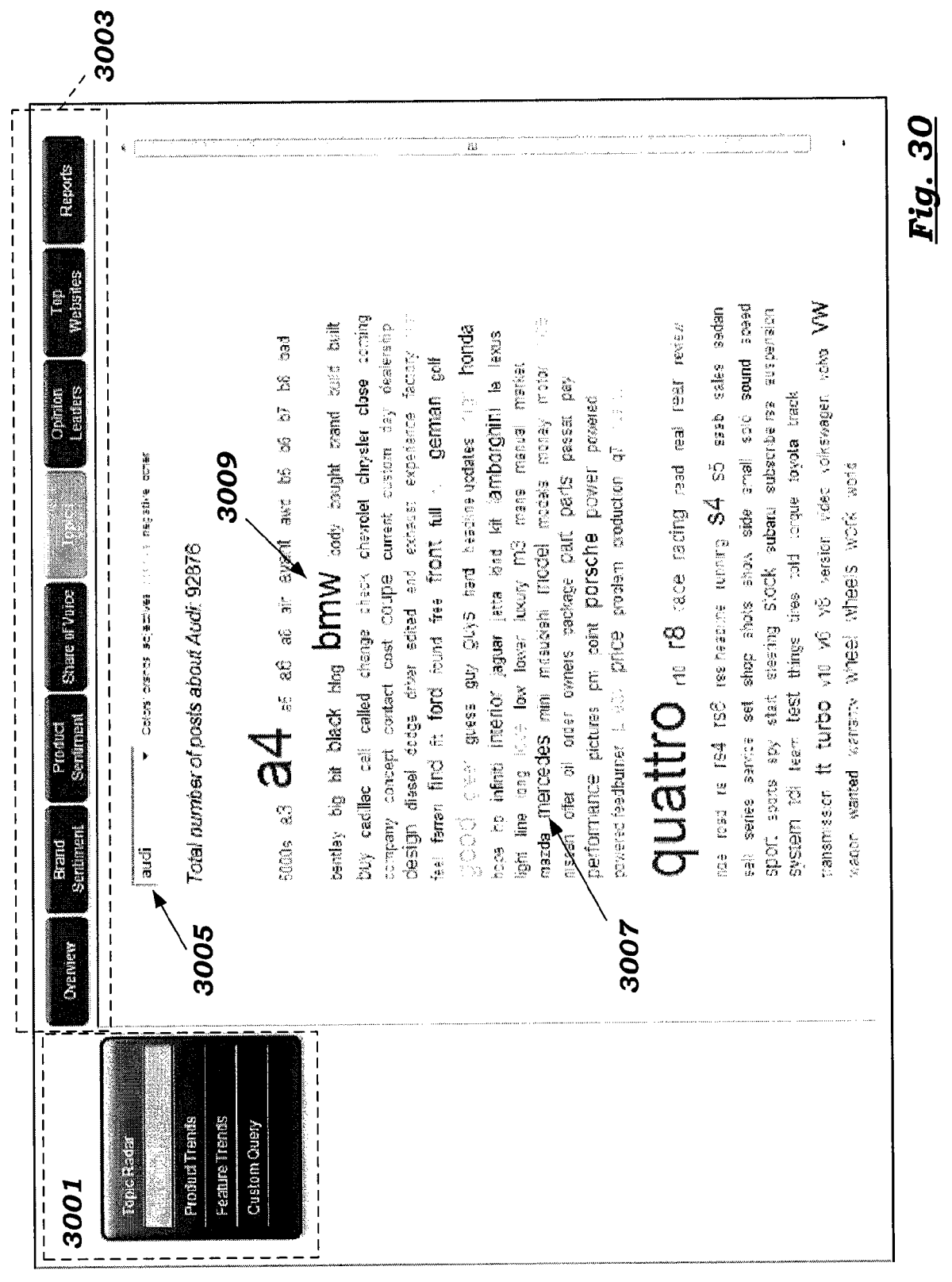

FIG. 30 illustrates a tag cloud display in a graphical user interface according to an exemplary embodiment of the invention. In the illustrated embodiment, the "topics" category is selected in the top-level menu 3003 and the "tag cloud" category is selected in the submenu 3001. This is a visualization that displays the same data as topic radar in tag cloud format for a selected product or service 3005. The larger the words are in the tag cloud (e.g., BMW 3009 and Mercedes 3007), the more frequently they are mentioned in conjunction with the selected brand (e.g., Audi 3005). As with the topic radar, users can view the chart for competitors and click on terms to see the post content for the brand and the term(s).

Figure 31:
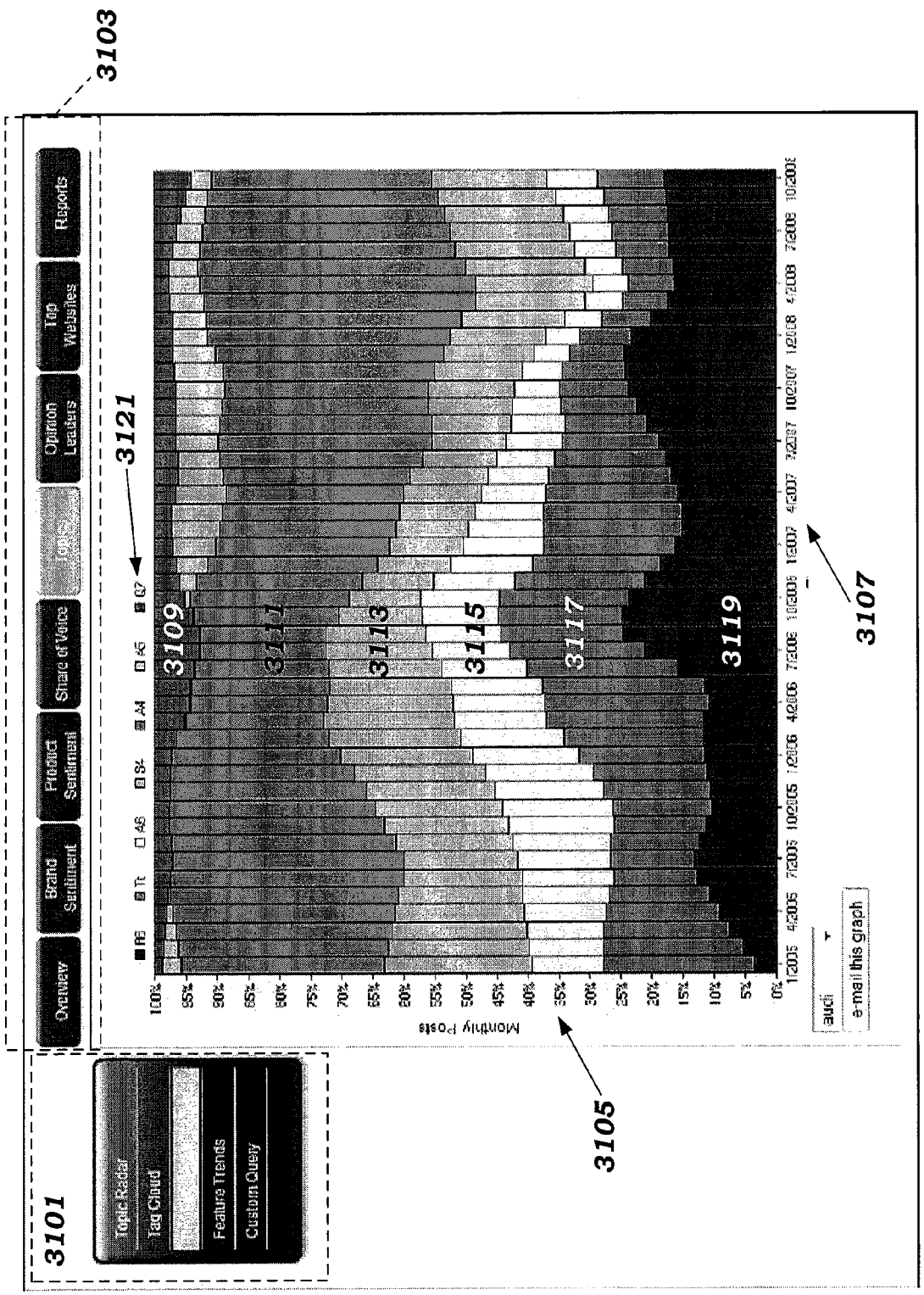
FIG. 31 illustrates a products or services share of voice trends display in a graphical user interface according to an exemplary embodiment of the invention.

FIG. 31 illustrates a products or services share of voice trends display in a graphical user interface according to an exemplary embodiment of the invention. In the illustrated embodiment, the "topics" category is selected in the top-level menu 3103 and the "product trends" category is selected in the submenu 3101. The x-axis 3105 reflects the percentage of posts per month for selected products or services 3121 and the y-axis 3107 reflects the months in the selected date range.

This is a bar chart comparing frequency of mention of a brand's products or services relative to each other over time (e.g., 3109, 3111, 3113, 3115, 3117, and 3119). Users can quickly see how participation of their product/service in online social media conversations and that of their competitors change and compare from month-to-month. This provides users with insight into how campaigns and programs promoting particular products or services are affecting online posts. Clicking on the chart takes users to a list of post content for the selected product or service for that particular month. The same information can be obtained with regard to various selected features using the "feature trends" category in the submenu 3101. This is likewise a bar chart comparing the frequency of mention of the features of a product or service relative to each other over time so that users can quickly see how feature mentions and those of their competitors change and compare from month-to-month.

Figure 32:
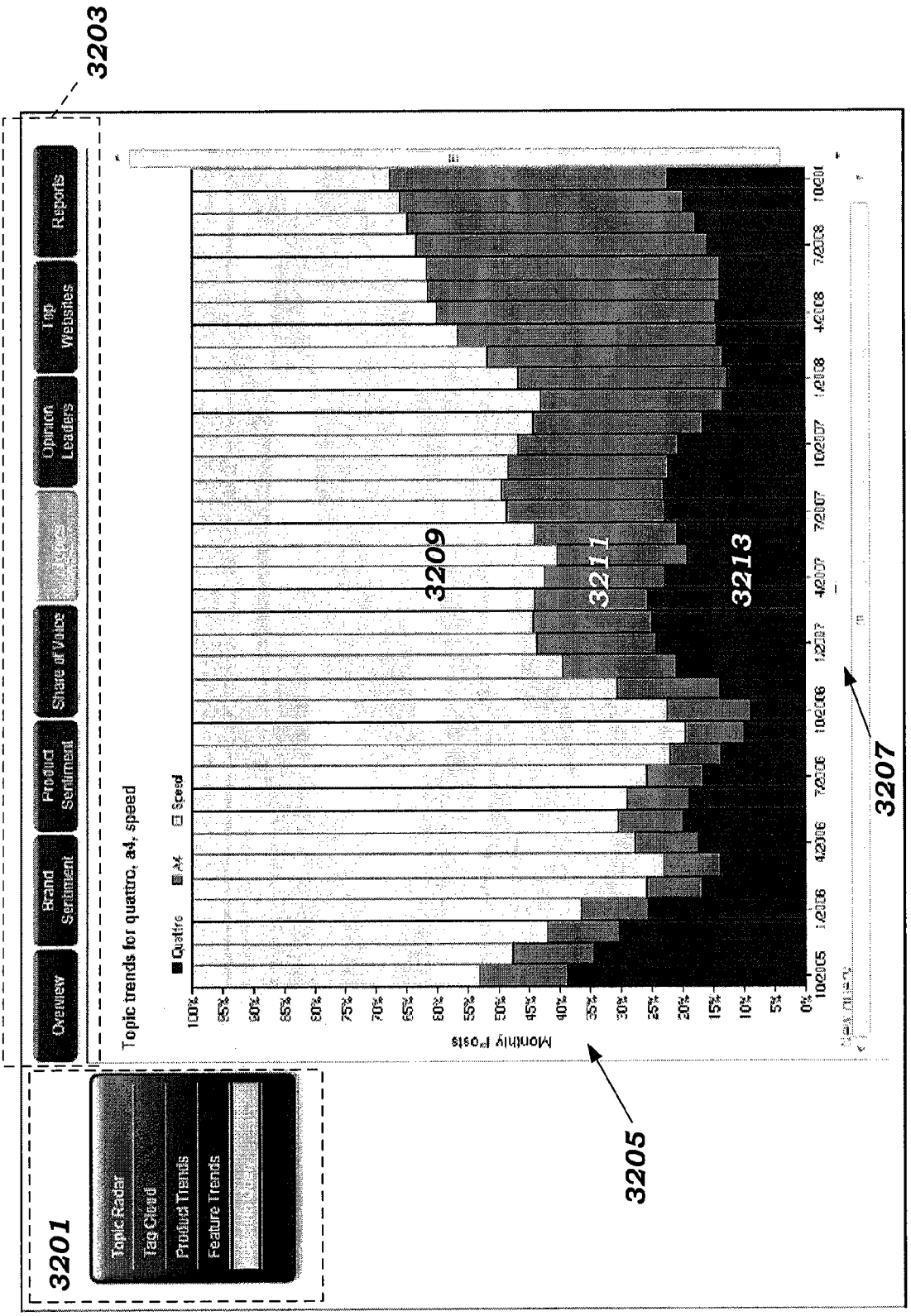
FIG. 32 illustrates a custom query for topics display in a graphical user interface according to an exemplary embodiment of the invention.

FIG. 32 illustrates a custom query for topics display in a graphical user interface according to an exemplary embodiment of the invention. In the illustrated embodiment, the "topics" category is selected in the top-level menu 3203 and the "custom query" category is selected in the submenu 3201. The x-axis 3205 reflects the percentage of posts per month for various custom selected topics (e.g., products, services, and/or features) and the y-axis 3207 reflects the months in the selected date range. This is a bar chart comparing frequency of mention of a brand's products, services and/or features relative to each other over time (e.g., 3207, 3209, and 3211). Custom query allows users to generate an ad hoc trend bar chart report for a specific set of terms, concepts or brands over a particular time period. This is the same type of report generated in the product/service and feature trends in that it compares frequency of mention of terms, concepts or brands in the query relative to each other over time. Users can generate ad hoc trend charts by entering terms and selecting a date range for the report. In custom query, users can enter any terms that they are interested in for a closer analysis.

FIG. 33 illustrates a forum opinion leader list display in a graphical user interface according to an exemplary embodiment of the invention. In the illustrated embodiment, the "opinion leaders" category is selected in the top-level menu 3303 and the "forum opinion leaders" category is selected in the submenu 3301. This report is a list of most influential forum users or other online social media authors for the category (e.g., automotive, computers, financial services, etc.) sorted by importance. The importance is donated by the centrality values generated during the social network analysis processing discussed previously, which leverages the social graph to determine the influence of online users. The online social media users' preferred brands, home websites, demographics, and that number of posts are also displayed. Users can drill down into the posts and brand list for the influencer. These drill-downs provide users with the capability to assess what these influencers are saying online. Also, the opinion leaders list can be filtered to show only opinion leaders who post about the users' brand more than others.

Additionally, a listing of the top 10 most positive and top 10 most negative users for the brand can be displayed using the "positive/negative users" category of submenu 3301. This enables users to see who has the highest opinion of the brand and who has the lowest. As with the opinion leaders list, users can drill down into posts and brand information for these authors of online social media posts. This list can show users who are the most positive online social media authors that could be a potential source of feedback and who are the most negative online social media authors that might need extra customer service attention. Likewise, a list of blogs with posts about the category sorted by ranking can be displayed using the "influential blogs" category of submenu 3301. Here, users of the GUI can see which blogs have the highest influence with respect to the user's brands.

Figure 34:
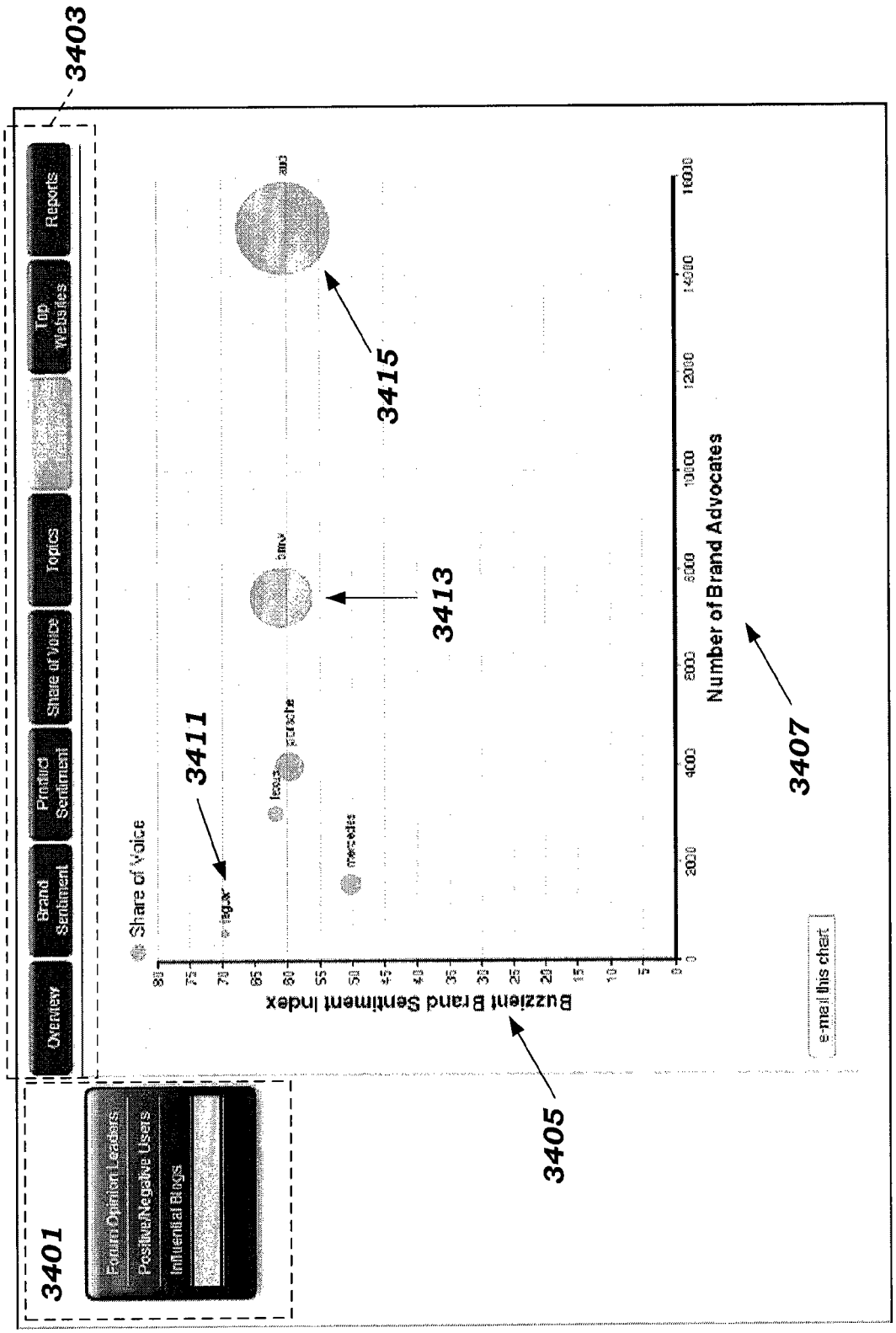
FIG. 34 illustrates an overall brand advocacy display in a graphical user interface according to an exemplary embodiment of the invention.

FIG. 34 illustrates an overall brand advocacy display in a graphical user interface according to an exemplary embodiment of the invention. In the illustrated embodiment, the "opinion leaders" category is selected in the top-level menu 3403 and the "brand advocacy" category is selected in the submenu 3401. The x-axis 3405 reflects the brand sentiment index value and the y-axis 3407 reflects the number of brand advocates. Also the share of voice is represented by the size of the plots in the chart (e.g., 3411, 3413, and 3415). This is a chart showing how the brand and competitors compare based on sentiment, number brand advocates and share of voice. Thus, brand advocacy is essentially a representation of the activity and focus of the brand's "fans." This chart shows users whether their brand sentiment is higher or lower than the competition, whether there are larger or smaller numbers of brand advocates than the competition, and whether the brand has a larger or smaller share of voice. For example, a brand could have a good sentiment index, but lower number a brand advocates and share of voice indicating that their fans are positive, but not extremely active.

In addition, users may select the "top websites" category in the top-level menu. This will display a list of the websites users are most likely to reach when searching online for information about a user's brand, product or service. This feature allows users to sort top websites by importance, site name or sites without advertising. As with the opinion leader list, the centrality metric for top websites reflects importance. In this case, the centrality represents the likelihood of users reaching the site when searching for information about the users' brands, products or services. Users can then click on the URL to launch the site for reference and examination. This list can be used to confirm the best sites for messaging, advertisement and engagement, which can illuminate sites toward the top of the list (important) that have not been utilized and those toward the bottom of the list (unimportant) where valuable dollars are being expended. The list shows: the advertising vehicle on the site (if any); the number of unique users; if there is any social media on the site; and the centrality metric (importance) of the site. Users may also select the "reports" category in the top-level menu. This list shows alerts that have been triggered based on user-configuration. For example, alerts can be sent for: extremely positive or negative posts; sentiment index changes; high volume of issues mentioned in posts; posts for particular authors users wish to track; posts for specific sites; and posts containing specific keywords. In one embodiment, users can receive these alerts via e-mail or SMS notifications.

Embodiments provide methods, apparatuses, and computer-readable medium for harvesting, aggregating, and providing analytic measurements of unstructured qualitative online social media conversations including the sentiment expressed among online social media participants about a particular subject matter. The type of subject matter that can be harvested, aggregated and provided as analytic measurements is virtually limitless as any subject matter contained in social media postings is envisioned to be within the scope of this description. Likewise, the applications of the SMA platform is virtually limitless does any use of aggregated and quantified social media conversations is envisioned to be within the scope of this description. Some of the applications of the SMA platform include: providing enhanced target advertising campaigns; providing enhanced customer service at a call-center; providing enhanced market research; providing a method of improved product development; providing an enhanced method for generating opinion polls; and providing enhanced methods for National Defense intelligence to name a few.

Figure 35:
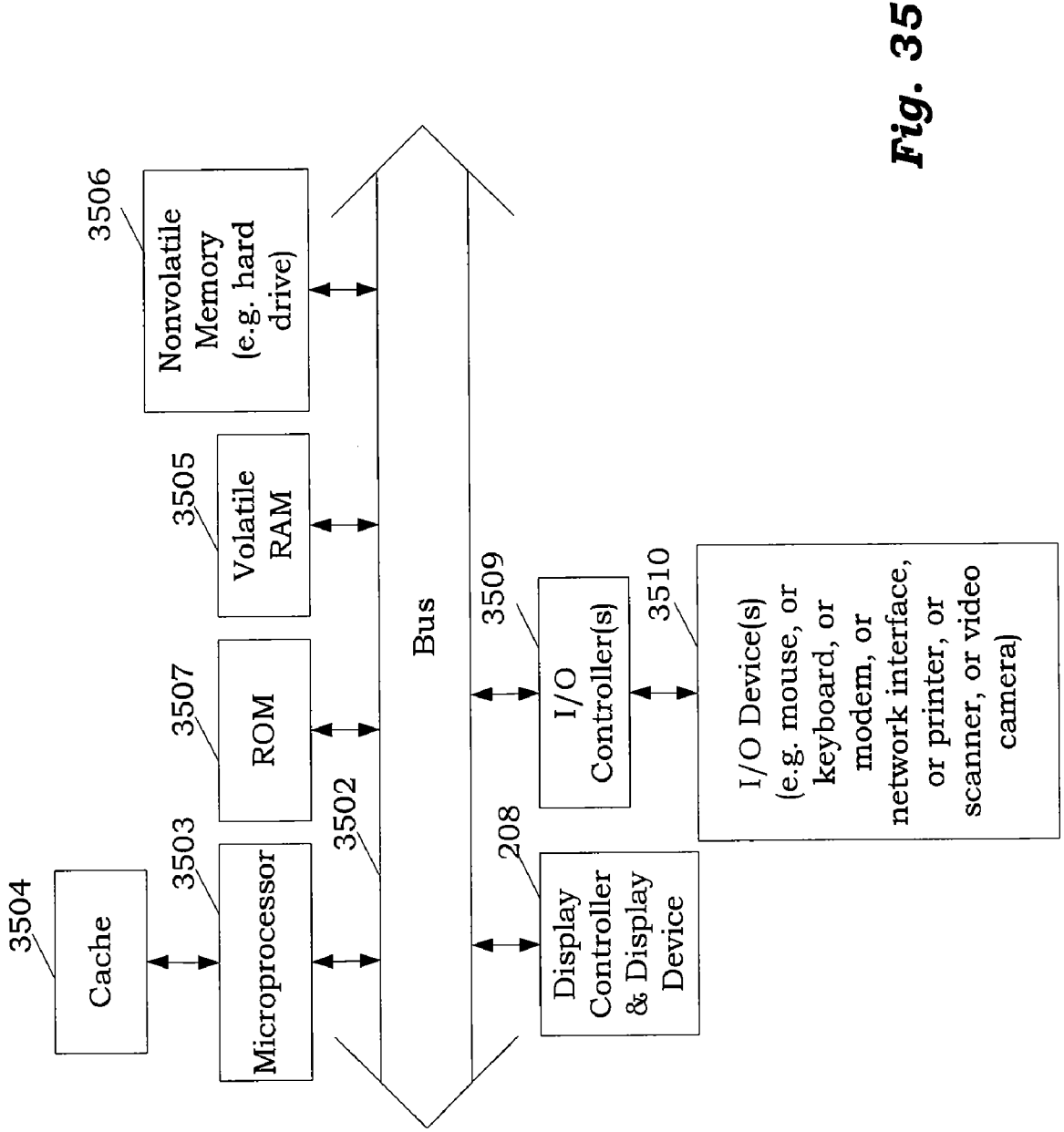
FIG. 35 illustrates an exemplary data processing system upon which the methods and apparatuses of the invention may be implemented.

FIG. 35 illustrates an exemplary data processing system upon which the methods and apparatuses of the invention may be implemented. Note that while FIG. 35 illustrates various components of a data processing system, it is not intended to represent any particular architecture or manner of interconnecting the components as such details are not germane to the present invention. It will also be appreciated that network computers and other data processing systems which have fewer components or perhaps more components may also be used. The data processing system of FIG. 35 may, for example, be a workstation, or a personal computer (PC) running a Windows operating system, or an Apple Macintosh computer.

As shown in FIG. 35, the data processing system 3501 includes a system bus 3502 which is coupled to a microprocessor 3503, a ROM 3507, a volatile RAM 3505, and a non-volatile memory 3506. The microprocessor 3503, which may be a processor designed to execute any instruction set, is coupled to cache memory 3504 as shown in the example of FIG. 35. The system bus 3502 interconnects these various components together and also interconnects components 3503, 3507, 3505, and 3506 to a display controller and display device 3508, and to peripheral devices such as input/output (I/O) devices 3510, such as keyboards, modems, network interfaces, printers, scanners, video cameras and other devices which are well known in the art. Typically, the I/O devices 3510 are coupled to the system bus 3502 through input/output controllers 3509. The volatile RAM 3505 is typically implemented as dynamic RAM (DRAM) which requires power continually in order to refresh or maintain the data in the memory. The non-volatile memory 3506 is typically a magnetic hard drive or a magnetic optical drive or an optical drive or a DVD RAM or other type of memory systems which maintain data even after power is removed from the system. Typically, the non-volatile memory 3506 will also be a random access memory although this is not required. While FIG. 35 shows that the non-volatile memory 3506 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface (not shown). The system bus 3502 may include one or more buses connected to each other through various bridges, controllers and/or adapters (not shown) as is well known in the art. In one embodiment the I/O controller 3509 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM 3507, volatile RAM 3505, non-volatile memory 3506, cache 3504, or a remote storage device (not shown). In various embodiments, hardwired circuitry may be used in combination with software instructions to implement the present invention. Thus, the techniques are not limited to any specific combination of hardware circuitry and software or to any particular source for the instructions executed by the data processing system 3500. In addition, throughout this description, various functions and operations are described as being performed by or caused by software code to simplify description. However, those skilled in the art will recognize that what is meant by such expressions is that the functions result from execution of code by a processor, such as the microprocessor 3503.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a computer-readable medium. A computer-readable medium can be used to store software and data which when executed by a data processing system, such as data processing system 3500, causes the system to perform various methods of the present invention. This executable software and data may be stored in various places including for example ROM 3507, volatile RAM 3505, non-volatile memory 3506, and/or cache 3504 as shown in FIG. 35. Portions of this software and/or data may be stored in any one of these storage devices. A computer-readable medium may include any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a computer-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a computer-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with data processing systems which have more or fewer components than system 3500. For example, such data processing systems may be a cellular telephone or a personal digital assistant (PDA) or an entertainment system or a media player or a consumer electronic device, and et cetera, each of which can be used to implement one or more of the embodiments of the invention. The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Throughout the foregoing specification, references to "one embodiment," "an embodiment," "an example embodiment," and et cetera, indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow as well as the legal equivalents thereof.

What is claimed is:

1. A method comprising:
generating a social network graph to model one or more social networks of related authors of online social media and their corresponding posts of online social media conversations relevant to subject matter of interest in a category, wherein generating the social network graph comprises:
harvesting and aggregating posts of online social media conversations from one or more online social media sources;
performing content scraping on the posts of online social media conversations to obtain raw data including each individual post of an online social media conversation relevant to the subject matter of interest and user-profile information of a social media author corresponding to each individual post; and
performing social network analysis processing on the raw data to obtain the social network graph, the processing including:
analyzing an influence level of the social media author, the influence level indicative of a total number of other authors the social media author is connected to over one or more social networking paradigms, a total number of posts written by the author in one or more social networking paradigms, an importance score associated with the one or more social networking paradigms in which the social media author's posts are published, a total number of distinct subgroups of authors the social media author is connected with, and an overall activity level of the social media author;
computing an influence score associated with the social media author using an influence score formula, the influence score formula computed by multiplying a raw betweenness centrality value for the social media author with a function of: (1) a number of other active authors on the website where the social media author is active, (2) a total number of posts the social media author has contributed, and (3) one or more correction parameters that are fine-tuned for purposes of a specific vertical that corresponds to the specific subject matter of interest; wherein the betweenness centrality value is computed as a result of a centrality measure of a vertex within a raw social graph generated for the given social networking paradigm;
detecting a sentiment rating associated with a one or more posts of the social media author; and
determining weighting factors associated with the one or more posts based on a combination of the sentiment rating associated with the one or more posts and the influence level associated with the social media author.

2. The method of claim 1, further comprising storing the social network graph in a database.

3. The method of claim 1, wherein harvesting the online social media conversations includes:
performing forum analysis to discover websites of interest containing online social media content relevant to the subject matter of interest in the category; and
searching through the websites of interest to extract social media conversations related to the subject matter of interest.

4. The method of claim 3, wherein the forum analysis comprises:
searching for websites with online social media content relevant to the subject matter of interest using keywords in a search engine;
assigning a relevance score to each website found in search engine results based on the keywords; and
designating websites with a high relevance score as websites of interest.

5. The method of claim 1, wherein the content scraping comprises:
identifying hyperlinks to potentially relevant online social media conversations in one or more web pages of each of the websites of interest;
iteratively accessing and retrieving multiple levels of web pages within the each of the websites of interest using the hyperlinks until relevant conversation threads are found;
breaking down each relevant conversation thread into individual posts of online social media conversations; and
storing the raw data in the database.

6. The method of claim 5, wherein the raw data further comprises information on those social media authors responding to each of the individual posts.

7. The method of claim 1, wherein the user-profile information of the social media authors includes one or more of:
author's username;
author's demographic and geographic information;
number of conversations the author has posted to the website; and
online social media connections of the author.

8. The method of claim 1, wherein the social network analysis processing comprises:
determining influence of each of the authors within the one or more social networks of related authors of online social media and their corresponding posts;
ranking the influence of each of the authors to ascertain most influential authors for the category; and
compiling a list of the most influential authors for the category sorted by influence.

9. The method of claim 8, wherein the influence of each of the online social media authors is determined by:
calculating a centrality value for each author using a betweenness centrality algorithm on the raw data stored in the database for each of the websites of interest, the centrality value to indicate a degree of influence of the author in the one or more social networks; and
calculating an influence score for each author based on the centrality value of the author to determine the influence of each of the authors within the one or more social networks of related authors of online social media and their corresponding posts.

10. The method of claim 9, wherein the influence score for each of the authors is further based on a number of active authors on the websites of interest and number of posts to the websites of interest by each author.

11. The method of claim 9, further comprising modifying the centrality value by an activity level of each of the authors and by an importance of the website where the author is active.

12. The method of claim 1, further comprising:
parsing the social network graph to obtain early warnings about a service issue or quality issue associated with a particular service or product that embodies the subject matter of interest.

13. The method of claim 1, further comprising:
identifying a first list of most influential authors corresponding to a particular subject matter of interest based on a ranking of the influence levels associated with a plurality of social media authors participating in the online social media conversations.

14. The method of claim 1, further comprising:
based on the social network graph, generating a list of advertising networks that place advertisements that place advertisements in the analyzed online social media;
utilizing the social network graph, identifying advertising networks that place advertisements most relevant to the subject matter of interest in the analyzed social media; and
outputting the identified list of relevant advertising networks to a user of the social network graph.

15. A system comprising:
a processor;
memory coupled to the processor, the memory configured to store a set of instructions corresponding to a method executed by the processor, the method including:
generating a social network graph to model one or more social networks of related authors of online social media and their corresponding posts of online social media conversations relevant to subject matter of interest in a category, wherein generating the social network graph comprises:
harvesting and aggregating posts of online social media conversations from one or more online social media sources;
performing content scraping on the posts of online social media conversations to obtain raw data including each individual post of an online social media conversation relevant to the subject matter of interest and user-profile information of a social media author corresponding to each individual post; and
performing social network analysis processing on the raw data to obtain the social network graph, the processing including:
analyzing an influence level associated with the social media author, the influence level indicative of a total number of other authors the social media author is connected to over one or more social networking paradigms, a total number of posts written by the author in one or more social networking paradigms, an importance score associated with the one or more social networking paradigms in which the social media author's posts are published, a total number of distinct subgroups of authors the social media author is connected with, and an overall activity level of the social media author;
computing an influence score associated with the social media author using an influence score formula, the influence score formula computed by multiplying a raw betweenness centrality value for the social media author with a function of: (1) a number of other active authors on the website where the social media author is active, (2) a total number of posts the social media author has contributed, and (3) one or more correction parameters that are fine-tuned for purposes of a specific vertical that corresponds to the specific subject matter of interest; wherein the betweenness centrality value is computed as a result of a centrality measure of a vertex within a raw social graph generated for the given social networking paradigm;
detecting a sentiment rating associated with a one or more posts of the social media author; and
determining weighting factors associated with the one or more posts based on a combination of the sentiment rating associated with the one or more posts and the influence level associated with the social media author.

16. The system of claim 15, wherein the method further comprises storing the social network graph in a database.

17. The system of claim 15, wherein harvesting the online social media conversations includes:
performing forum analysis to discover websites of interest containing online social media content relevant to the subject matter of interest in the category; and
searching through the websites of interest to extract social media conversations related to the subject matter of interest.

18. The system of claim 17, wherein the forum analysis comprises:
searching for websites with online social media content relevant to the subject matter of interest using keywords in a search engine;
assigning a relevance score to each website found in search engine results based on the keywords; and
designating websites with a high relevance score as websites of interest.

19. The system of claim 15, wherein the content scraping comprises:
identifying hyperlinks to potentially relevant online social media conversations in one or more web pages of each of the websites of interest;
iteratively accessing and retrieving multiple levels of web pages within the each of the websites of interest using the hyperlinks until relevant conversation threads are found;
breaking down each relevant conversation thread into individual posts of online social media conversations; and
storing the raw data in the database.

20. The system of claim 19, wherein the raw data further comprises information on those social media authors responding to each of the individual posts.

21. The system of claim 15, wherein the user-profile information of the social media authors includes one or more of:
author's username;
author's demographic and geographic information;
number of conversations the author has posted to the website; and
online social media connections of the author.

22. The system of claim 1, wherein the social network analysis processing comprises:
determining influence of each of the authors within the one or more social networks of related authors of online social media and their corresponding posts;
ranking the influence of each of the authors to ascertain most influential authors for the category; and
compiling a list of the most influential authors for the category sorted by influence.

23. The system of claim 15, wherein the method further comprises:
parsing the social network graph to obtain early warnings about a service issue or quality issue associated with a particular service or product that embodies the subject matter of interest.

24. The system of claim 15, wherein the method further comprises:
identifying a first list of most influential authors corresponding to a particular subject matter of interest based on a ranking of the influence levels associated with a plurality of social media authors participating in the online social media conversations.

25. The system of claim 15, wherein the method further comprises:

> based on the social network graph, generating a list of advertising networks that place advertisements that place advertisements in the analyzed online social media;
> 
> utilizing the social network graph, identifying advertising networks that place advertisements most relevant to the subject matter of interest in the analyzed social media; and
> 
> outputting the identified list of relevant advertising networks to a user of the social network graph.

* * * * *